United States Patent
Goyal et al.

(10) Patent No.: US 12,405,362 B2
(45) Date of Patent: Sep. 2, 2025

(54) ENABLING TARGET LOCALIZATION WITH BI/MULTI-STATIC MEASUREMENTS IN NR

(71) Applicant: InterDigital Patent Holdings, Inc., Wilmington, DE (US)

(72) Inventors: Sanjay Goyal, Deer Park, NY (US); Mihaela Beluri, Jericho, NY (US); Ojas Kanhere, Brooklyn, NY (US); Ravikumar Pragada, Warrington, PA (US); Hussain Elkotby, Conshohocken, PA (US); Patrick Cabrol, Bayshore, NY (US); Tanbir Haque, Jackson Heights, NY (US); Alpaslan Demir, East Meadow, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 322 days.

(21) Appl. No.: 18/032,047

(22) PCT Filed: Oct. 14, 2021

(86) PCT No.: PCT/US2021/054908
§ 371 (c)(1),
(2) Date: Apr. 14, 2023

(87) PCT Pub. No.: WO2022/081800
PCT Pub. Date: Apr. 21, 2022

(65) Prior Publication Data
US 2023/0393254 A1    Dec. 7, 2023

Related U.S. Application Data

(60) Provisional application No. 63/091,370, filed on Oct. 14, 2020.

(51) Int. Cl.
*G01S 13/00* (2006.01)
*G01S 7/00* (2006.01)

(52) U.S. Cl.
CPC ............ *G01S 13/003* (2013.01); *G01S 7/003* (2013.01)

(58) Field of Classification Search
None
See application file for complete search history.

(56) References Cited

U.S. PATENT DOCUMENTS 9,713,117 B2 *   7/2017   Khoryaev ............. H04W 64/00
2007/0010259 A1 *  1/2007   Hoffmann .............. H04B 17/23
                                                        455/456.1

(Continued)

OTHER PUBLICATIONS

"Guidance for use of the LTE logo," no author given; undated; retrieved in the year 2024; published by 3gpp on the Internet at 3gpp.org; Sophia Antipas, France. (Year: 2024).*

(Continued)

*Primary Examiner* — Bernarr E Gregory
(74) *Attorney, Agent, or Firm* — Condo Roccia Koptiw LLP

(57) ABSTRACT

Systems, methods, and instrumentalities are disclosed herein associated with enabling target localization with bi/multi-static measurements in new radio (NR). Bi-static or multi-static configurations with potential targets may be formed with nodes (e.g., WTRUs, gNBs, etc.) of mobile wireless communication systems, for example, to enable target localization applications. Target localization may be enhanced based on using determined configurations to reduce target localization estimation errors.

14 Claims, 22 Drawing Sheets

(56) References Cited

U.S. PATENT DOCUMENTS

| | | | | | |
|---|---|---|---|---|---|
| 2011/0317748 | A1* | 12/2011 | Li | ........................ | H04L 25/0226 375/219 |
| 2013/0065585 | A1* | 3/2013 | Pelletier | .................. | H04L 67/55 455/456.6 |
| 2013/0322276 | A1* | 12/2013 | Pelletier | ................ | H04W 24/10 370/252 |
| 2014/0056278 | A1* | 2/2014 | Marinier | ............. | H04W 52/367 370/330 |
| 2016/0337105 | A1* | 11/2016 | Lawton | ................. | H04L 1/0028 |
| 2021/0076367 | A1* | 3/2021 | Bayesteh | .............. | G01S 13/003 |

OTHER PUBLICATIONS

"Who We Are: Our Brands"; no author given; copyright in the year 2024; published by the Wi-Fi Alliance on the Internet at wi-fi.org; Austin, TX, USA. (Year: 2024).*

"WiMAX Forum: Trademark Policy and Trademark Usage Guidelines"; no author given; published in the year 2007; posted on the Internet at wimaxforum.org by the WiMAX Forum; Clackamas, OR, USA. (Year: 2007).*

3rd Generation Partnership Project (3GPP) TS 38.214 V16.1.0, "Technical Specification Group Radio Access Network, NR, Physical layer procedures for data (Release 16)", Mar. 2020, pp. 1-151.

3rd Generation Partnership Project (3GPP) TS 38.300 V16.1.0, "Technical Specification Group Radio Access Network, NR, NR and NG-RAN Overall Description, Stage 2 (Release 16)", Mar. 2020, pp. 1-133.

Alloulah et al., "Future Millimeter-Wave Indoor Systems: A Blueprint for Joint Communication and Sensing", IEEE Computer Society, Transformative Computing and Communication, Jul. 2019, pp. 16-24.

Kanhere et al., "Target Localization using Bistatic and Multistatic Radar with 5G NR Waveform", IEEE 93rd Vehicular Technology Conference, Apr. 25, 2021, 7 pages.

Kuschel et al., "Tutorial: Passive Radar Tutorial", IEEE Aerospace and Electronic Systems Magazine, vol. 34, No. 2, doi:10.1109/maes. 2018.160146, Feb. 2019, pp. 2-19.

Luong et al., "Radio Resource Management in Joint Radar and Communication: A Comprehensive Survey", IEEE, arXiv:2007. 13146v2, Aug. 5, 2020, pp. 1-31.

Rahman et al., "Enabling Joint Communication and Radio Sensing in Mobile Networks—A Survey", IEEE, arXiv:2006.07559v2, Cornell University Library, Sep. 11, 2020, 29 pages.

Thoma et al., "Cooperative Passive Coherent Location: A Promising 5G Service to Support Road Safety", IEEE, arXvix:1802.04041v5, Cornell University Library, Mar. 27, 2019, pp. 1-7.

* cited by examiner

ENABLING TARGET LOCALIZATION WITH BI/MULTI-STATIC MEASUREMENTS IN NR

CROSS-REFERENCE TO RELATED APPLICATIONS

This application is the National Stage Entry under 35 U.S.C. § 371 of Patent Cooperation Treaty Application No. PCT/US2021/054908, filed Oct. 14, 2021, which claims he benefit of Provisional U.S. Patent Application No. 63/091,370, filed Oct. 14, 2020, the disclosure of which is incorporated herein by reference in its entirety.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE). Wireless communication devices may establish communications with other devices and data networks, e.g., via an access network, such as a radio access network (RAN).

SUMMARY

Systems, methods, and instrumentalities are disclosed herein associated with enabling target localization with bi/multi-static measurements in new radio (NR). Bi-static or multi-static configurations with potential targets may be formed with nodes (e.g., WTRUs, gNBs, etc.) of mobile wireless communication systems, for example, to enable target localization applications. Target localization may be enhanced based on using determined configurations to reduce target localization estimation errors.

A first wireless transmit/receive unit (WTRU) may perform target localization (e.g., WTRU autonomous, network-assisted (e.g., hybrid), or network-controlled target localization). The first WTRU may send a localization request to a set of WTRUs (e.g., neighboring WTRUs). The first WTRU may monitor for and/or receive a localization response associated with a second WTRU (e.g., the second WTRU being in the set of WTRUs), for example, during a duration of time. The first WTRU may determine (e.g., based on the received localization response) a first subset of WTRUs. The first subset of WTRUs may be a subset of the set of WTRUs. The first WTRU may send configuration information to the first subset of WTRUs. The configuration information may indicate a reference signal transmission parameter, for example, associated with the first subset of WTRUs. The first WTRU may receive a first reference signal (e.g., joint communications and sensing reference signal (JCS-RS), for example, from a WTRU in the first subset of WTRUs (e.g., the second WTRU or a different WTRU, such as a third WTRU). The first WTRU may perform a first measurement associated with the first reference signal. The first WTRU may determine (e.g., based on the first measurement) a first target location and a first target location estimation error.

The first WTRU may determine that the target location estimation error is above a threshold. The first WTRU may select a second subset of WTRUs (e.g., based on the determination that the target location estimation error is above the threshold). The second subset of WTRUs may be a subset of the first subset of WTRUs.

Additional measurement(s) (e.g., a second measurement) may be performed. For example, a second measurement may be performed using a second reference signal (e.g., JCS-RS). The second reference signal may be sent by a first WTRU to a different WTRU in the second subset of WTRUs (e.g., such as the second WTRU or third WTRU) and/or the second reference signal may be received by the first WTRU from a different WTRU in the second subset of WTRUs (e.g., such as the second WTRU or third WTRU). If the second reference signal is sent by a first WTRU to a different WTRU in the second subset of WTRUs, the first WTRU may receive a second measurement (e.g., where the second measurement was made using the second reference signal). If the second reference signal is received by a first WTRU from a different WTRU in the second subset of WTRUs, the first WTRU may perform a second measurement associated with the second reference signal.

The first WTRU may determine a second target location and a second target location estimation error (e.g., based on the second measurement). The second target location may be a refined estimate of the first target location. The second target location estimation error may be a refined estimate of the first target location error.

The first WTRU may send one or more of the first target location, the first target location estimation error, the second target location, or the second target location estimation error, for example, to one or more of a network entity (e.g., gNB) or one or more WTRUs.

Wireless transmit/receive unit (WTRU)-autonomous target localization may be performed using WTRU-to-WTRU bi/multi-static measurements. A WTRU may send a bi/multi-static localization request to one or more neighboring WTRUs. A WTRU may receive one or more localization responses (e.g., acknowledged (ACK) or not acknowledged (NACK)) from one or more neighboring WTRUs. A WTRU may select one or more WTRUs (e.g., second WTRU, third WTRU, etc.) for initial bi/multi-static measurements. A WTRU may send an initial measurement configuration message to the selected WTRUs. A WTRU may make measurements (e.g., angle of arrival (AOA), time difference on arrival (TDOA), signal to noise ratio (SNR), etc.) on a received joint communication and sensing (JCS) reference signal (RS) (JCS-RS), e.g., received from each of the selected WTRUs. A WTRU may determine whether additional bi/multi-static measurements are needed. A WTRU may determine a preferred bi/multi-static configuration for additional bi/multi-static measurements (e.g., if additional measurements are needed). A WTRU may send an additional measurement request message to each of the selected preferred WTRUs for additional bi/multi-static measurements. A WTRU may make measurements on the JCS-RS transmission from each of the selected transmitter/transmitting (Tx or TX) WTRUs and/or may transmit a JCS-RS for each of the selected receiver/receiving (Rx or RX) WTRUs for additional bi/multi-static measurements by the selected RX WTRUs. A WTRU may receive a measurement report from each of the selected RX WTRUs for the additional bi/multi-static measurements. A WTRU may perform target localization.

Network (NW)-assisted (hybrid) target localization may be performed using WTRU-to-WTRU bi/multi-static measurements. A WTRU may send a bi/multi-static localization assistance request to the g Node B (gNB). A WTRU may receive a bi/multi-static localization assistance response from the gNB. A WTRU may make measurements on the JCS-RS transmissions from each of the configured WTRUs (e.g., on the configured resources). A WTRU may re-send the bi/multi-static localization assistance request message to the gNB, for example, to request selection of a different configuration for initial bi/multi-static measurements. A WTRU may determine whether additional bi/multi-static measurements are needed. A WTRU may determine a preferred bi/multi-static configuration for additional bi/multi-static measurements (e.g., if additional measurements are needed). A WTRU may configure and perform additional bi/multi-static measurements, for example, using WTRU-autonomous resource selection (e.g., sidelink mode 2). A gNB may select and configure one or more WTRUs and allocate resources to perform initial bi/multi-static measurements with a WTRU.

NW-controlled target localization may be performed using WTRU-to-WTRU bi/multi-static measurements. A WTRU may send a bi/multi-static localization assistance request to a gNB. A WTRU may receive a bi/multi-static localization assistance response from the gNB. The localization assistance response may include the resource configuration to perform initial and additional bi/multi-static measurements. A WTRU may make initial measurements on JCS-RS transmissions from each of the configured WTRUs (e.g., on configured resources). A WTRU may determine whether additional bi/multi-static measurements are needed. A WTRU may determine a preferred bi/multi-static configuration for additional bi/multi-static measurements (e.g., if additional measurements are needed). A WTRU may send an additional measurement indication to the network (e.g., along with information indicating whether the resources for measurement reporting are needed). A WTRU may send a successful localization indication to the gNB. A WTRU may send a re-configuration request for additional measurements to the gNB. A WTRU may re-send a bi/multi-static localization assistance request message to the gNB, for example, to request selection of a different configuration for initial bi/multi-static measurements. A WTRU may configure and perform additional bi/multi-static measurements on resources configured by the gNB. A gNB may select and configure one or more WTRUs to perform initial bi/multi-static measurements with a WTRU. A gNB may configure resources for initial and additional bi/multi-static measurements for a WTRU. A gNB may de-allocate resources configured for additional bi/multi-static measurements, for example, after receiving a successful localization indication from a WTRU. A gNB may de-allocate resources configured for measurement reporting, for example, based on an additional measurement indication from a WTRU. A gNB may re-configure resources for additional measurements, for example, after receiving an additional measurement re-configuration request from a WTRU.

DETAILED DESCRIPTION

Systems, methods, and instrumentalities are disclosed herein (e.g., via example implementations) for enabling target localization with bi/multi-static measurements in new radio (NR).

Figure 1A:
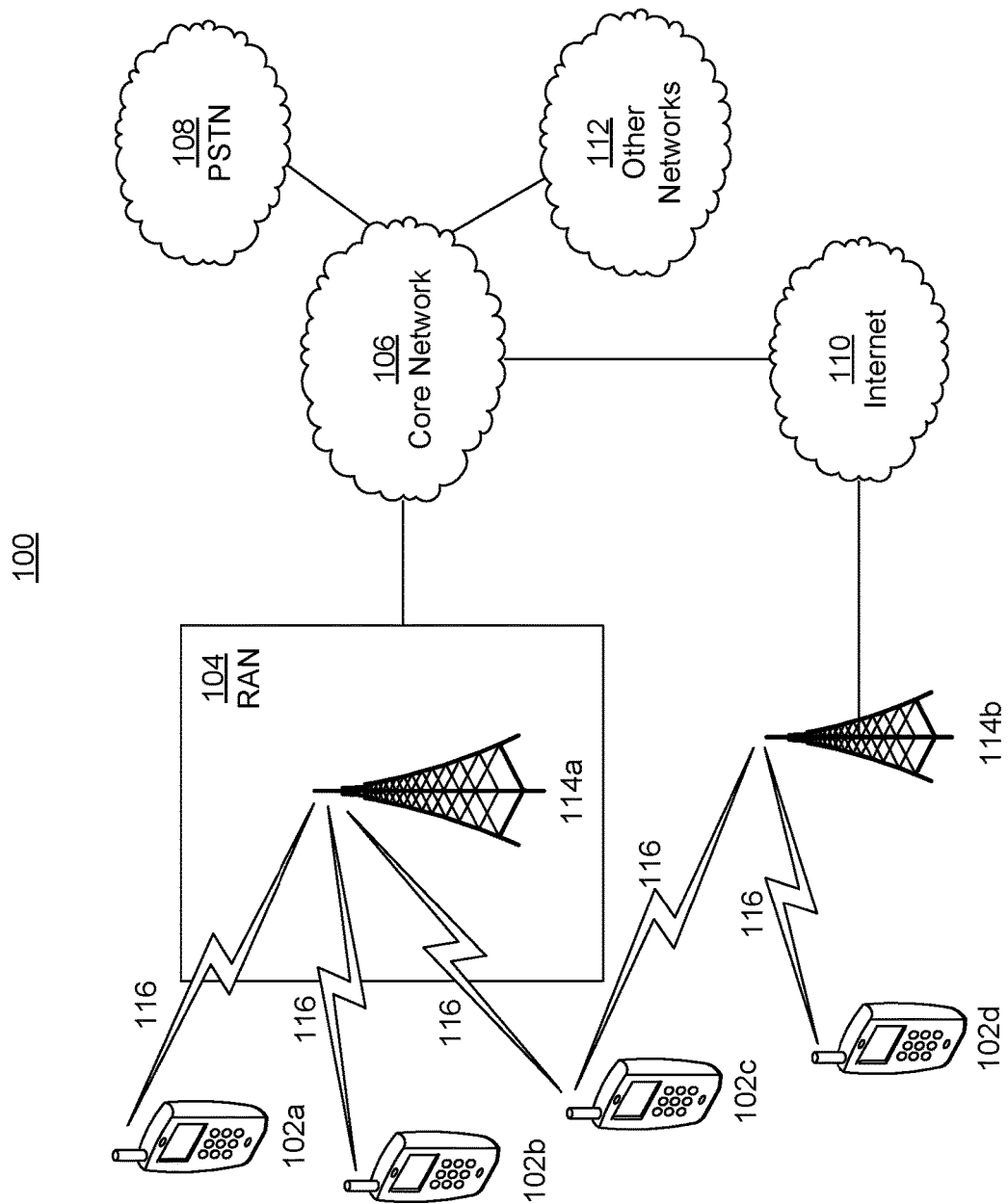
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an encode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
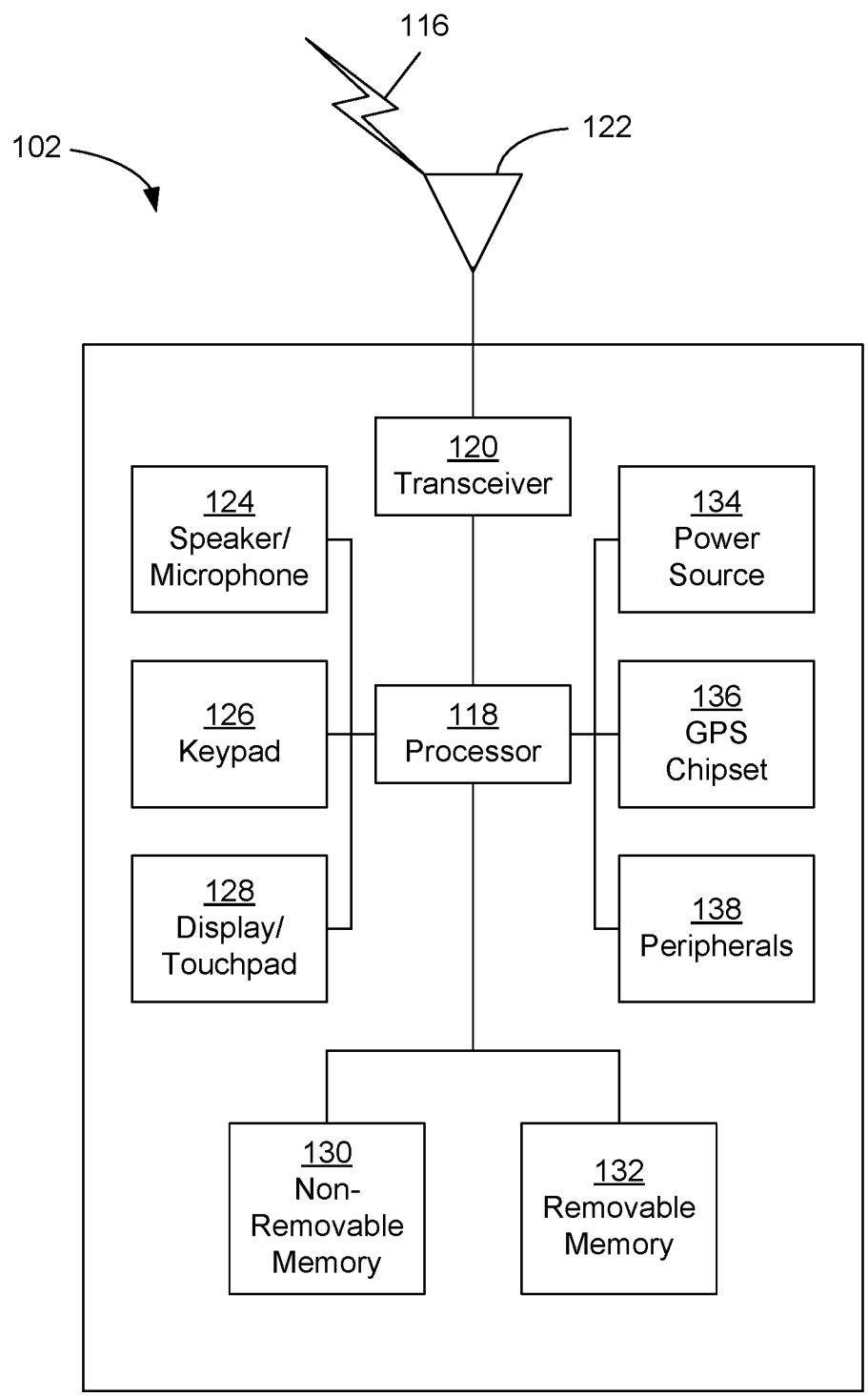
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
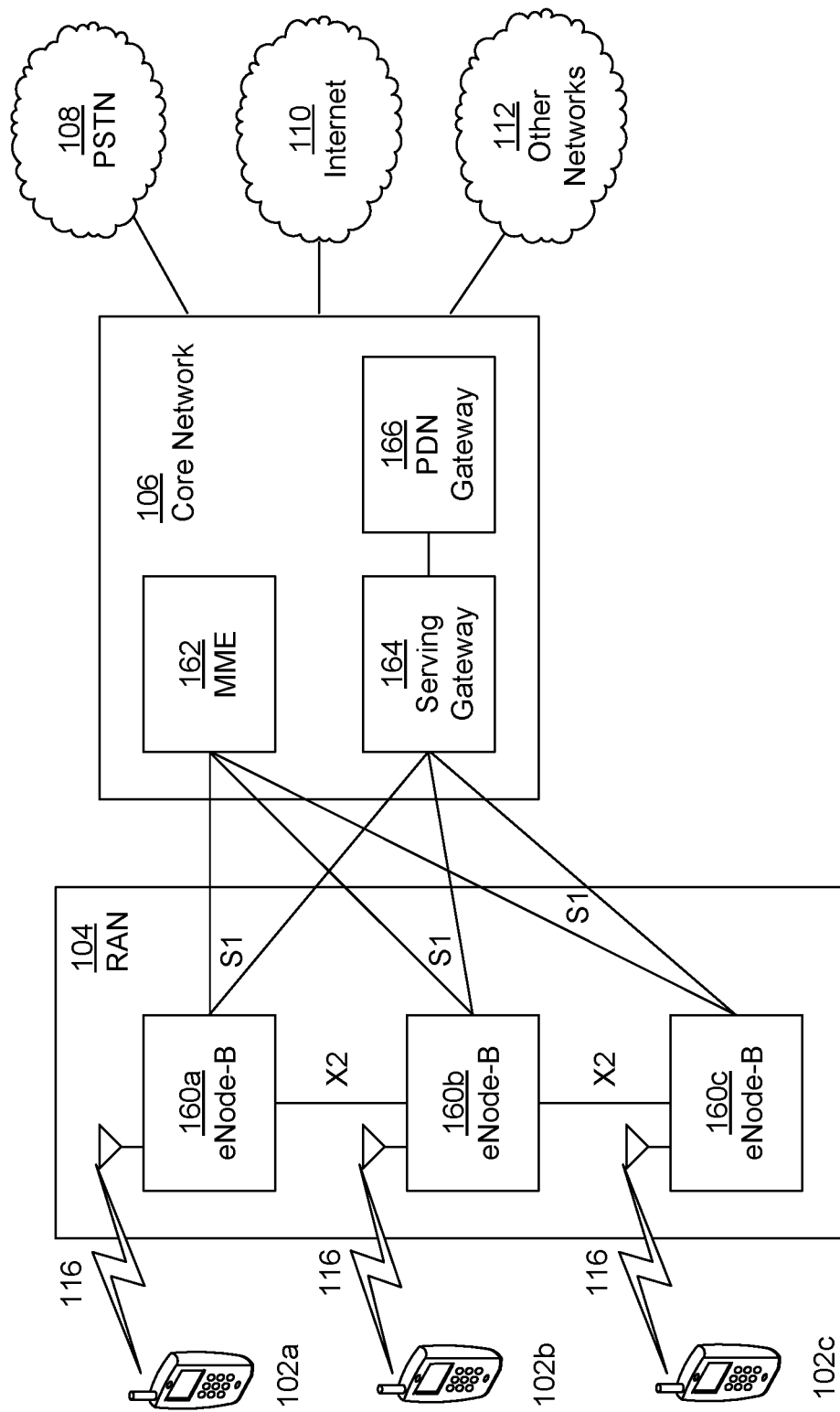
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
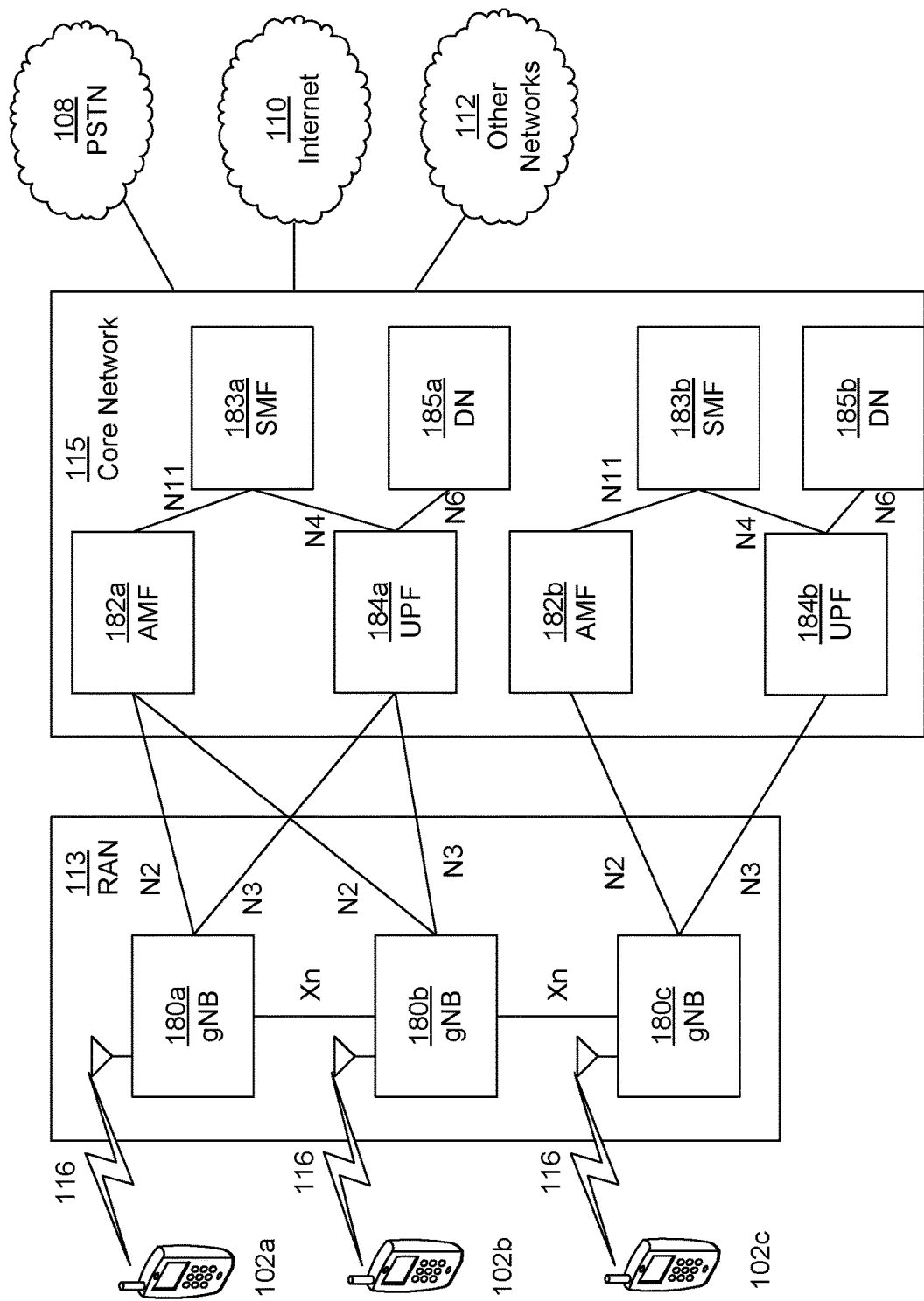
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are disclosed herein associated with enabling target localization with bi/multi-static measurements in new radio (NR). Bi-static or multi-static configurations with potential targets may be formed with nodes (e.g., WTRUs, gNBs, etc.) of mobile wireless communication systems, for example, to enable target localization applications. Target localization may be enhanced based on using determined configurations to reduce target localization estimation errors.

A first wireless transmit/receive unit (WTRU) may perform target localization (e.g., WTRU autonomous, network-assisted (e.g., hybrid), or network-controlled target localization). The first WTRU may send a localization request to a set of WTRUs (e.g., neighboring WTRUs). The first WTRU may monitor for and/or receive a localization response associated with a second WTRU (e.g., the second WTRU being in the set of WTRUs), for example, during a duration of time. The first WTRU may determine (e.g., based on the received localization response) a first subset of WTRUs. The first subset of WTRUs may be a subset of the set of WTRUs. The first WTRU may send configuration information to the first subset of WTRUs. The configuration information may indicate a reference signal transmission parameter, for example, associated with the first subset of WTRUs. The first WTRU may receive a first reference signal (e.g., joint communications and sensing reference signal (JCS-RS), for example, from a WTRU in the first subset of WTRUs (e.g., the second WTRU or a different WTRU, such as a third WTRU). The first WTRU may perform a first measurement associated with the first reference signal. The first WTRU may determine (e.g., based on the first measurement) a first target location and a first target location estimation error.

The first WTRU may determine that the target location estimation error is above a threshold. The first WTRU may select a second subset of WTRUs (e.g., based on the determination that the target location estimation error is above the threshold). The second subset of WTRUs may be a subset of the first subset of WTRUs.

Additional measurement(s) (e.g., a second measurement) may be performed. For example, a second measurement may be performed using a second reference signal (e.g., JCS-RS). The second reference signal may be sent by a first WTRU to a different WTRU in the second subset of WTRUs (e.g., such as the second WTRU or third WTRU) and/or the second reference signal may be received by the first WTRU from a different WTRU in the second subset of WTRUs (e.g., such as the second WTRU or third WTRU). If the second reference signal is sent by a first WTRU to a different WTRU in the second subset of WTRUs, the first WTRU may receive a second measurement (e.g., where the second measurement was made using the second reference signal). If the second reference signal is received by a first WTRU from a different WTRU in the second subset of WTRUs, the first WTRU may perform a second measurement associated with the second reference signal.

The first WTRU may determine a second target location and a second target location estimation error (e.g., based on the second measurement). The second target location may be a refined estimate of the first target location. The second target location estimation error may be a refined estimate of the first target location error.

The first WTRU may send one or more of the first target location, the first target location estimation error, the second target location, or the second target location estimation error, for example, to one or more of a network entity (e.g., gNB) or one or more WTRUs.

Wireless transmit/receive unit (WTRU)-autonomous target localization may be performed using WTRU-to-WTRU bi/multi-static measurements. A WTRU may send a bi/multi-static localization request to one or more neighboring WTRUs. A WTRU may receive one or more localization responses (e.g., acknowledged (ACK) or not acknowledged (NACK)) from one or more neighboring WTRUs. A WTRU may select one or more WTRUs (e.g., second WTRU, third WTRU, etc.) for initial bi/multi-static measurements. A WTRU may send an initial measurement configuration message to the selected WTRUs. A WTRU may make measurements (e.g., angle of arrival (AOA), time difference on arrival (TDOA), signal to noise ratio (SNR), etc.) on a received joint communication and sensing (JCS) reference signal (RS) (JCS-RS), e.g., received from each of the selected WTRUs. A WTRU may determine whether additional bi/multi-static measurements are needed. A WTRU may determine a preferred bi/multi-static configuration for additional bi/multi-static measurements (e.g., if additional measurements are needed). A WTRU may send an additional measurement request message to each of the selected preferred WTRUs for additional bi/multi-static measurements. A WTRU may make measurements on the JCS-RS transmission from each of the selected transmitter/transmitting (Tx or TX) WTRUs and/or may transmit a JCS-RS for each of the selected receiver/receiving (Rx or RX) WTRUs for additional bi/multi-static measurements by the selected RX WTRUs. A WTRU may receive a measurement report from each of the selected RX WTRUs for the additional bi/multi-static measurements. A WTRU may perform target localization.

Network (NW)-assisted (hybrid) target localization may be performed using WTRU-to-WTRU bi/multi-static measurements. A WTRU may send a bi/multi-static localization assistance request to the g Node B (gNB). A WTRU may receive a bi/multi-static localization assistance response from the gNB. A WTRU may make measurements on the JCS-RS transmissions from each of the configured WTRUs (e.g., on the configured resources). A WTRU may re-send the bi/multi-static localization assistance request message to the gNB, for example, to request selection of a different configuration for initial bi/multi-static measurements. A WTRU may determine whether additional bi/multi-static measurements are needed. A WTRU may determine a preferred bi/multi-static configuration for additional bi/multi-static measurements (e.g., if additional measurements are needed). A WTRU may configure and perform additional bi/multi-static measurements, for example, using WTRU-autonomous resource selection (e.g., sidelink mode 2). A gNB may select and configure one or more WTRUs and allocate resources to perform initial bi/multi-static measurements with a WTRU.

NW-controlled target localization may be performed using WTRU-to-WTRU bi/multi-static measurements. A WTRU may send a bi/multi-static localization assistance request to a gNB. A WTRU may receive a bi/multi-static localization assistance response from the gNB. The localization assistance response may include the resource configuration to perform initial and additional bi/multi-static measurements. A WTRU may make initial measurements on JCS-RS transmissions from each of the configured WTRUs (e.g., on configured resources). A WTRU may determine whether additional bi/multi-static measurements are needed. A WTRU may determine a preferred bi/multi-static configuration for additional bi/multi-static measurements (e.g., if additional measurements are needed). A WTRU may send an additional measurement indication to the network (e.g., along with information indicating whether the resources for measurement reporting are needed). A WTRU may send a successful localization indication to the gNB. A WTRU may send a re-configuration request for additional measurements to the gNB. A WTRU may re-send a bi/multi-static localization assistance request message to the gNB, for example, to request selection of a different configuration for initial bi/multi-static measurements. A WTRU may configure and perform additional bi/multi-static measurements on resources configured by the gNB. A gNB may select and configure one or more WTRUs to perform initial bi/multi-static measurements with a WTRU. A gNB may configure resources for initial and additional bi/multi-static measurements for a WTRU. A gNB may de-allocate resources configured for additional bi/multi-static measurements, for example, after receiving a successful localization indication from a WTRU. A gNB may de-allocate resources configured for measurement reporting, for example, based on an additional measurement indication from a WTRU. A gNB may re-configure resources for additional measurements, for example, after receiving an additional measurement re-configuration request from a WTRU.

Higher user data rates, increased cell capacity, reduced latency, and the internet of things (IoT) may be supported, for example, by wireless technologies (e.g., by 5G wireless technologies). Wireless systems (e.g., 5G wireless systems) may use higher frequency bands (e.g., above 6 GHz and in the millimeter wave (mmWave) spectrum), where spectrum (e.g., large swaths of spectrum) may be available (e.g., in addition to sub-6 GHz frequency bands used by 4G and prior wireless technologies).

Available bandwidths in the mmWave spectrum may be useful, for example, for delivering high data rates (e.g., for Enhanced Mobile Broadband (eMBB)) and/or enhanced positioning applications. Higher frequency bands (e.g., mmWave) may provide advantages, for example, in terms of available bandwidth, attainable data rates, and/or increased accuracy for positioning. Propagation in higher frequency bands (e.g., mmWave) may suffer from attenuation (e.g., severe attenuation) and blockage (e.g., severe blockage). Path loss may be mitigated, for example, by using highly directive systems (e.g., highly directive beamforming). Systems (e.g., 4G systems) may use beamforming. Highly directive systems may provide additional transmitter/transmitting (Tx) or receiver/receiving (Rx) gains to compensate for high path loss in mmWave. In examples (e.g., New Radio (NR)), support may be provided for up to 64 beams for frequency ranges up to 52.6 GHz. The number of beams may increase, for example, for frequencies above 52.6 GHz, and the corresponding beam widths may decrease, which may lead to the use of pencil beams.

Beam management procedures may maintain a link for directive systems supporting a high number of beams/narrow beams. Beam management procedures may mitigate impairments, for example, specific to mmWave bands (e.g., blockage and/or misalignment of beams). There may be an overhead (e.g., a large overhead) associated with beam management. The overhead may increase, for example, as the number of beams increases and/or as the beam width decreases for higher frequency bands.

The availability of large amounts of spectrum (e.g., large channel bandwidths) may enable other applications, such as enhanced positioning. For example, a large channel bandwidth may lead to increased resolution in ranging/positioning. Enhanced positioning information may provide high resolution detection of objects in an environment, which may result in a clearer physical estimation of an operating environment (e.g., radio environment mapping). High resolution detection (e.g., for wireless networks) may imply detection of static and/or mobile obstacles and multi-path characteristics, which may be critical for configuration and optimization of wireless network systems.

Ranging (e.g., radar), enhanced positioning, and high data rates communications applications may benefit from the use of wide channel bandwidths. Technologies that jointly address communications and sensing may be implemented. Joint communications and sensing (JCS) technologies may help reduce complexity and cost, for example, by using a common framework for seamless and coordinated operation of communication layer and in-band radio detection and ranging (RADAR).

Radar systems may have key performance indicators (KPIs). Radar functions may include functions inherent in the word radar, such as radio detection and ranging. A bearing or angular position of a target with respect to the transmitter may be determined, for example, based on directional transmission of radar signals. A target's velocity may be estimated from the target's Doppler frequency.

Detection (e.g., as a function of radar) may refer to a system's ability to discriminate a target from the background noise and radar clutter of the environment, for example, in which the target resides. Key performance indicators of a radar's detection capability may include, for example, detection range, resolution, or the radar's ability to distinguish between multiple targets on the same bearing and/or range to the radar system.

Detection range may be improved, for example, by increasing transmit power and/or receiver sensitivity of a radar system. Detection range may be affected by the radar's operating frequency, which may result in a different path loss of the radar signal and/or a different radar cross section (RCS) of the target being detected. An RCS may refer to the measure of a target's ability to reflect radar signals in the direction of the radar receiver. An RCS may be a function of one or more of the following, for example: the material composition of the target, the targets bearing, orientation and geometry, and/or the frequency of the radar signal being used for detection. Range resolution may be a function of radar pulse duration (e.g., in non-coherent systems) or radar pulse bandwidth (e.g., in coherent detection).

A radar's ranging capability may refer to the radar system's ability to estimate the distance of the target to the radar receiver. Ranging accuracy may be characterized as a ranging resolution, which may refer to the margin of uncertainty for a radar system's range estimate and/or the distance (e.g., minimum distance) between multiple (e.g., two) targets (e.g., such that the radar system can detect multiple objects). A radar system's range resolution may decrease (e.g., linearly) with the radar transmission's pulse width, for example, in non-coherent radar detection. A range resolution may be improved (e.g., linearly) with system bandwidth, for example, in a coherent detector.

A target's bearing or angular position (e.g., relative to the radar) may be obtained from directional transmission of radar signals, e.g., to isolate reflections from a limited direction of arrival. A limit of angular resolution may be determined (e.g., in analog beamforming), for example, by the beam width of a radar transmission. Angular resolution may be improved, for example, with smart array radar systems (e.g., where a limiting factor may become an estimation error from system noise).

Radar may estimate a target's velocity, for example, based on the Doppler shift of signals reflected off of the target while it is in motion. A shift in the frequency of a reflected waveform relative to a transmitted waveform may indicate target mobility proportional to the magnitude of the frequency shift. Target velocity estimation may be more difficult in the presence of multiple targets and/or multi-path reflections. Algorithms (e.g., sophisticated algorithms) may be used to isolate target sources (e.g., to decrease or avoid estimate instability). Estimating the velocity of an accelerating target may complicate velocity estimation.

Radar waveforms may be classified, for example, as continuous wave radar or pulse modulation radar. Continuous wave radar may refer to radar architectures in which a radar signal is transmitted and received continuously. Pulse modulation radar may refer to systems in which the transmission and reception are duplexed in time. Radar waveforms may (e.g., as in communication) use phase, frequency, and/or amplitude modulation, for example, to aid in the detection of targets.

Figure 2:
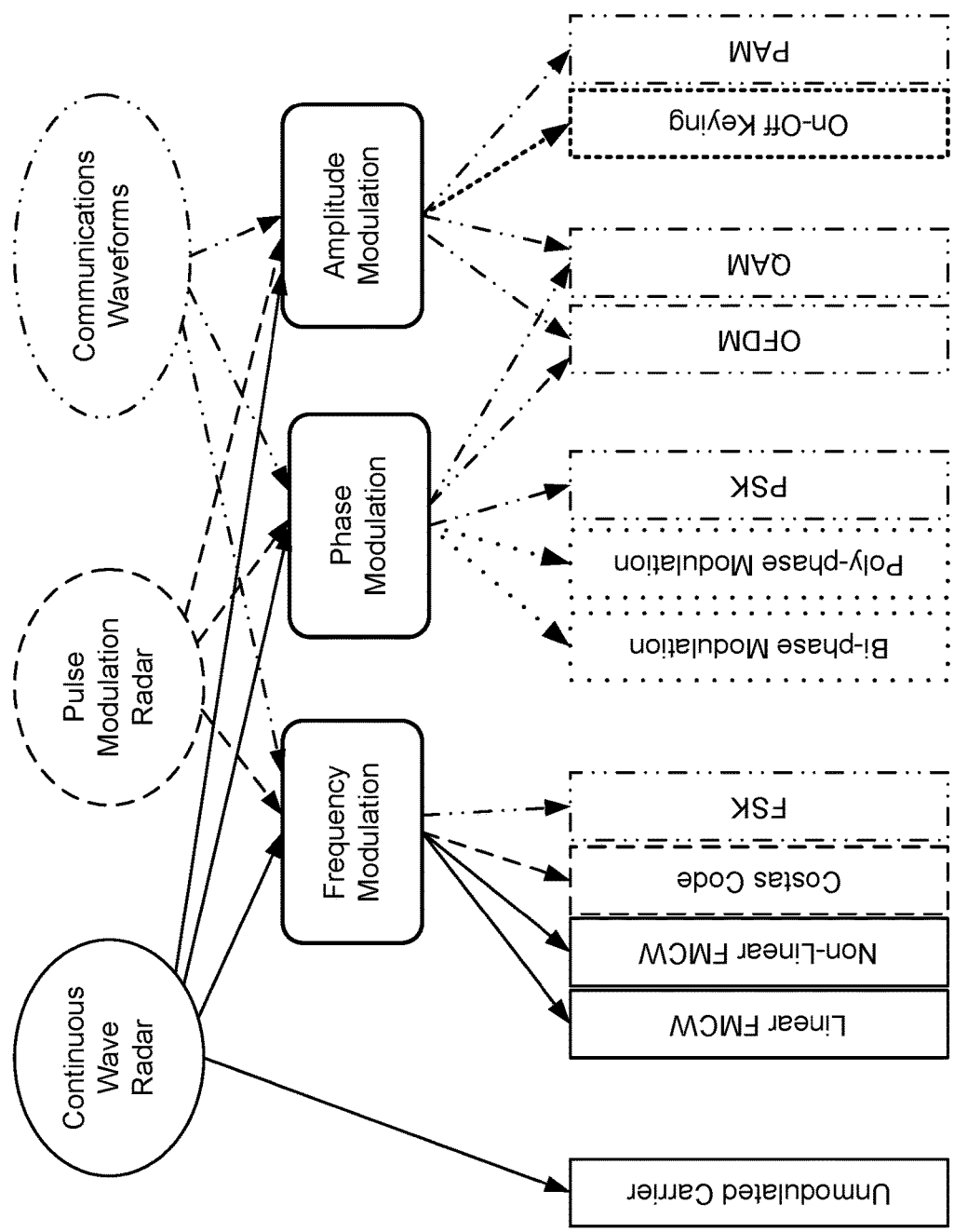
FIG. 2 illustrates a taxonomy of radar and wireless communication waveforms.

FIG. 2 illustrates a taxonomy of radar and wireless communication waveforms. FIG. 2 shows relationships between radar waveforms and wireless communication waveforms. Pulsed radar may emit short pulses. Pulsed radar may receive echo signals, for example, in a silent period between pulses. Pulsed radar may be characterized, for example, by very short transmission pulses followed by very large pauses, which may be referred as receiving times. Pulsed radar systems may (e.g., have a capability or be configured to) estimate target range and bearing (e.g., in the presence of multiple targets). Pulsed radar may suffer from a minimum detection range, which may be determined by the time the signal propagates before the radar can transmit the radar pulse and switch to receive mode to detect the reflection.

Continuous wave (CW) radar systems may emit electromagnetic radiations (e.g., at all times). A CW radar transmitting an unmodulated signal may measure (e.g., only) the speed of a reflecting target, for example, using the Doppler effect. A CW radar may not measure the range and may not differentiate between two or more targets. A CW radar system may be used to measure range, for example, by employing frequency modulation (e.g., giving rise to frequency modulated continuous wave (FMCW) radars). A time delay between the transmission and reception may be measured, for example, by measuring the frequency of the returning signal. Range may be determined from the time delay.

A CW radar system may be simpler to manufacture and operate, for example, because energy is not pulsed. A CW radar system may not have a minimum or maximum range. CW radar system range may be limited by transmit power. Continuous wave radar may maximize total power on a target, for example, because the transmitter is broadcasting continuously. A pulsed radar system may provide a greater measurement range and/or lower power consumption (e.g., compared to a CW radar, such as an FMCW radar system).

Continuous waveform radar systems may not suffer from a minimum ranging distance and/or may provide a more natural framework for estimating a target's velocity. Continuous wave radar systems may perform sub-optimally in multi-target or rich multipath scenarios.

Radar waveforms may coexist (e.g., optimally) with modern wireless and mobile communication systems (e.g., using pulsed phase and amplitude modulated waveforms). Pulsed phase and amplitude modulated waveform signals may be most similar to wireless communications.

Radar architectures may be classified, for example, as mono-static, bi-static, or multi-static. Monostatic radar architectures may co-locate a transmitter and a receiver. Monostatic radar architectures may use a shared (e.g., a single) Tx/Rx chain or may use separate chains for Tx and Rx. Bi-static radar may employ multiple sites (e.g., two sites) to transmit and receive (e.g., that are not collocated). The distance between Tx and Rx sites may be a (e.g., significant) fraction of the target range.

Figure 3:
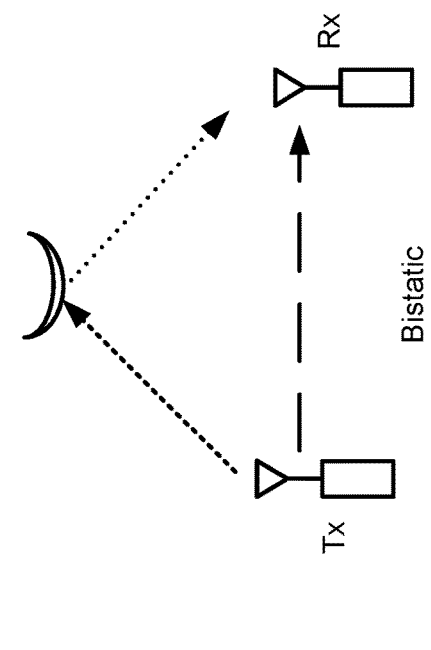
FIG. 3 illustrates examples of monostatic and bi-static radar architectures.
Figure 3:
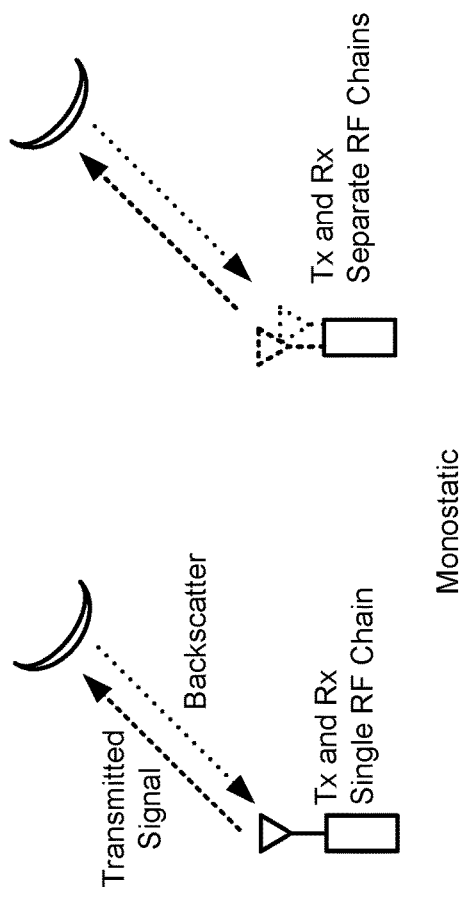

FIG. 3 illustrates examples of monostatic and bi-static radar architectures. Multi-static radar configurations may include one or more (e.g., multiple) devices (e.g., radios) that perform transmission and one or more (e.g., multiple) devices (e.g., at separate locations) that perform reception.

Figure 4:
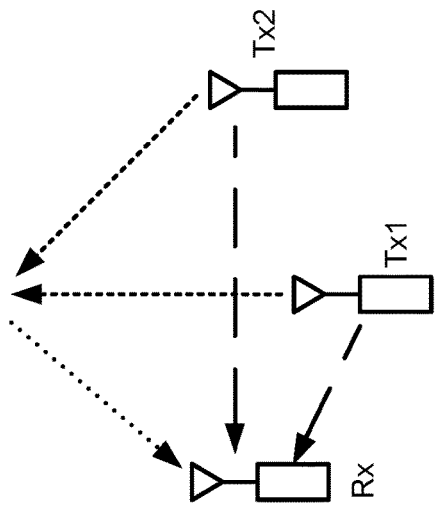
FIG. 4 illustrates examples of multi-static radar configurations.
Figure 4:
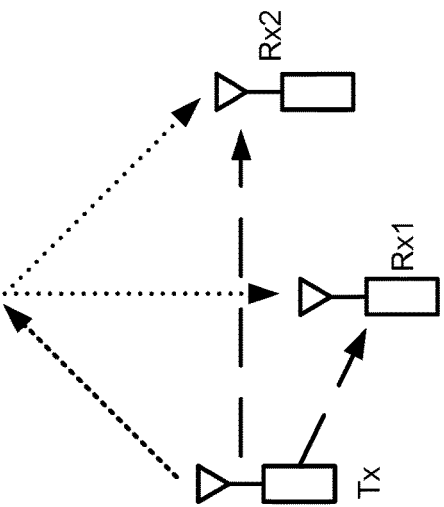

FIG. 4 illustrates examples of multi-static radar configurations. Multi-static configurations may include, for example, a single transmitter and multiple receivers, multiple transmitters and a single receiver, or multiple transmitters and multiple receivers (e.g., with coordination between nodes). Multi-static configurations may be (e.g., viewed as) a combination of multiple bistatic configurations. Multi-static radar architectures may include, but are not limited to, examples shown in FIG. 4.

Monostatic and bistatic radar architectures may be used with (e.g., existing) wireless communications hardware. The reflections of the transmitted signal may be observed by the radio that originally made the transmission or the device that was configured to receive it.

Figure 5:
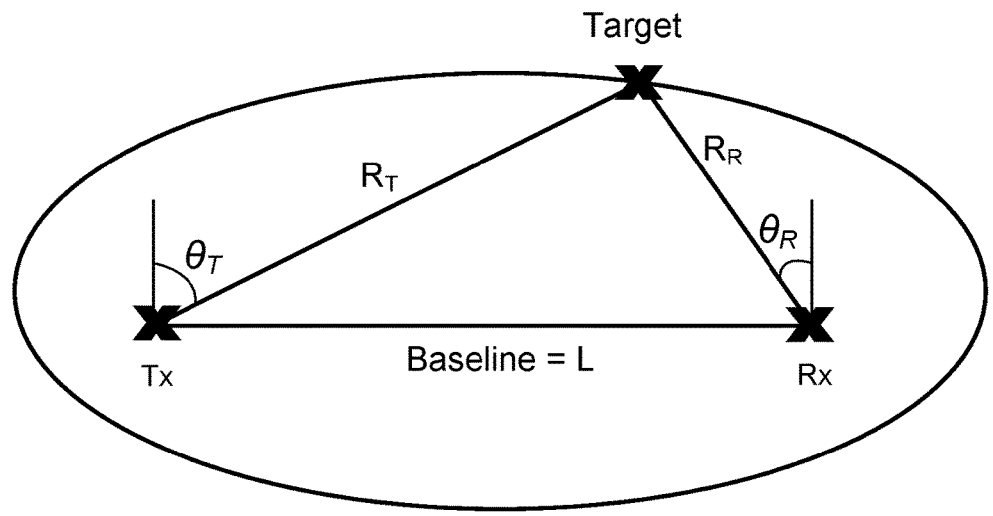
FIG. 5 illustrates an example of bi-static radar geometry.

FIG. 5 illustrates an example of bi-static radar geometry. The distance L between the transmitter and the receiver may be referred to as the baseline. The transmitter-to-target range may be indicated by $R_T$. The target-to-receiver range may be indicated by $R_R$. The radar receiver may measure the time delay (e.g., time difference on arrival (TDOA)) between the direct signal from the transmitter and the signal reflected off the target. The bi-static range sum (e.g., $R_T+R_R$) may be constant, for example, for a fixed distance (e.g., baseline) between the Tx and Rx, and for the estimated TDOA. An ellipse may be defined (e.g., where the target is located), which may be referred to as an iso-range contour. The transmitter and receiver may be the two focal points (e.g., as shown by example in FIG. 5). The target location on the iso-range contour may be determined, for example, using the angular information, e.g., based on the angle of departure (AoD) (e.g., as shown as $\theta_T$ in FIG. 5) at the transmitter side or based on the angle of arrival (AoA) (e.g., as shown as $\theta_R$ in FIG. 5) at the receiver side.

A bi-static radar receiver may use different methods (e.g., a direct method or an indirect method) to estimate the bi-static range sum ($R_T+R_R$). In examples (e.g., in a direct method), a bi-static radar receiver may measure a time delay between a direct signal from a transmitter and a signal reflected off the target. The receiver may employ multiple (e.g., two) RF chains (e.g., or beams for directional systems), such as one for the direct (e.g., baseline) signal and one for the reflection/backscatter off the target. A transmitter may use omnidirectional or wide beam transmissions, for example, in which case the transmitter may use a single RF chain. A transmitter may use multiple (e.g., two) simultaneous directional transmissions (e.g., one directed towards the potential target and one directed towards the radar receiver), for example, in which case the transmitter may use multiple (e.g., two) RF chains. A receiver may measure the TDOA between the signal reflected off the target and the direct (e.g., baseline) signal. The receiver may estimate the range sum, for example, in accordance with Eq. (1):

$$(R_T+R_R) = c \cdot \text{TDOA} + L \tag{1}$$

In examples (e.g., in an indirect method), a receiver and a transmitter may be (e.g., assumed to be) synchronized. The receiver may have knowledge of the timestamp corresponding to the transmission. The receiver may measure the time difference between the reception of the signal reflected by the target (e.g., backscatter) and the transmission time. The receiver may estimate the range sum, for example, based on the time difference. A receiver may use a single RF chain, for example, for an indirect method.

Communications hardware may be used for wireless sensing. Wireless chipsets (e.g., in wireless handsets, vehicles, and IoT devices) may be used for wireless sensing, which may enable (e.g., new) classes of services that can be deployed rapidly, e.g., with fast market penetration and little infrastructure expense. Table 1 shows examples of use cases and applications for wireless sensing technologies.

TABLE 1

Examples of use cases and applications for wireless sensing technologies

| Use Case | Applications |
| --- | --- |
| Health Monitoring | Heartbeat Detection |
| | Respiration Rate Monitoring |
| | Sleep Apnea Detection |
| | Fall Detection |
| Gesture Recognition | Human Activity Recognition |
| | Keystroke Detection |
| | Sign Language Recognition |
| | Lip Motion Recognition |
| Context Acquisition | Localization |
| | Direction Finding |
| | Range Estimation |
| Device Authentication | Access Control |
| | Intrusion Detection |
| | Abnormality Detection |

Joint communication and sensing may provide communication devices with RF sensing and radar capabilities. RF sensing and radar capabilities may be built on a common communication framework.

5G technologies and systems may (e.g., be designed to) operate in the upper frequency bands (e.g., in the 28 GHz band and bands above 28 GHz band), which may indicate a convergence of the frequency bands used by different technologies, such as radar and mobile communication systems. Technologies that may jointly handle communications and sensing on the same architecture/platform may be more cost effective and/or may have lower complexity (e.g., compared to multiple independent platforms), for example, given a convergence of frequency bands between radar and mobile communications and the ubiquity of (e.g., consumer) devices with radar capability.

Joint communication and sensing capable nodes may enable/support a broad range of applications, such as indoor sensing, automotive/vehicle to everything (V2X), industrial IoT, and/or real-time radio-environment maps. In examples (e.g., in indoor sensing applications), nodes may detect and monitor physical activity, which may be enhanced with activity classification, for example, to classify human movement, such as posture, fall detection, vitals monitoring (e.g., heartbeat), intrusion detection, and/or the like. In examples (e.g., in automotiveN2X applications), nodes may perform (e.g., simultaneous) radar and V2X communications and/or may perform real-time updates of the environment and/or road maps. In examples (e.g., in industrial IoT applications), deployment (e.g., large scale deployment) of nodes may enable warehouse indoor localization. In examples, real-time radio-environment maps may be built using enhanced communication devices.

A receiver (e.g., in a bi-static radar configuration) may measure a TDOA between a signal reflected off a target, and a direct signal received from a transmitter. The target may be located on an ellipse (e.g., iso-range), for example, with the transmitter and the receiver as the two focal points, e.g., based on the TDOA measurement. Angle of arrival measurements at the receiver or angle of departure information at the transmitter (e.g., together with information of the Tx node and Rx node location) may be used to determine the target location on the iso-range. The accuracy of the target location estimation may depend on multiple factors, including, for example, the location of the target on the iso-range, the accuracy of the TDOA, angle of arrival (AoA or AOA) and angle of departure (AoD or AOD) measurements, and/or the accuracy of the Tx and Rx location information. A target location estimation error may be more sensitive to measurement errors for certain locations of the target on the iso-range.

Nodes of mobile wireless communication systems (e.g., BS/gNB/eNB/AP and WTRU/STA) may (e.g., implicitly) form bi-static or multi-static configurations with potential targets. Nodes of mobile wireless communication systems may be used to enable target localization applications. For example, downlink transmissions from a BS/gNB/eNB/AP node to one or more WTRU/STA nodes may be viewed as bi-static/multi-static configurations that may be used to detect or localize potential targets. Uplink transmissions from a WTRU/STA to the BS/eNB/gNB/AP and/or sidelink transmissions from a WTRU to other WTRU(s) may (e.g., also) be used as bi-static configurations for target localization purposes. Not all bi-static configurations may be used effectively for target localization (e.g., some configurations may result in inaccurate location estimates), for example, based on relative locations of nodes (BS/eNB/gNB/AP and WTRU/STAs) and of the potential target and/or based on measurement errors (e.g., TDOA, AoA, AoD).

Target localization accuracy may be achieved, for example, based on a determination about which nodes of a wireless network to use in bi-static/multi-static configurations and/or selection of a bi-static/multi-static configuration (e.g., preferred bi-static/multi-static configuration). Nodes may be configured for bi-static/multi-static measurements. Measurements from multiple bi-static configurations may be combined to determine a target location.

Target Localization may include determining the position of a target (e.g., object, human, vehicle, WTRU, etc.).

Selection of a bi-static configuration may include selection of two nodes to perform bi-static measurements and/or a determination about which one of the two nodes will be the transmitter (e.g., transmitter of a signal/reference signal), for example, to perform target detection/localization. The other node may be the receiver. The receiver may measure and decode the signal transmitted by the transmit node, for example, to perform a target detection/localization. Selection of a bi-static configuration may include (e.g., for a given node, such as a first node) selection of another node (e.g., second node) to form a bi-static configuration with the first node. Selection of a bi-static configuration may include (e.g., for a given node, such as a first node) determining which node (e.g., first node or second node) may be a transmitter (e.g., transmitter of a signal/reference signal) and/or which node may be a receiver.

Selection of a multi-static configuration may include selection of two or more nodes to perform multi-static measurements and/or determining which one or more nodes may be the transmitter, e.g., transmitter of a signal/reference signal (e.g., to perform a target detection/localization). Other nodes (e.g., node(s) that are not selected as a transmitter) may be the receiver. The receiver may measure/decode the signal transmitted by the one or more transmit nodes (e.g., to perform a target detection/localization). Selection of a multi-static configuration may include (e.g., for a given node, such as a first node) selection of one or more other nodes (e.g., second node, third node, etc.) to form a multi-static configuration with the first node. Selection of a multi-static configuration may include (e.g., for a given node, such as a first node) determining which one or more nodes (e.g., first node, second node, and/or third node, etc.) may be the transmitter (e.g., transmitter of a signal/reference signal) and/or which node(s) may be a receiver, for example, to enable multi-static measurements.

Initial bi/multi-static measurements may include bi/multi-static measurements performed with initial selection of a bi/multi-static configuration.

Additional bi/multi-static measurements may include bi/multi-static measurements performed with a subset of nodes selected for initial bi/multi-static measurements. A transmitter/receiver may be selected (e.g., from among the nodes selected for additional bi/multi-static measurements) to perform (e.g., additional) bi/multi-static measurements. Selection of the transmitter/receiver for additional bi/multi-static measurements may be different from the selection of the transmitter/receiver in the initial bi/multi-static measurements.

A JCS reference signal (JCS-RS) may include reference signals used for sensing (e.g., localization, detection of objects in proximity). A JCS-RS may be used for joint communications and sensing or may be dedicated for sensing. One or more reference signals (e.g., a demodulation RS (DMRS), a sounding RS (SRS), etc.) may (e.g., additionally and/or alternatively) be used as JCS-RSs.

Target localization may be network-assisted. In examples (e.g., in network-assisted target localization), a configuration of initial bi/multi-static measurements for a WTRU (e.g., a requesting WTRU) may be performed by the network (e.g., serving gNB of the requesting WTRU). Network-assisted target localization may include selection of WTRUs and a resource configuration (e.g., over an NR/LTE PC5 interface using sidelink mode 1), e.g., to perform the initial bi/multi-static measurements with the requesting WTRU.

Target localization may be network-controlled. In examples (e.g., in network-controlled target localization), a configuration of initial and additional bi/multi-static measurements for a WTRU (e.g., a requesting WTRU) may be performed by the network (e.g., serving gNB of the requesting WTRU). The configuration of the initial bi/multi-static measurements may include selection of WTRUs and a resource configuration (e.g., over an NR/LTE PC5 interface using sidelink mode 1), e.g., to perform initial bi/multi-static measurements with the requesting WTRU. A configuration of additional bi/multi-static measurements may include a resource configuration (e.g., over an NR/LTE PC5 interface using sidelink mode 1), for example, to enable additional bi/multi-static measurements for the requesting WTRU.

Support WTRUs may include (e.g., for a given WTRU, such as a first WTRU) a set of WTRUs (e.g., second WTRU, third WTRU, etc.) that may be selected to enable bi/multi-static measurements (e.g., initial and/or additional bi/multi-static measurements) with the given WTRU (e.g., to perform a target detection/localization).

A WTRU (e.g., a first WTRU), such as a WTRU's MAC entity, may (e.g., determine to) perform target localization (e.g., determine locations of one or more targets), for example, in one or more directions and ranges. A WTRU may perform target localization, for example, based on a request (e.g., from upper layers), e.g., a sensing-based application at a WTRU may trigger a request to perform sensing.

A WTRU (e.g., a first WTRU) may, e.g., alternatively, (e.g., determine to) perform target localization (e.g., in one or more directions and ranges), for example, based on a configuration from a network (e.g., gNB). A WTRU (e.g., the first WTRU) may be configured with timing of localization or sensing, which may include, for example, periodicity, start/stop times and/or a set of time units (e.g., slot/subframe/frame numbers). Timing configuration information of localization or sensing may be communicated to a WTRU (e.g., the first WTRU).

WTRU-autonomous target localization may be performed, for example, using WTRU-to-WTRU bi/multi-static measurements. A WTRU (e.g., first WTRU) may determine locations of one or more targets, for example, by enabling one or more bi-static or multi-static configurations and measurements with a set of WTRUs (e.g., one or more neighboring WTRUs). WTRU-autonomous examples may include the first WTRU enabling bi/multi-static configurations and measurements, for example, over an NR/LTE PC5 interface using sidelink mode 2 (e.g., WTRU-autonomous) based resource allocation. PC5 interface and sidelink may be used interchangeably herein.

Figure 6:
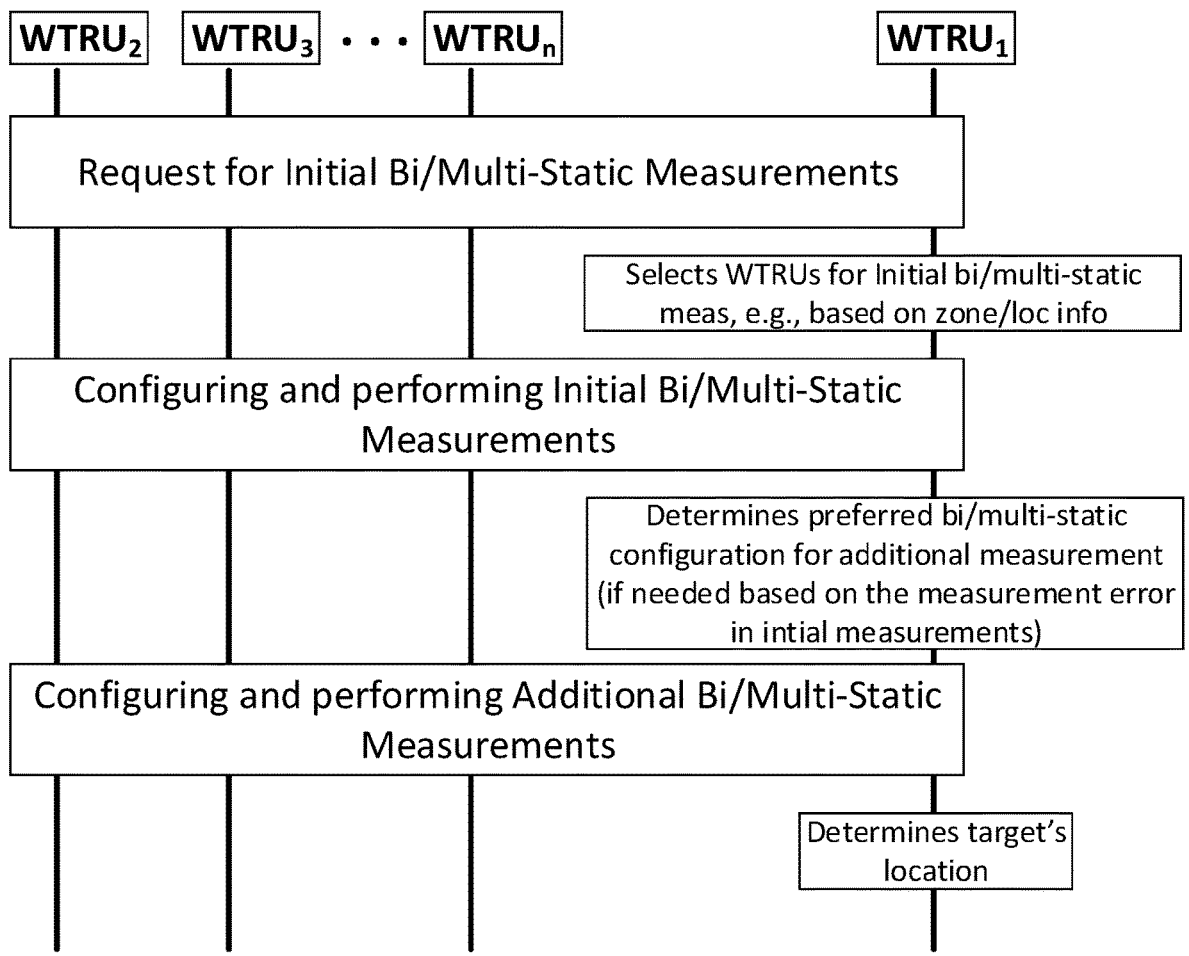
FIG. 6 illustrates an example of a WTRU-autonomous procedure for enabling WTRU-to-WTRU bi/multi-static measurements for target localization.

FIG. 6 illustrates an example of a WTRU-autonomous procedure for enabling WTRU-to-WTRU bi/multi-static measurements for target localization. In examples (e.g., as shown in FIG. 6), the first WTRU (e.g., WTRU$_1$) may perform (e.g., initially perform) a procedure to select (e.g., determine) one or more support WTRUs (e.g., a first subset of support WTRUs, which may include a second WTRU, third WTRU, etc.) for bi/multi-static measurements (e.g., initial bi/multi-static measurements). Initial bi/multi-static measurements may be performed using the selected support WTRUs. The first WTRU (e.g., WTRU$_1$) may determine a second configuration of support WTRUs, for example a preferred configuration of support WTRUs (e.g., a second subset of support WTRUs that is preferred based on the initial bi/multi-static measurements, where the preferred second subset of support WTRUs is the same or smaller than the first subset of support WTRUs) for additional bi/multi-static measurements. Additional bi/multi-static measurements may be performed, for example, using the preferred configuration (e.g., second subset of support WTRUs) selected by the first WTRU. Target localization may be performed, for example, using the measurements available from the additional and/or initial bi/multi-static measurements. Examples of signaling messages and examples of the procedures shown in FIG. 6 are provided herein.

Figure 7:
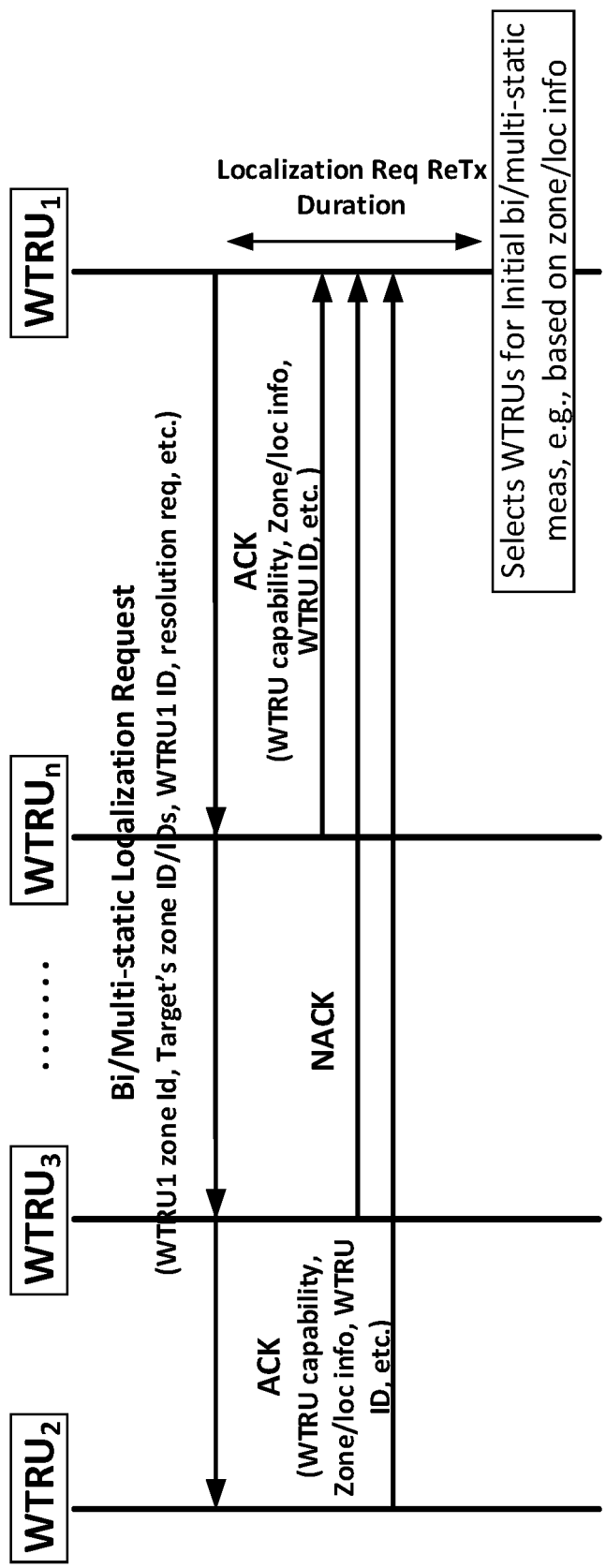
FIG. 7 illustrates an example of a WTRU selection procedure for initial bi/multi-static measurements.

FIG. 7 illustrates an example of a WTRU selection procedure for initial bi/multi-static measurements. The first WTRU (e.g., WTRU$_1$) may send a request (e.g., a bi/multi-static localization request) to a set of WTRUs (e.g., one or more neighboring WTRUs), for example, to request the set of WTRUs (e.g., neighboring WTRU(s)) to participate in bi/multi-static measurements with the first WTRU (e.g., to determine a location of a target). The bi/multi-static localization request message may include, for example, one or more of the following parameters.

A bi/multi-static localization request message may include, for example, a zone identifier (ID) of the first WTRU or location information (e.g., geodesic distance in longitude and latitude between a WTRU's current location and geographical coordinates (e.g., 0,0)) of the first WTRU.

A bi/multi-static localization request message may include, for example, one or more potential zone IDs and/or direction and range estimates for a target to be localized. A direction (e.g., a potential estimated direction) in which the target may reside may be communicated. A direction may correspond to the relative direction with respect to the first WTRU's own reference (e.g., relative to the angle of arrival (AoA) of the serving gNB's downlink synchronization signal (SS)/physical broadcast channel (PBCH) block selected by the first WTRU), for example, if the direction (e.g., potential estimated direction) in which the target may reside is communicated. The relative direction may be determined, for example, in terms of azimuth (e.g., horizontal) and elevation (e.g., vertical) angles relative to the angle of arrival of the selected downlink SS/PBCH block (e.g., in terms of angular units, such as degrees, minutes, seconds). The direction may (e.g., alternatively) correspond to an absolute direction (e.g., in terms of degrees, minutes, seconds) with respect to a global reference (e.g., compass bearing), or may correspond to a named directions (e.g., north, south-east, etc.). A range may be communicated. A range may be indicated, for example, with respect to the first WTRU's location in which the target may reside.

A bi/multi-static localization request message may include, for example, a WTRU identity of the first WTRU (e.g., a WTRU ID that may be used to uniquely identify the first WTRU over a PC5 unicast interface or sidelink). One or more identities may be defined for WTRUs for target localization or sensing service over sidelink.

A bi/multi-static localization request message may include, for example, one or more resolution parameters, conditions, thresholds and/or the like (e.g., high resolution, low resolution, etc.) for a target localization. A resolution or resolution level may be considered, for example, in terms of range (e.g., range resolution), temporal resolution, and/or spatial resolution. Range resolution may refer to a minimum distance between two targets that can be supported so that the targets can be distinguished. Temporal resolution may refer to a minimum time interval to detect change, e.g., object movement. Spatial resolution may refer to a size of a minimum detectable object.

The first WTRU may use sidelink mode 2 for resource selection (e.g., to transmit a bi/multi-static localization request message). A bi/multi-static localization request message may be sent to the one or more WTRUs, for example, using broadcast, groupcast, and/or unicast transmissions. WTRU IDs may be communicated to the first WTRU, for example, to enable broadcast, groupcast, and/or unicast communication using sidelink for target localization or sensing service.

A bi/multi-static localization request message may be sent using a sidelink control channel (e.g., physical sidelink control channel (PSCCH)), for example, as sidelink control information (SCI). One or more SCI formats may be defined/configured for a bi/multi-static localization request message. A bi/multi-static localization request message may (e.g., alternatively) be sent using a sidelink shared channel (e.g., physical sidelink shared channel (PSCCH)). Decoding information (e.g., resource allocation, modulation/coding scheme, etc.) of a sidelink shared channel carrying a bi/multi-static localization request message may be sent, for example, using an SCI (e.g., a dedicated SCI or multipurpose SCI, such as, SCI 0_1 or SCI 0_2, with one or more identifiers to indicate that a transmission is intended for a bi/multi-static localization request message).

The first WTRU may (e.g., after sending the bi/multi-static localization request message) monitor (e.g., the configured resources for sidelink mode 2) for/receive a response (e.g., a bi/multi-static localization response), such as an acknowledged (ACK) or not acknowledged (NACK) response, from a set of WTRUs (e.g., one or more neighboring WTRUs).

A maximum monitoring duration (e.g., a localization request retransmission duration (LRRD)) may be defined. An LRRD may refer to a maximum duration (e.g., after sending a bi/multi-static localization request message) during which the first WTRU may monitor for one or more localization responses. The value of the maximum monitoring duration (e.g., LRRD) may be determined by the first WTRU. The value of the maximum monitoring duration (e.g., LRRD) may be included in a bi/multi-static localization request message, for example, to communicate the value to the set of WTRUs (e.g., neighboring WTRUs) to which the bi/multi-static localization request message is sent. The value of the maximum monitoring duration (e.g., LRRD) may (e.g., alternatively) be pre-configured/provided to the WTRUs (e.g., by the network or a gNB).

WTRU(s) (e.g., a second WTRU) may transmit a localization response (e.g., an ACK localization response), for example, if the second WTRU agrees to participate in the bi/multi-static measurements with the first WTRU. A localization response (e.g., an ACK localization response) may include one or more parameters that may be associated with the second WTRU, such as one or more of a zone ID or location information, a WTRU ID (e.g., a WTRU ID that may be used to uniquely identify the second WTRU over the PC5 unicast interface), WTRU capability information (e.g., WTRU's location estimation error, beamforming capability, and/or maximum bandwidth can be supported over the sidelink), etc.

A NACK localization response may be received from a WTRU (e.g., third WTRU). The third WTRU may send a NACK localization response to the first WTRU, for example, if the third WTRU does not agree to participate in the bi/multi-static measurements with the first WTRU. The third WTRU may send a NACK localization response to the first WTRU, for example, if the third WTRU does not want to share its zone/location information, and/or capabilities (e.g., WTRU's location estimation error, beamforming capability, and/or maximum bandwidth that can be supported over the sidelink) with the first WTRU.

In examples, the resources for a localization response (e.g., ACK/NACK) may be configured so that one or more dedicated sidelink resources may be associated with a (e.g., each) bi/multi-static localization request message. Mapping between resources used for a bi/multi-static localization request message and the associated resources for a localization response (e.g., ACK/NACK) may be communicated/signaled to the WTRUs by the network. In examples, a localization response may be sent by selecting (e.g., new) resources (e.g., independent of the resources used for a bi/multi-static localization request message) configured for sidelink mode 2.

A localization response (e.g., ACK/NACK) may be sent using a sidelink control channel, e.g., as an SCI over a PSCCH. An SCI may be defined/configured for a localization response. A localization response may (e.g., alternatively and/or additionally) be sent using a sidelink shared channel, e.g., PSSCH. Decoding information for a sidelink shared channel may be carried using a SCI over a PSCCH.

Information for the second WTRU (e.g., location information, WTRU ID, capability, etc.) may be carried over the PSSCH, for example, for an ACK localization response. An associated SCI may be sent over a PSCCH to indicate the ACK and the decoding information of the PSSCH. A NACK may be provided (e.g., only) by an SCI over a PSSCH indicating NACK.

The first WTRU may re-send a bi/multi-static localization request message to a set of WTRUs (e.g., one or more neighboring WTRUs), for example, if/when the first WTRU does not receive one or more ACK localization responses after monitoring for one or more localization responses over the maximum monitoring duration (e.g., LRRD). A transmission at a later time (e.g., re-transmission) may be, for example, at a higher power (e.g., limited to a maximum power), with a different spatial domain transmission filter (e.g., Tx beam), and/or with a greater number of Tx beams (e.g., compared to a previous transmission).

The first WTRU may monitor for one or more localization responses over the maximum monitoring duration. The first WTRU may determine the configuration for initial bi/multi-static measurements, for example, if the first WTRU receives one or more ACK localization responses (e.g., after monitoring for one or more localization responses over the maximum monitoring duration). The first WTRU may select one or more support WTRUs (e.g., out of the WTRUs from which ACK localization responses are received), for example, for initial bi/multi-static measurements. In examples, the first WTRU may select WTRUs (e.g., all the WTRUs) from which ACK localization responses are received as support WTRUs, for example, to perform initial bi/multi-static measurements with the first WTRU.

In examples, the determination/selection of initial support WTRU(s) (e.g., which may comprise the second WTRU) for initial bi/multi-static measurements may be performed (e.g., by the first WTRU) using, for example, the geographic information (e.g., location or zone information) of the second WTRU, first WTRU, and the target (e.g., estimated one or more zones, e.g., rough location/region, where the target may be located). The first WTRU may select one or more initial support WTRUs (e.g., second WTRU, third WTRU, . . . , nth WTRU, etc.) that may form a (e.g., good) bi-static configuration with the first WTRU (e.g., a first subset of WTRUs) to detect a target in the given potential target's zone/zones, for example, if the zone(s) (e.g., or rough location/region) of the target(s) is/are known. The first WTRU may use the geographic information of the WTRUs that sent a localization response (e.g., an ACK localization response), geographic information of the first WTRU, and/or geographic information of the target to refrain from selecting (e.g., not select) WTRUs as support WTRUs, for example, if selection of the WTRUs may form bi-static geometries that may incur significant measurement errors (e.g., in TDOA or AOA, etc.). Examples are described with respect to FIG. 8.

Figure 8:
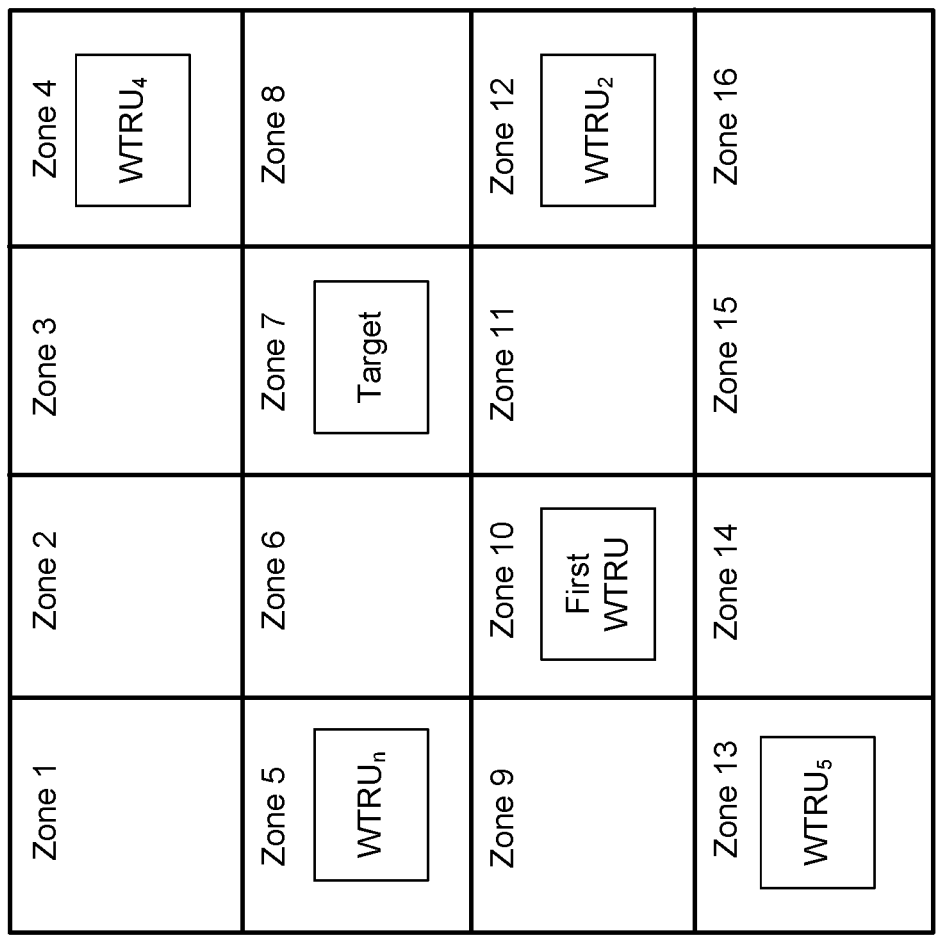
FIG. 8 illustrates example locations of a first WTRU, other WTRUs, and a target.

FIG. 8 illustrates example locations of a first WTRU, other WTRUs, and a target. In examples (e.g., as shown in FIG. 8), a first WTRU may refrain from selecting (e.g., not select) WTRU$_5$ to form bi-static geometry with the first WTRU (e.g., to detect a target in zone 7), for example, if/when the first WTRU is the Tx for the bi-static measurements. The target location estimation may be based on the reflected signal from the target at WTRU$_5$, which may not be detected due to (e.g., significant) interference from the direct signal from the first WTRU. In examples, the first WTRU may refrain from selecting (e.g., not select) WTRU$_4$ to form bi-static geometry with the first WTRU (e.g., to detect a target in zone 7), for example, if the bi-static geometry is a forward scatter geometry, which may result in difficulty estimating both range and Doppler. The first WTRU may, for example, select WTRU$_2$ and/or WTRU$_n$ to form bi/multi-static configuration with the first WTRU (e.g., to detect the target in the zone 7).

Selection of a support WTRU (e.g., second WTRU) for initial bi/multi-static measurements may (e.g., additionally and/or alternatively) be determined, for example, based on the location estimation error of the second WTRU. The location estimation error may be shared by the second WTRU (e.g., within the ACK localization response). The first WTRU may select the second WTRU as a support WTRU, for example, if the associated location estimation error is below a threshold, which may be communicated/signaled to the first WTRU (e.g., by the network). Location error may (e.g., additionally and/or alternatively) be based on the zone size and/or the information shared by the second WTRU (e.g., zone ID vs geographic location). The first WTRU may refrain from selecting (e.g., not select) the second WTRU for initial bi/multi-static measurements, for example, if the second WTRU sends its zone ID (e.g., does not share its geographic location) to the first WTRU and the size of a zone is large (e.g., where zone size may be communicated/signaled by the network), which may indicate that the location error of the second WTRU may be large.

The first WTRU may re-send the bi/multi-static localization request message to a set of WTRUs (e.g., one or more neighboring WTRUs), for example, if the first WTRU refrains from selecting (e.g., does not select) one or more support WTRUs for initial (e.g., first) bi/multi-static measurements. The transmission at the later time (e.g., re-transmission) may be, for example, at a higher power (e.g., limited to a maximum power), with a different spatial domain transmission filter (e.g., Tx beam), and/or with a greater number of Tx beams (e.g., compared to a previous transmission).

Figure 9:
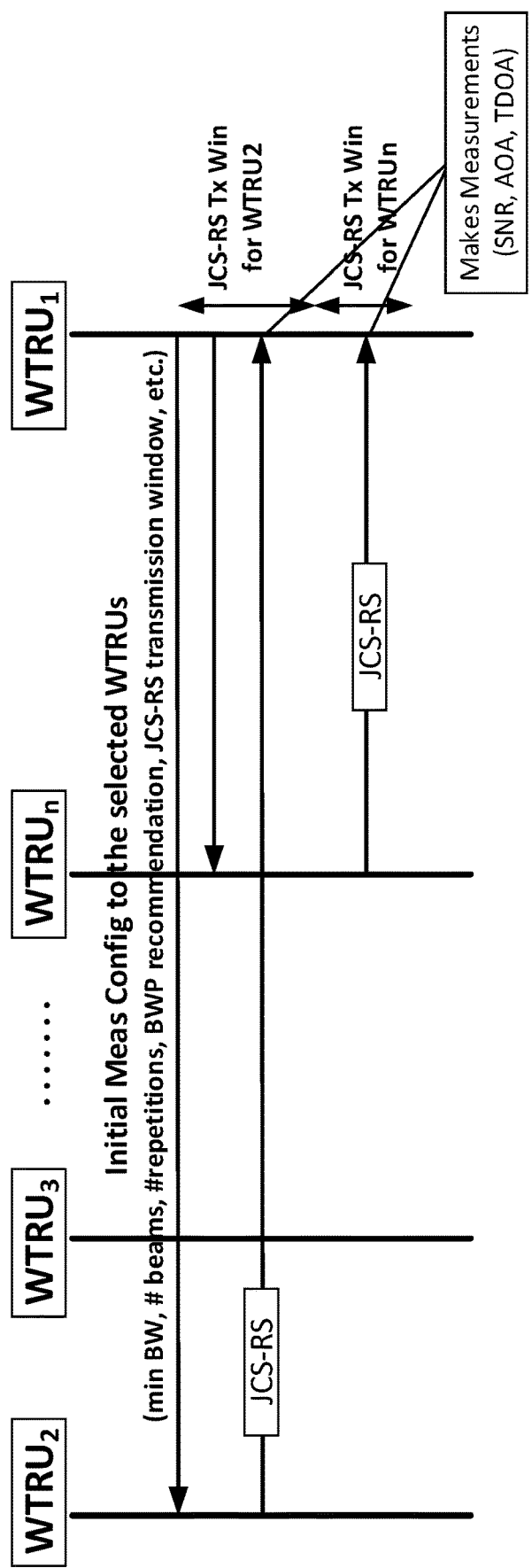
FIG. 9 illustrates an example of a WTRU procedure for initial bi/multi-static configuration and measurements.

FIG. 9 illustrates an example of a WTRU procedure for initial bi/multi-static configuration and measurements. In examples (e.g., as shown in FIG. 9), the first WTRU (e.g., WTRU$_1$) may send (e.g., via a message) configuration information (e.g., initial measurement configuration information) to the selected support WTRUs (e.g., second WTRU, nth WTRU, etc.) for initial bi/multi-static measurements, for example, to configure the selected WTRUs to perform initial bi/multi-static measurements with the first WTRU. The message (e.g., initial measurement configuration message) may be sent, for example, using the resource(s) configured for sidelink mode 2.

An initial measurement configuration message sent to a first subset of WTRU(s) (e.g., selected support WTRU(s) which may comprise the second WTRU) may include, for example, one or more parameters to be used for reference signal transmissions (e.g., JCS-RS transmissions) from the selected support WTRU(s) (e.g., second WTRU), such as a minimum bandwidth, a number of Tx-beams (e.g., a number of beams/direction towards the target over which the JCS-RS transmission may be performed by the second WTRU), a number of repetitions in a (e.g., each) beam/direction (e.g., a number of times a JCS-RS transmission may be repeated in a/each direction, for example, to increase the detection rate), a bandwidth part (BWP) recommendation, a JCS-RS transmission window, etc.

In examples, the first WTRU may configure a transmission window duration (e.g., JCS-RS transmission window duration) for a (e.g., each) selected support WTRU (e.g., second WTRU) for initial bi/multi-static measurements. The selected support WTRU (e.g., second WTRU) may transmit a reference signal (e.g., JCS-RS) within the configured transmission window duration (e.g., JCS-RS transmission window duration). A transmission window duration (e.g., JCS-RS transmission window duration) may be defined with respect to the transmission of an initial measurement configuration message. A transmission window duration (e.g., JCS-RS transmission window) may be defined/configured, for example, by a start time (e.g., a time offset with respect to the reception time of an initial measurement configuration message) and an end time or duration (e.g., with respect to the start time). Separate transmission window durations (e.g., JCS-RS transmission window durations) may be configured for a (e.g., each) selected support WTRU for initial bi/multi-static measurements, for example, to orthogonalize the reference signal (e.g., JCS-RS) transmission among the selected support WTRUs. The value of a transmission window duration (e.g., JCS-RS transmission window duration) may be communicated to a (e.g., each) selected support WTRU within the initial measurement configuration message.

In examples, a common maximum monitoring duration (e.g., initial measurement configuration Retransmission Duration (IMCRD)) may be defined for (e.g., all) the selected support WTRUs. A maximum monitoring duration may refer to the maximum duration over which the first WTRU may monitor for reference signals (e.g., JCS-RSs) from one or more selected support WTRUs for initial bi/multi-static measurements. The value of the maximum monitoring duration (e.g., IMCRD) may be determined by the first WTRU. The value of the maximum monitoring duration (e.g., IMCRD) may be included in the initial measurement configuration message to the selected support WTRUs to which the initial measurement configuration message is sent. The value of the maximum monitoring duration (e.g., IMCRD) may (e.g., alternatively and/or additionally) be pre-configured to the WTRUs by the network or a gNB.

The first WTRU may indicate one or more BWP recommendations for reference signal (e.g., JCS-RS) transmission for a (e.g., each) selected support WTRU for initial bi/multi-static measurements. The selected support WTRU (e.g., second WTRU) may select the resources over the recommended BWP/BWPs from the first WTRU to transmit a reference signal (e.g., JCS-RS). Different (e.g., separate) BWPs may be configured for each of the selected support WTRUs for initial bi/multi-static measurements, for example, to orthogonalize the reference signal (e.g., JCS-RS) transmission among the selected support WTRUs. Bandwidth part information may be communicated to a (e.g., each) selected support WTRU within an initial measurement configuration message.

The first WTRU may send an initial measurement configuration message via a unicast transmission to a (e.g., each) selected support WTRU (e.g., second WTRU, etc.), for example, using the WTRU-ID information of the selected support WTRU (e.g., received in the ACK localization response from the selected support WTRU). A first WTRU may (e.g., alternatively and/or additionally) send the initial measurement configuration message via a groupcast or a broadcast transmission. The initial measurement configuration message may include the WTRU IDs of the selected support WTRUs, for example, along with WTRU-specific parameters (if any), such as a BWP recommendation, JCS-RS transmission window, etc. The initial measurement configuration message may be sent using a sidelink control channel (e.g., PSCCH), for example, as sidelink control information. One or more SCI formats may be defined/configured for this an initial measurement configuration message. An initial measurement configuration message may be sent, for example, using a sidelink shared channel (e.g., PSSCH). An SCI (e.g., a dedicated SCI or multipurpose SCI, such as SCI 0_1 or SCI 0_2 with one or more identifiers to indicate that the transmission is intended for an initial measurement configuration message) may be used to send the decoding information (e.g., resource allocation, modulation/coding scheme, etc.) of the sidelink shared channel carrying the initial measurement configuration message.

The initial measurement configuration message may be sent to the selected support WTRUs for initial bi/multi-static measurements. The first WTRU may monitor for the JCS-RS transmissions from each of the selected support WTRUs. The first WTRU may monitor for JCS-RS transmission, for example, on resources that may be configured for sidelink mode 2, during/within the associated JCS-RS transmission windows (if any), and/or on the recommended BWP/BWPs (if any).

A JCS-RS transmission from a selected support WTRU (e.g., second WTRU) may be performed, for example, via unicast transmission to the first WTRU. The WTRU ID of the first WTRU may be found in the bi/multi-static localization request. The JCS-RS transmission from the second WTRU may be performed, for example, using the configuration information (e.g., configuration requirements) given in the initial measurement configuration message. The JCS-RS transmission from the second WTRU may be performed, for example, over the sidelink shared channel, e.g., PSSCH. An associated SCI may be sent (e.g. first) over a sidelink control channel (e.g., PSCCH), for example, carrying the decoding information of the PSSCH. Fields or identifiers in an (e.g., multipurpose) SCI (e.g., SCI 0_1 or SCI 0_2) or a dedicated SCI may be defined/configured to indicate that the associated transmission over the PSSCH includes JCS-RSs.

A selected support WTRU that transmits JCS-RS for bi/multi-static measurements (e.g., second WTRU) may transmit JCS-RS in multiple (e.g., two) different directions, such as a first direction towards the first WTRU (e.g., baseline direction) and a second direction towards the potential target. The second WTRU may perform JCS-RS transmissions in multiple directions for the direction towards the potential target, for example, based on the parameters configured in initial measurement configuration (e.g., number of beams, number of repetitions in each beam). The second WTRU may transmit JCS-RS in multiple directions simultaneously or in time-division multiplexed fashion (e.g., a transmission over two different beams may be separated in time). In examples of time-division multiplexed transmissions over multiple directions, a time offset between two consecutive transmissions (e.g., corresponding to two different directions) may be communicated to the second WTRU (e.g., in initial measurement configuration information). In examples, the second WTRU may transmit JCS-RSs over a wide beam, for example, so that the transmission (e.g., main-lobe of the beam) may be directed to the target and the first WTRU. In examples, the second WTRU may transmit JCS-RS omni-directionally.

The first WTRU may make measurements, for example, associated with (e.g., based on or in response to) reception of JCS-RS from the first subset of WTRU(s) (e.g., selected WTRU(s) such as the second WTRU). The first WTRU may perform bi-static measurements over the JCS-RS transmitted by the second WTRU. The first WTRU may make measurements in two directions (e.g., using the two Rx beams), such as a measurement in the direction of the second WTRU (e.g., baseline direction), and another measurement in the direction of the potential target to be localized. The direction towards the second WTRU may be determined, for example, using the location or zone information of the second WTRU (e.g., received in an ACK localization response form the second WTRU) and the location of the first WTRU. The first WTRU may (e.g., for the direction towards the potential target) perform multiple measurements in multiple directions (e.g., beam scanning around the direction towards the target). Measurements may use parameters (e.g., number of beams, number of repetitions in each beam) that may be configured (e.g., via initial measurement configuration information) to the second WTRU. In examples, the first WTRU may make measurements over a wide beam, for example, so that the transmission from the baseline and the transmission reflected off the target may be listened for/received over the same Rx beam. In examples, the first WTRU may make measurements omni-directionally.

Figure 10:
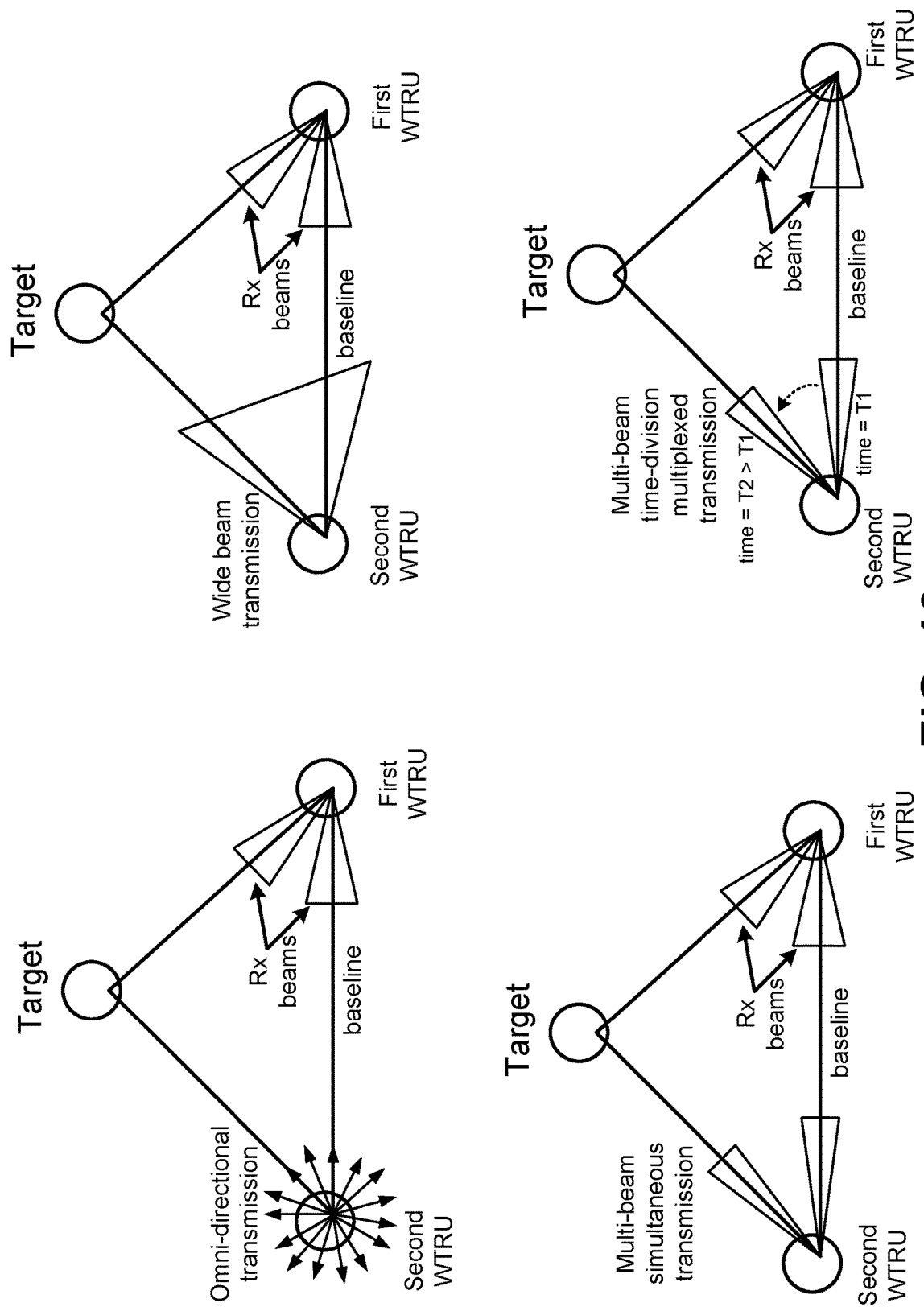
FIG. 10 illustrates examples of performing bi-static measurements based on JCS-RS transmissions from a second WTRU and reception at a first WTRU.

FIG. 10 illustrates examples of performing bi-static measurements based on JCS-RS transmissions from a second WTRU and reception at a first WTRU. In examples (e.g., as shown in FIG. the second WTRU may transmit JCS-RSs using one or more of the following transmission techniques: omni-directional transmission, wide beam transmission (e.g., covering both baseline and the direction towards the target), simultaneous multi-beam transmission (e.g., one beam towards the baseline and another beam towards the target), and/or a time-division multiplexed multi-beam transmission (e.g., one beam towards the baseline and another beam towards the target). In examples (e.g., as shown in FIG. the first WTRU may (e.g., regardless of transmission technique) make bi-static measurements using two beams (e.g., one beam towards the second WTRU to measure the TOA of the signal from the baseline direction and another beam towards the target to measure the TOA and the AOA of the reflected signal from the target).

The first WTRU may use the JCS-RS received from the first subset of WTRUs (e.g., the second WTRU) to measure one or more of the following quantities: an AOA associated with the reflection off the target, a TDOA between the baseline and the reflection off the target, and/or a signal to noise ratio (SNR) for the received JCS-RS. An AOA associated with the reflection off the target may be based on a JCS-RS received from the direction of the potential target. The AOA may be measured with a reference direction, for example, with respect to a global reference, e.g., compass bearing. An AOA may be measured, for example, with respect to the latitude between the first WTRU's location and the geographical co-ordinates (0,0) or with respect to the longitude between the first WTRU's location and the geographical co-ordinates (0,0). A baseline for a TDOA measurement may be based on a JCS-RS received from the direction of the second WTRU, and the reflection off the target for the TDOA measurement may be based on a JCS-RS received from the direction of the potential target. An SNR measurement for a received JCS-RS may be based on the baseline direction. An SNR measurement for a received JCS-RS may be based on the reflection off the target.

The first WTRU may perform target location estimation (e.g., initial estimation) for the JCS-RS receptions from each of the WTRUs in the first subset of WTRUs (e.g., for initial bi/multi-static measurements), for example, using the AOA measurement, TDOA measurement, and/or the location of the first WTRU. In examples, the distance between the first WTRU and the second WTRU may be L, and the location of the first WTRU may be $(x_1, y_1)$. The first WTRU may use the received JCS-RS transmitted by a selected WTRU (e.g., second WTRU) during the initial bi/multi-static measurements, for example, to measure $\theta$ (e.g., an AOA measurement) and $\Delta T$ (e.g., a TDOA measurement). The first WTRU may calculate the target location, for example, in accordance with Eq. (2):

$$(x_1 - R_R \sin\theta, \ y_1 + R_R \cos\theta), \text{ where, } R_R = \frac{c^2 \Delta T^2 + 2cL\Delta T}{2((c\Delta T + L) - L\sin\theta)} \quad (2)$$

where c, the speed of light, may be equal to $3 \times 10^8$ m/sec.

The first WTRU may re-send an initial measurement configuration message, for example, if/when the first WTRU does not receive JCS-RSs from one or more selected support WTRUs after monitoring for JCS-RSs over the maximum monitoring duration (e.g., IMCRD) or over the JCS-RS transmission window durations that may be associated with one or more selected support WTRUs for initial bi/multi-static measurements. A transmission at a later time (e.g., re-transmission) may be, for example, at a higher power (e.g., limited to a maximum power).

Figure 11:
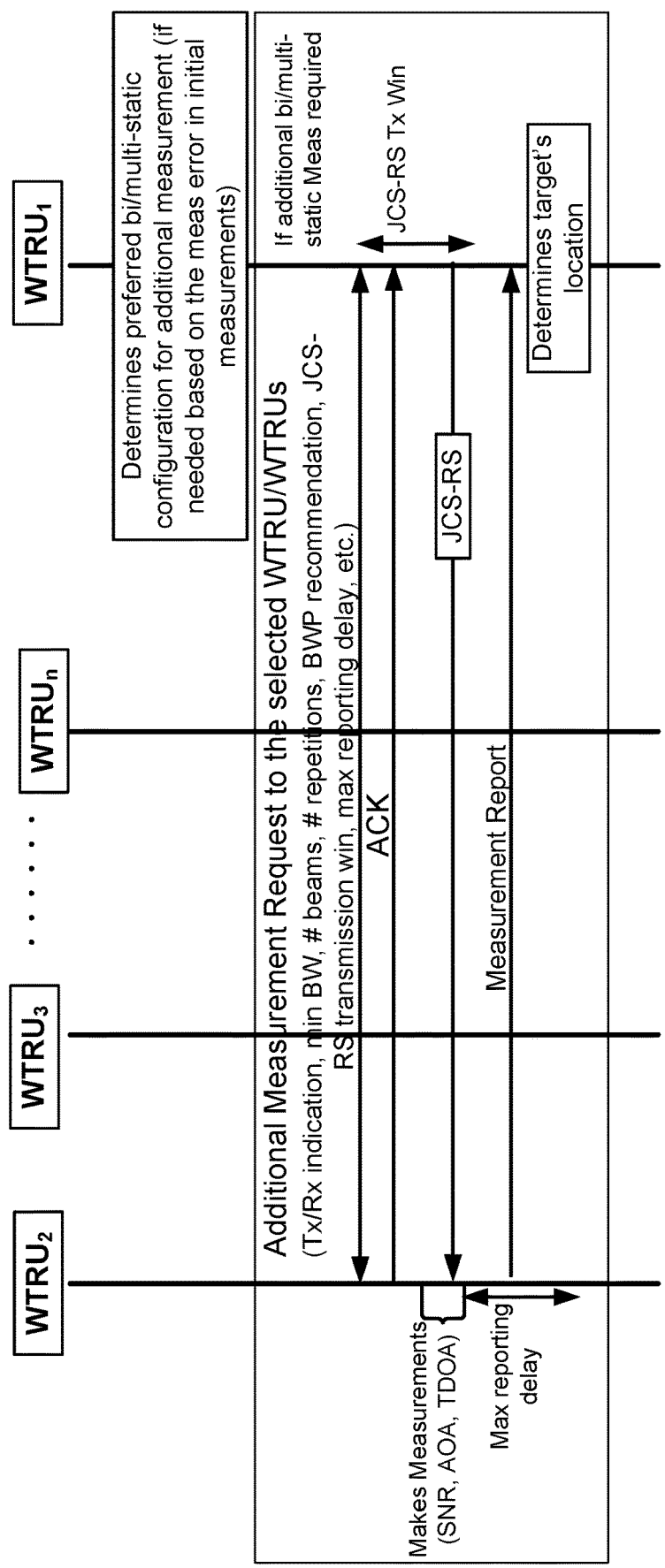
FIG. 11 illustrates an example of a WTRU procedure to enable additional bi/multi-static configurations and measurements.

FIG. 11 illustrates an example of a WTRU procedure to enable additional bi/multi-static configurations and measurements. FIG. 11 shows an example of a WTRU procedure to enable WTRU-autonomous additional bi/multi-static measurements. Examples are provided for the procedure shown in FIG. 11.

A procedure may determine whether to make additional bi/multi-static measurements. The first WTRU may determine whether to perform additional bi/multi-static measurements with a set of WTRUs (e.g., one or more of its neighboring WTRUs). The first WTRU may (e.g., determine whether to) perform additional bi/multi-static measurements with one or more of the WTRUs with which the initial bi/multi-static measurements were performed.

The first WTRU may determine whether to perform additional bi/multi-static measurements, for example, based on the initial bi/multi-static measurements. Additional bi/multi-static measurements may be performed, for example, to reduce/lower a measurement error in initial bi/multi-static measurements (e.g., a measurement error in the target's location estimation error that may be associated with measurements errors in AOA, TDOA measurements). The first WTRU may measure the target location estimation error with each of the initial bi/multi-static measurements. The first WTRU may determine the associated error in AOA measurements (e.g., higher SNR value may provide lower AOA measurement error, better beamforming capability may reduce AOA measurements errors), for example, based on the SNR measurements with a selected support WTRU's initial bi/multi-static measurements, the selected support WTRU's beamforming capability, and/or the first WTRU's beamforming capability. The first WTRU may determine an associated error in TDOA, for example, based on the bandwidth used for the initial JCS-RS transmissions by a selected support WTRU (e.g., large bandwidth may provide lower TDOA estimation errors) and/or based on the SNR measurement (e.g., high SNR may provide lower TDOA estimation errors). An error in target location estimation may be determined for each of the initial bi/multi-static measurements, for example, using the errors in AOA and TDOA measurements.

The first WTRU may (e.g., determine to) re-initiate the WTRU selection procedure for initial bi/multi-static measurements, for example, if the first WTRU determines that none of the configurations selected in initial bi/multi-static measurements are suitable (e.g., good) for the target localization. The first WTRU may (e.g., determine to) re-initiate the WTRU selection procedure for initial bi/multi-static measurements, for example, if, the target location estimation error derived from the initial bi/multi-static measurements is above a first threshold (e.g., a maximum location estimation error threshold). The transmission of a bi/multi-static localization request message at the later time (e.g., re-transmission) may be, for example, at a higher power (e.g., limited to a maximum power), with a different spatial domain transmission filter (e.g., Tx beam), and/or with a greater number of Tx beams (e.g., compared to a previous transmission of a bi/multi-static localization request message). The value of the maximum location estimation error threshold may be communicated/signaled to the first WTRU, for example, by the network.

The first WTRU may (e.g., determine to) perform additional bi/multi-static measurements, for example, if the target location estimation error derived from the initial bi/multi-static measurements is below the maximum location estimation error threshold, but above a second threshold (e.g., a location estimation error threshold, such as a required location estimation error threshold). The value of the (e.g., required) location estimation error threshold may be communicated/signaled to the first WTRU, for example, by the network.

The first WTRU may determine the preferred bi/multi-static configuration (e.g., a second configuration) for additional bi/multi-static measurements, for example, if (e.g., on the condition that) the first WTRU determines to perform additional bi/multi-static measurements. The preferred bi/multi-static configuration (e.g., second configuration) for additional bi/multi-static measurements may include, for example, selection of a second subset (e.g., preferred subset or preferred configuration) of WTRUs (e.g., one or more preferred neighboring WTRUs) from the first subset of WTRUs (e.g., initial supporting WTRUs such as the second WTRU, nth WTRU, etc.) involved in the initial measurements to form a bi/multi-static configuration with the first WTRU (e.g., a second subset of WTRUs), and/or determination of which of the WTRUs (e.g., including the first WTRU) selected for additional bi/multi-static measurements is the transmitter or receiver (e.g., to perform additional bi/multi-static measurements).

Selection of a preferred bi/multi-static configuration for additional bi/multi-static measurements may be performed, for example, using one or more of the initial bi/multi-static measurements, WTRU capability information of the WTRUs involved in the initial measurements, etc. The first WTRU may determine the initial estimation of the target's location, for example, using the initial bi/multi-static measurements. The first WTRU may determine a preferred bi/multi-static configuration for additional bi/multi-static measurements that may reduce (e.g., provide a lower) target location estimation error, for example, based on one or more of the initial estimated location of the target, an AOA estimation error in each of the initial bi/multi-static measurements, a TDOA estimation error in each of the initial bi/multi-static measurements, a location estimation error in the first WTRU, and/or a location estimation error of the (e.g., each of the) selected support WTRUs for the initial bi/multi-static measurements (e.g., second WTRU, nth WTRU, etc.).

In examples, the first WTRU may select one or more support WTRUs for additional bi/multi-static measurements for which the measurements errors (e.g., AOA, TDOA estimation errors) in the initial measurements are below a threshold, and/or the SNR measurements in the initial measurements are above a threshold. The first WTRU may receive the value of the (e.g., required) thresholds, for example, by the network.

Figure 12:
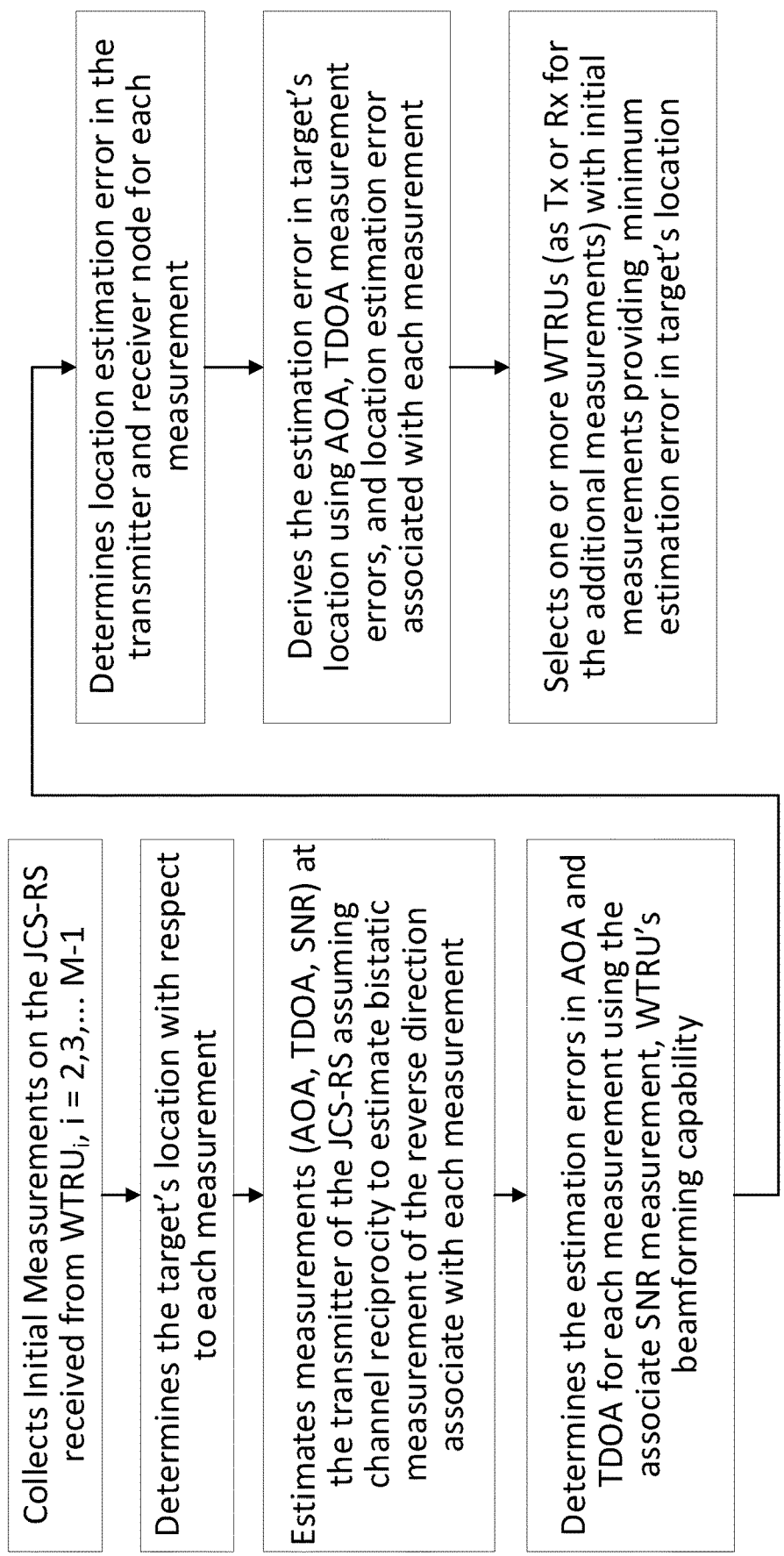
FIG. 12 illustrates an example procedure to determine a bi/multi-static configuration for additional bi/multi-static measurements.

FIG. 12 illustrates an example procedure to determine a bi/multi-static configuration for additional bi/multi-static measurements. In examples, there may be (M−1) WTRUs (e.g., $WTRU_2$, $WTRU_3$, ... $WTRU_M$, where M>1) selected and/or involved in initial bi/multi-static measurements. The first WTRU (e.g., $WTRU_1$) may perform a procedure (e.g., an example procedure shown in FIG. 12) to determine a (e.g., the best) bi/multi-static configuration for additional bi/multi-static measurements using the initial bi/multi-static measurements. Channel reciprocity may be assumed between $WTRU_1$ (2≤i≤M and the first WTRU (e.g., $WTRU_1$). The assumption may be used to estimate the measurements (e.g., AOA, TDOA, SNR) at the $WTRU_1$ (2≤i≤M), for example, using the measurements performed by the first WTRU (e.g., $WTRU_1$) over the JCS-RS transmission of the $WTRU_i$.

A procedure (e.g., the example procedure illustrated in FIG. 12) may be performed by the first WTRU (e.g., WTRU1) that initiates the target localization procedure, and/or may be performed by other nodes, such as one or more nodes that may have access to the individual measurements (e.g., AOA, TDOA, SNR) at a (e.g., each) WTRU and/or access to the location information for a (e.g., each) WTRU. Examples are provided for the example procedure shown in FIG. 12.

Figure 13:
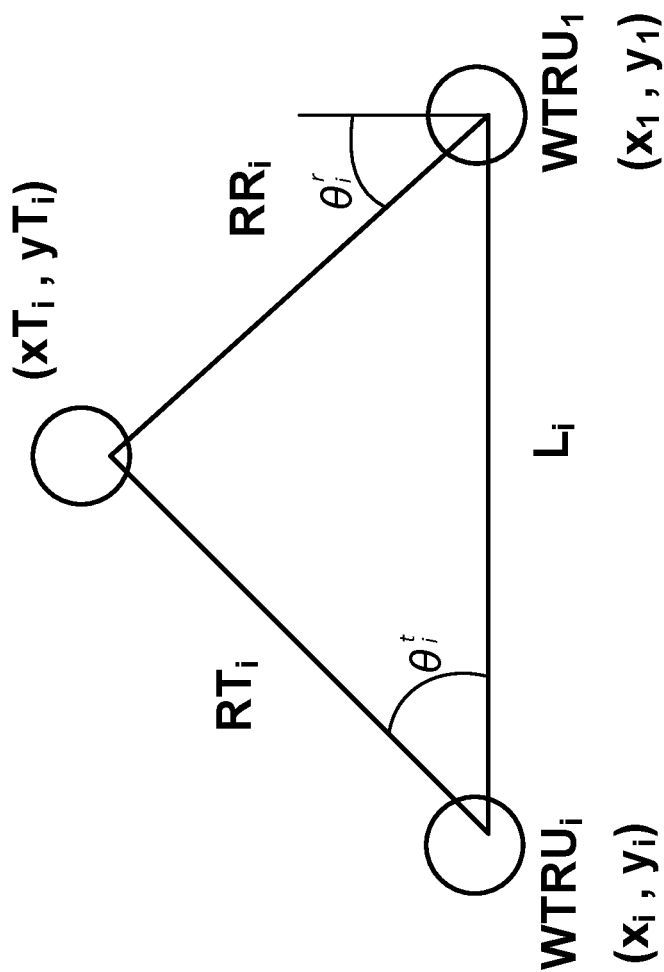
FIG. 13 illustrates an example of a bi-static configuration of a first WTRU with a WTRUi for a given target.

FIG. 13 illustrates an example of a bi-static configuration of a first WTRU (WTRU1) with a WTRUi for a given target. FIG. 13 shows some of the notations that may be used in one or more example procedures (e.g., the example procedure shown in FIG. 12).

As shown in FIG. 12, the first WTRU (e.g., WTRU1) may collect the measurements from initial bi/multi-static measurements performed with each of the (M−1) WTRUs (e.g., $WTRU_i$, where, 2≤i≤M). Measurements may include, for example, an AOA measurement, a TDOA measurement, and/or an SNR measurement at the first WTRU (e.g., WTRU1) performed, for example, using a JCS-RS of $WTRU_i$ (e.g., where 2≤i≤M), and may be denoted by $\theta_i^r$ (e.g., where r may indicate that the first WTRU is the receiver for the bi-static measurement with the $WTRU_i$), $\Delta T_i$, and $SNR_i$, respectively.

As shown in FIG. 12, the first WTRU (e.g., $WTRU_1$) may for example, for the (e.g., each of the) (M−1) WTRUs (e.g., $WTRU_i$, where 2≤i≤M)), determine the target's location (e.g., using the collected measurements with $WTRU_i$, $WTRU_i$'s location, and/or the first WTRU's own location ($x_1$, $y_1$)). The location of the target derived with the $WTRU_i$'s measurements may be denoted by ($xT_i$, $yT_i$), where 2≤i≤M, which may be determined in accordance with Equations (3), (4) and (5):

$$xT_i = x_1 - RR_i \sin\theta_i^r \qquad (3)$$

$$yT_i = y_1 + RR_i \cos\theta_i^r \qquad (4)$$

$$RR_i = \frac{c^2 \Delta T_i^2 + 2cL_i \Delta T_i}{2((c\Delta T_i + L_i) - L_i \sin\theta_i^r)} \qquad (5)$$

where c=3×10⁸ m/sec.

As shown in FIG. 12, the first WTRU (e.g., WTRU$_1$) may, for example, for the (e.g., each of the) (M−1) WTRUs (e.g., WTRU$_i$, where 2≤i≤M), assuming channel reciprocity, calculate 61 (e.g., the AOA experienced by WTRU$_i$ if the first WTRU becomes the transmitter for the bi-static measurements with the WTRU$_i$) using $\theta_i^r$, the location of the WTRU$_i$, the collected measurements with WTRU$_i$, and the location of the first WTRU, where, 2≤i≤M, for example, in accordance with Equations (6) and (8) if $$\theta_i^r \in \left[0\frac{\pi}{2}\right] \sqcup \left[\frac{3\pi}{2} 2\pi\right],$$

or, otherwise $$\left(\text{e.g., if } \frac{\pi}{2} < \theta_i^r < \frac{3\pi}{2}\right).$$

As shown in FIG. 12, the first WTRU (e.g., WTRU$_1$) may, for example, for the (e.g., each of the) (M−1) WTRUs (e.g., WTRU$_i$, where 2≤i≤M), calculate a vector using the information of location estimation errors in the WTRU$_i$'s location, and WTRU$_1$'s location, for example, in accordance with Eq. (10):

$$dX_i = [dx_i, dy_i, dx_1, dy_1]^T \tag{10}$$

where 2≤i≤M.

As shown in FIG. 12, the first WTRU (e.g., WTRU$_1$) may calculate, for example, for the (e.g., each of the) (M−1) WTRUs (e.g., WTRU$_i$, where 2≤i≤M) for both cases: (i) if/when the WTRU$_i$ is assumed to be the transmitter (C1$_i^r$, C2$_i^r$) and (ii) if/when the first WTRU is assumed to be the transmitter (C1$_i^t$, C2$_i^t$) in the bi-static configuration of the first WTRU and the WTRU$_i$, for example, in accordance with Equations (11), (12), (13), (14) and (15):

$$C1_i^r = \begin{bmatrix} \frac{1}{c}\left[\frac{xT_i - x_i}{RT_i} + \frac{xT_i - x_1}{RR_i}\right] & \frac{1}{c}\left[\frac{yT_i - y_i}{RT_i} + \frac{yT_i - y_1}{RR_i}\right] \\ \frac{1}{(1+u^2)}\left[\frac{-1}{yT_i - y_i}\right] & \frac{1}{(1+u^2)}\left[\frac{-u}{yT_i - y_i}\right] \end{bmatrix} \tag{11}$$

$$C2_i^r = \begin{bmatrix} \frac{1}{c}\left[\frac{x_i - xT_i}{RT_i} - \frac{x_i - x_1}{L}\right] & \frac{1}{c}\left[\frac{y_i - yT_i}{RT_i} - \frac{y_i - y_1}{L}\right] & \frac{1}{c}\left[\frac{x_1 - xT_i}{RR_i} - \frac{x_1 - x_i}{L}\right] & \frac{1}{c}\left[\frac{y_1 - yT_i}{RR_i} - \frac{y_1 - y_i}{L}\right] \\ 0 & 0 & \frac{1}{(1+u^2)}\left[\frac{1}{yT_i - y_1}\right] & \frac{1}{(1+u^2)}\left[\frac{u}{yT_i - y_1}\right] \end{bmatrix} \tag{12}$$

$$C1_i^t = \begin{bmatrix} \frac{1}{c}\left[\frac{xT_i - x_i}{RT_i} + \frac{xT_i - x_1}{RR_i}\right] & \frac{1}{c}\left[\frac{yT_i - y_i}{RT_i} + \frac{yT_i - y_1}{RR_i}\right] \\ \frac{1}{(1+v^2)}\left[\frac{-v}{xT_i - x_i}\right] & \frac{1}{(1+v^2)}\left[\frac{1}{xT_i - x_i}\right] \end{bmatrix} \tag{13}$$

$$C2_i^t = \begin{bmatrix} \frac{1}{c}\left[\frac{x_i - xT_i}{RT_i} - \frac{x_i - x_1}{L}\right] & \frac{1}{c}\left[\frac{y_i - yT_i}{RT_i} - \frac{y_i - y_1}{L}\right] & \frac{1}{c}\left[\frac{x_1 - xT_i}{RR_i} - \frac{x_1 - x_i}{L}\right] & \frac{1}{c}\left[\frac{y_1 - yT_i}{RR_i} - \frac{y_1 - y_i}{L}\right] \\ \frac{1}{(1+v^2)}\left[\frac{v}{xT_i - x_i}\right] & \frac{1}{(1+v^2)}\left[\frac{-1}{xT_i - x_i}\right] & 0 & 0 \end{bmatrix} \tag{14}$$

$$u = \frac{x_1 - xT_i}{yT_i - y_1}, \quad v = \frac{yT_i - y_i}{xT_i - x_i} \tag{15}$$

Equations (7) and (8):

$$\theta_i^t = \cos^{-1}((RT_i^2 + L_i^2 - RR_i^2)/2RT_i L_i) \tag{6}$$

$$\theta_i^t = 2\pi - \cos^{-1}((RT_i^2 + L_i^2 - RR_i^2)/2RT_i L_i) \tag{7}$$

where, $RT_i = c\Delta T_i + L_i - RR_i$ (8)

As shown in FIG. 12, the first WTRU (e.g., WTRU$_1$) may, for example, for the (e.g., each of the) (M−1) WTRUs (e.g., WTRU$_i$, where 2≤i≤M), determine the estimation error in AOAs (d$\theta_i^r$, d$\theta_i^t$) and TDOA measurement (d$\Delta T_i$), for example, using the SNR measurements, the first WTRU's beamforming capabilities, and WTRU$_i$'s beamforming capabilities. The first WTRU (e.g., WTRU$_1$) may create the following vectors, for example, in accordance with Eq. (9):

$$dZ_i^r = \begin{bmatrix} d\Delta T_i \\ d\theta_i^r \end{bmatrix}, \quad dZ_i^t = \begin{bmatrix} d\Delta T_i \\ d\theta_i^t \end{bmatrix} \tag{9}$$

where 2≤i≤M.

As shown in FIG. 12, the first WTRU (e.g., WTRU$_1$) may, for example, for the (e.g., each of the) (M−1) WTRUs (e.g., WTRU$_i$, where 2≤i≤M), calculate the associated mean target position estimation error for both cases: (i) if/when the WTRU$_i$ is assumed to be the transmitter ($e_{dPT_i^r}$) and (ii) if/when the first WTRU is assumed to be the transmitter ($e_{dPT_i^t}$) in the bi-static configuration of the first WTRU and the WTRU$_i$, for example, in accordance with Equations (16), (17), (18) and (19):

$$e_{dPT_i^r} = E([dPT_i^r][dPT_i^r]T) \tag{16}$$

$$dPT_i^r = [[C1_i^r]^T[C1_i^r]]^{-1}[C1_i^r]^T[dZ_i^r - [C2_i^r]dX_i] \tag{17}$$

$$e_{dPT_i^t} = E([dPT_i^t][dPT_i^t]^T) \tag{18}$$

$$dPT_i^t = [[C1_i^t]^T[C1_i^t]]^{-1}[C1_i^t]^T[dZ_i^t - [C2_i^t]dX_i] \tag{18}$$

where 2≤i≤M.

As shown in FIG. 12, the first WTRU (e.g., WTRU$_1$) may find the j$^{th}$ WTRU out of (M−1) WTRUs (e.g., 2≤j≤M) for which the $e_{dPT_j^r}$ is minimum (e.g., the lowest $e_{dPT_j^r}$ of the (M−1) WTRUs) and may find the k$^{th}$ WTRU out of (M−1)

WTRUs (e.g., 2≤k≤M) for which the $e_{dPT_k^t}$ is minimum (e.g., the lowest $e_{dPT_k^t}$ of the (M−1) WTRUs).

As shown in FIG. 12, the first WTRU (e.g., WTRU$_1$) may select the j$^{th}$ WTRU as a transmitter (e.g., as the best bi-static configuration for additional measurements with the first WTRU), for example, if $e_{dPT_j^r} \le e_{dPT_k^t}$, and, if not (e.g., otherwise), the first WTRU may select the k$^{th}$ WTRU as the receiver and may select itself (e.g., the first WTRU) as a transmitter (e.g., as the best bi-static configuration for additional measurements with the first WTRU).

The first WTRU (e.g., WTRU$_1$) may (e.g., based on the procedure shown in FIG. 12) select one or more preferred bi-static configurations. For example, the first WTRU may select the first bi-static configuration (e.g., WTRU$_i$) with the minimum $e_{dPT_i^r}$ or $e_{dPT_i^t}$, where (2≤i≤M). The WTRU$_i$ may be chosen as the transmitter for additional bi-static configuration for the selected configuration, for example, if $e_{dPT_i^r}$ is the minimum, and if not (e.g., if $e_{dPT_i^t}$ is the minimum), the WTRU$_i$ may be selected as the receiver (e.g., where the measurements will be taken) for additional bi-static configuration. The first WTRU may select the second bi-static configuration with the next minimum $e_{dPT_i^r}$ or $e_{dPT_i^t}$ (2≤i≤M), and so on.

Additional measurements may be configured. The first WTRU may (e.g., determine to) enable additional bi/multi-static measurements using the preferred bi/multi-static configuration. The first WTRU (e.g., on the condition that the first WTRU determines to enable additional bi/multi-static measurements using the preferred bi/multi-static configuration) may send a request (e.g., an additional measurement request) to each of the selected preferred/support WTRUs (e.g., second WTRU, etc.), for example, to configure the selected support WTRUs for additional bi/multi-static measurements with the first WTRU. The additional measurement request message may be sent, for example, using the resource(s) configured for sidelink mode 2.

An additional measurement request message sent to a selected support WTRU (e.g., second WTRU) may include, for example, one or more of the parameters that may be used (e.g., needed) for additional JCS-RS transmission for bi/multi-static measurements: a Tx/Rx indication, a BWP recommendation, a JCS-RS transmission window, Tx power, and/or other parameters. A Tx/Rx indication may indicate, for example, whether the selected support WTRU is (e.g., needs to be) the transmitter of the JCS-RS transmission (e.g., indication may be set to '1') or whether the selected support WTRU is (e.g., needs to be) the receiver where the measurements are performed over the JCS-RS transmission performed by the first WTRU (e.g., indication may be set to '0'). A BWP recommendation may be the same or different (e.g., with larger bandwidth) compared to the BWP configured for the initial bi/multi-static measurements for the second WTRU). A JCS-RS transmission window may, for example, configure separate JCS-RS transmission/reception window durations for each of the selected support WTRUs for additional bi/multi-static measurements (e.g., to orthogonalize the transmission among the multiple selected support WTRUs). Other parameters may include, for example, a minimum bandwidth, a number of Tx-beams, and/or a number of repetitions in each beam/direction, which may be same or different from the configuration used for the initial bi/multi-static measurements for the second WTRU. For example, a larger minimum bandwidth may be configured for additional measurements (e.g., to increase the TDOA measurement resolution), etc.

The selected support WTRU (e.g., second WTRU) for additional bi/multi-static measurements may transmit (e.g., need to transmit) a JCS-RS (e.g., a TX/Rx indication may be set to 1, for example, if the selected support WTRU is selected as Tx) or may make measurements using (e.g., associated with) a JCS-RS transmitted by the first WTRU (e.g., a TX/Rx indication may be set to 0, for example, if the selected support WTRU is selected ax Rx) within the configured JCS-RS transmission window duration.

The first WTRU may send the additional measurement request message via the unicast transmission to the (e.g., each of the) selected support WTRUs (e.g., second WTRU, etc.), for example, using the WTRU-ID information of the selected support WTRU received in the ACK localization response from the selected support WTRU. The first WTRU may (e.g., alternatively and/or additionally) send the additional measurement request message via a groupcast or a broadcast transmission. The first WTRU may include in the additional measurement request message the WTRU IDs of the selected WTRUs and/or WTRU-specific parameters (if any), such as, for example, a BWP recommendation, a JCS-RS transmission window, etc. The additional measurement request message may be sent, for example, using a sidelink control channel (e.g., PSCCH). The message may be sent as sidelink control information (e.g., an SCI). One or more SCI format(s) may be defined/configured to send an additional measurement request message as SCI. An additional measurement request message may (e.g., alternatively and/or additionally) be sent using a sidelink shared channel (e.g., PSSCH). The decoding information (e.g., resource allocation, modulation/coding scheme, etc.) of the sidelink shared channel carrying the additional measurement request message may be sent, for example, using an SCI (e.g., a dedicated SCI or a multipurpose SCI, such as SCI 0_1 or SCI 0_2 with one or more identifiers to indicate that the transmission is intended for an additional measurement request message).

The additional measurement request message may be sent to the selected support WTRUs for additional bi/multi-static measurements. The first WTRU may monitor (e.g., the resources configured for sidelink mode 2) for or receive a response (e.g., ACK or NACK) from the (e.g., each of the) selected support WTRUs (e.g., WTRUs to which the additional measurement request message were sent). The resources for ACK/NACK may be configured, for example, to associate one or more dedicated sidelink resources with the (e.g., each) additional measurement request message. Mapping between the resource used for an additional measurement request message and the associated resources for ACK/NACK may be communicated/signaled to the WTRUs, e.g., by the network. A response (e.g., an ACK/NACK) may be sent (e.g., alternatively and/or additionally), for example, by selecting resources (e.g., new resources) configured for sidelink mode 2.

The first WTRU may re-send the additional measurement request message, for example, if/when the first WTRU does not receive ACKs from one or more selected support WTRUs. The first WTRU may re-send the additional measurement request message to a (e.g., the same) set of selected support WTRUs for additional bi/multi-static measurements. A transmission at the later time (e.g., re-transmission) may be at a higher power (e.g., limited to a maximum power). The first WTRU may (e.g., alternatively and/or additionally) select another set of WTRUs (e.g., out of the WTRUs involved in the initial bi/multi-static measurements), for example, by selecting a greater number of support WTRUs (e.g., compared to the number of support WTRUs selected for the previous additional measurement request transmissions), and may send the additional measurement request messages to the (e.g., newly or more recently) selected set of support WTRUs.

Additional measurements may be performed. The first WTRU may perform a procedure, for example, for the (e.g., each of the) WTRUs in the first subset of WTRUs (e.g., the selected initial support WTRUs such as the second WTRU, etc.) for additional bi/multi-static measurements, from which an ACK for additional measurement request message is received by the first WTRU. The procedure may depend on, for example, whether the second WTRU is selected as Tx or Rx.

The first WTRU may select the second WTRU as a Tx WTRU (e.g., TX/Rx indication may be set to 1 in the additional measurement request message to the second WTRU) to perform additional bi/multi-static measurements. The first WTRU may (e.g., if the second WTRU is selected as Tx) monitor for JCS-RS transmission on the resources configured for sidelink mode 2 within the associated configured JCS-RS transmission window and on the recommended BWP/BWPs (if any).

The JCS-RS transmission from a selected support WTRU (e.g., second WTRU) may be performed, for example, via a unicast transmission to the first WTRU using the configuration indicated/specified in the additional measurement request message. The JCS-RS transmission from the second WTRU may be performed over the sidelink shared channel, e.g., PSSCH. An associated SCI may be sent (e.g., first) over a sidelink control channel (e.g., PSCCH) carrying the decoding information of the PSSCH. Fields and/or identifiers in (e.g., multipurpose) SCIs (e.g., SCI 0_1 or SCI 0_2) or dedicated SCIs may be defined/configured to indicate that the associated transmission over the PSSCH is for/includes JCS-RSs.

The first WTRU may (e.g., based on reception of JCS-RS from the second WTRU) make measurements (e.g., AOA, TDOA, SNR, etc.), for example, by following the a procedure (e.g., as described herein for the initial bi/multi-static measurements).

The first WTRU may re-send the additional measurement request message to the second WTRU, for example, for example, if/when the first WTRU does not receive JCS-RSs from the second WTRU after monitoring for JCS-RSs over the configured JCS-RS transmission widow duration associated with the second WTRU.

The first WTRU may select the second WTRU as a Rx WTRU (e.g., e.g., TX/Rx indication may be set to 0 in the additional measurement request message to the second WTRU) to perform additional bi/multi-static measurements. The first WTRU may transmit JCS-RS (e.g., if the second WTRU is selected as Rx).

The first WTRU may transmit JCS-RS in multiple (e.g., two) different directions within the configured JCS-RS transmission window for the second WTRU, such as a first direction towards the second WTRU (e.g., baseline direction) and a second direction towards the potential target. The first WTRU may perform JCS-RS transmissions in multiple directions (e.g., for the direction towards the potential target), for example, based on the configured parameters (e.g., number of beams, number of repetitions in each beam), which may be provided in an additional measurement request message sent to the second WTRU. The first WTRU may transmit JCS-RS in multiple directions, for example, simultaneously or in time-division multiplexed fashion (e.g., transmission over two different beams may be separated in time). A time offset between two consecutive transmissions (e.g., corresponding to two different directions) for time-division multiplexed transmissions over multiple directions may be communicated to the second WTRU, for example, in an additional measurement request message. The first WTRU may (e.g., alternatively and/or additionally) transmit JCS-RSs over a wide beam, for example, so that the transmission (e.g., main-lobe of the beam) may be directed towards the potential target and the second WTRU. The first WTRU may (e.g., alternatively and/or additionally) transmit JCS-RS omni-directionally.

The first WTRU may transmit the JCS-RSs over one or more resources (e.g., selected from the configured resources for sidelink mode 2) within the associated configured JCS-RS transmission window and on the recommended BWP/BWPs (if any) for the second WTRU.

The first WTRU may transmit the JCS-RS transmission, for example, using groupcast/broadcast (e.g., if multiple support WTRUs are selected as receiver for additional bi/multi-static measurements, and/or the first WTRU transmits JCS-RS omni-directionally) or unicast transmission to the second WTRU (e.g., using the configuration given in the additional measurement request message). A (e.g., common) set of parameters (e.g., one or more of BWP, number of beams, number of repetitions, JCS-RS transmission window, etc.) may be configured for (e.g., all) selected support WTRUs (e.g., selected as receiver for additional bi/multi-static measurements) in the additional measurement request message(s), for example, for a groupcast/broadcast transmission. The JCS-RS transmission from the first WTRU may be performed over the sidelink shared channel, e.g., PSSCH. An associated SCI may be sent (e.g., first) over a sidelink control channel (e.g., PSCCH) carrying the decoding information of the PSSCH. Fields and/or identifiers in (e.g., multipurpose) SCIs (e.g., SCI 0_1 or SCI 0_2) or dedicated SCIs may be defined/configured to indicate that the associated transmission over the PSSCH may include JCS-RSs.

The first WTRU may monitor for (e.g., receive) a measurement report from the second WTRU, for example, after sending the JCS-RS transmission(s) to the second WTRU. The measurement report from the second WTRU may include measurements (e.g., AOA, TDOA, SNR, etc.) performed by the second WTRU over (e.g., associated with) the JCS-RS transmitted by the first WTRU. The measurement report may be transmitted by the second WTRU, for example, using unicast transmission over one or more resources (e.g., configured for sidelink mode 2). The measurements report may be transmitted by the second WTRU over the sidelink shared channel, e.g., PSSCH. An associated SCI may be sent (e.g., first) over a sidelink control channel (e.g., PSCCH) carrying the decoding information of the PSSCH. Fields and/or identifiers in (e.g., multipurpose) SCIs (e.g., SCI 0_1 or SCI 0_2) or dedicated SCIs may be defined/configured to indicate that the associated transmission over the PSSCH may include the measurement report for additional bi/multi-static measurements.

A maximum duration (e.g., maximum reporting delay) may (e.g., also) be configured for the measurement reporting. The second WTRU may transmit the measurement report before the maximum reporting delay expires, for example, after making the measurements over (e.g., associated with) the JCS-RS transmission of the first WTRU. The value of the maximum reporting delay may be configured by the first WTRU, for example, in the additional measurement request message.

The first WTRU may re-send the JCS-RSs for the second WTRU's measurements, for example, if/when the first WTRU does not receive a measurement report from the second WTRU (e.g., after monitoring for measurement reporting over the maximum reporting delay). A transmission at a later time (e.g., re-transmission) may be at a higher power (e.g., limited to a maximum power).

The first WTRU may perform target localization, for example, after performing one or more additional measurements, e.g., by making measurements over (e.g., associated with) the JCS-RS transmitted by the second subset of WTRUs (e.g., one or more selected preferred support Tx WTRUs) for additional bi/multi-static measurements, and/or by transmitting JCS-RSs to the second subset of WTRUs (e.g., one or more selected preferred support Rx WTRUs) for additional bi/multi-static measurements and receiving the associated measurement reports.

The first WTRU may determine a location of the target, for example, as one location corresponding to each of the additional measurements. The first WTRU may, for example, for the (e.g., each) selected support WTRU (e.g., second WTRU) with which the additional measurements are performed, determine a location of the target (e.g., using the associated bi-static measurements (e.g., AOA, TDOA, etc.)), location information of the second WTRU, the first WTRU's location, etc. The first WTRU may calculate the target location, for example, if/when the measurements are performed at the first WTRU (e.g., AOA measurement θ, TDOA measurement ΔT), the distance between the first WTRU and the second WTRU is L, and the location of the first WTRU is ($x_1$, $y_1$). In examples, the first WTRU may calculate the target location in accordance with Expression (19) and Equation (20):

$$(x_1 - R_R\sin\theta, y_1 + R_R\cos\theta) \quad (19)$$

$$R_R = \frac{c^2\Delta T^2 + 2cL\Delta T}{2((c\Delta T + L) - L\sin\theta)} \quad (20)$$

In examples, the first WTRU may calculate one or more target locations, e.g., one location corresponding to each of the selected support WTRUs involved in the additional bi/multi-static measurements (e.g., second WTRU, etc.). The first WTRU may determine a final location of target, for example, by selecting the target location associated with the measurement for which the measurement error(s) (e.g., AOA, TDOA, and/or location estimation error in the involved WTRU's location, such as a second WTRU's location) are the minimum. One or more measurement errors (e.g., AOA, TDOA) may depend, for example, on the associated SNR quality (e.g., a higher SNR value may provide lower AOA, TDOA measurement errors), bandwidth (e.g., a higher bandwidth may provide lower TDOA errors, etc.), beamforming capability of Tx/Rx WTRUs of the associated measurements (e.g., a better beamforming capability may reduce AOA measurements errors), etc.

In examples, the first WTRU may calculate one or more target locations, e.g., one location corresponding to each of the selected support WTRUs involved in the additional bi/multi-static measurements (e.g., second WTRU, etc.). The first WTRU may determine a final location of the target, for example, by taking the average of multiple (e.g., all the) locations calculated from different additional measurements (e.g., with different selected support WTRUs involved in the additional bi/multi-static measurements).

In examples, the first WTRU may calculate one or more target locations, e.g., one location corresponding to each of the selected support WTRUs involved in the additional bi/multi-static measurements (e.g., second WTRU, etc.).

The first WTRU may determine a final location of the target, for example, by taking a weighted average of multiple (e.g., all the) locations calculated from different additional measurements (e.g., with different selected support WTRUs involved in the additional bi/multi-static measurements). A weight associated with a location estimate may be assigned, for example, based on the measurement errors (e.g., AOA, TDOA, and/or location estimation error in the involved support WTRU's location, such as a second WTRU's location) in the associated measurement. For example, weight may be inversely proportional to the measurement errors or a function of the measurement errors, weight may be proportional to the SNR or a function of the SNR of the associated measurement, and/or weight may be proportional to the bandwidth or a function of the bandwidth of the associated measurement.

In examples, the first WTRU may collect one or more additional measurements. The first WTRU may determine a final location of the target, for example, by making a (e.g., soft) decision using one or more (e.g., all) measurements. A soft decision-based mechanism may include an operation performed by the first WTRU, where the first WTRU may combine one or more additional measurements to find a single final location of the target. For example, there may be an N−1 number of additional measurements performed at the first WTRU, e.g., one measurement (TDOA:$\Delta T_i$, AOA: $\theta_i$) over a JCS-RS transmitted by each selected support WTRU$_i$, where $2 \leq i \leq N$. The location of the WTRU$_i$ may be ($x_i$, $y_i$) and the location of the first WTRU (e.g., WTRU$_1$) may be ($x_1$, $y_1$). The first WTRU may determine the target's location ($x_T$, $y_T$), which may minimize the measurement error with respect to all the measurements, for example, in accordance with Function (21) and Equations (22) and (23) (e.g., with reference to FIG. 13 for an example deployment configuration):

$$\sum_{i=2}^{N} a_i F_1(\Delta T_i - f_1(x_T, y_T, x_i, y_i, x_1, y_1)) + \quad (21)$$
$$b_i F_2(\theta_i - f_2(x_i, y_i, x_T, y_T))$$

$$f_1(x_T, y_T, x_i, y_i, x_1, y_1) = \frac{1}{c}\left(\sqrt{(x_T - x_1)^2 + (y_T - y_1)^2} + \sqrt{(x_T - x_i)^2 + (y_T - y_i)^2} - \sqrt{(x_i - x_1)^2 + (y_i - y_1)^2}\right) \quad (22)$$

$$f_2(x_i, y_i, x_T, y_T) = \tan^{-1}\left(\frac{x_i - x_T}{y_T - y_i}\right) \quad (23)$$

where $a_i$ and $b_i$ may be weighting parameters.

In examples, $F_1(x)=F_2(x)=x^2$, which may convert the foregoing problem to a least square (e.g., non-linear least square) optimization. The value of the weighting parameters may be chosen, for example as $a_i=(3\times10^8)^2$ with unit sec$^{-2}$ and $b_i=0.25\pi^{-2}$ with unit radian$^{-2}$.

The first WTRU may send the location of the target (e.g., determined from the initial and/or additional bi/multi-static measurements) and/or one or more initial and/or additional bi/multi-static measurements (e.g., each measurement along with details, such as associated JCS-RS/WTRU and/or Tx/Rx indication used for the measurements) to a gNB (e.g., serving gNB). The first WTRU may send the location of the target and/or one or more initial/additional bi/multi-static measurements, for example, using an uplink shared channel. The first WTRU may (e.g., first) send a scheduling request to the gNB to request resources on the uplink shared channel.

Figure 14A:
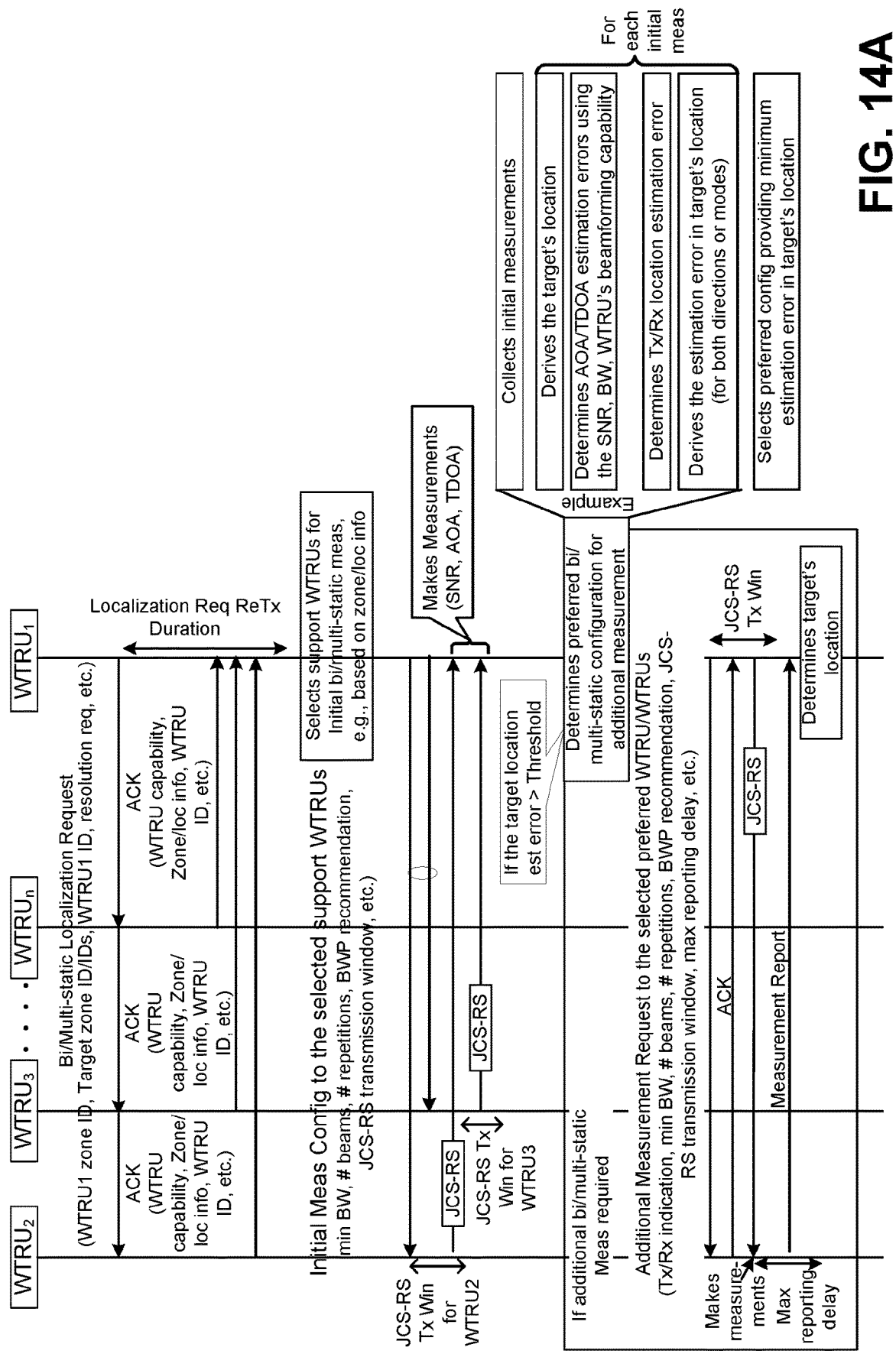
FIG. 14A illustrates an example of a WTRU procedure to support WTRU-autonomous target localization by enabling WTRU-to-WTRU bi/multi-static measurements.

FIG. 14A illustrates an example of a WTRU procedure to support WTRU-autonomous target localization by enabling WTRU-to-WTRU bi/multi-static measurements. The WTRU may perform at least one of the following actions (e.g., as shown in FIG. 14).

The WTRU may, for example, send a bi/multi-static localization request to one or more neighboring WTRUs. The request may include, for example, a zone ID of the first WTRU, a resolution requirement of the target localization, one or more potential zone IDs of the target, etc.

The WTRU may, for example, monitor for a localization response (e.g., receive a localization response) from a set of WTRUs (e.g., one or more neighboring WTRUs) within the localization request retransmission duration. A localization response may include an ACK or NACK. An ACK may include, for example, one or more of the following: the zone/location information, a WTRU ID, a capability (e.g., in terms of location estimation error), a beamforming capability, and/or a maximum bandwidth support over a sidelink of the source WTRU.

The WTRU may, for example, select one or more support WTRUs (e.g., second WTRU, third WTRU, etc.) for initial bi/multi-static measurements (e.g., out of the WTRUs from which localization responses with ACK are received).

The WTRU may, for example, send an initial measurement configuration message to the selected support WTRUs. An initial measurement configuration message may include, for example, one or more of a minimum bandwidth, a number of Tx-beams, a number of repetitions in each beam, a BWP recommendation, a JCS-RS transmission window, etc.

The WTRU may, for example, monitor for the JCS-RS transmissions (e.g., receive a JCS-RS transmission) from each of the selected support WTRUs within the associated JCS-RS transmission windows and/or on the recommended BWP/BWPs.

The WTRU may, for example, make measurements (e.g., AOA, TDOA, SNR, etc.), determining a location of the target using the measurements, and/or determining the location of the first WTRU, for example, based on (e.g., in response to) reception of JCS-RS from a selected support WTRU (e.g., second WTRU).

The WTRU may, for example, determine whether additional bi/multi-static measurements may be needed, e.g., based on the target location estimation error derived from the initial bi/multi-static measurements.

Figure 14B:
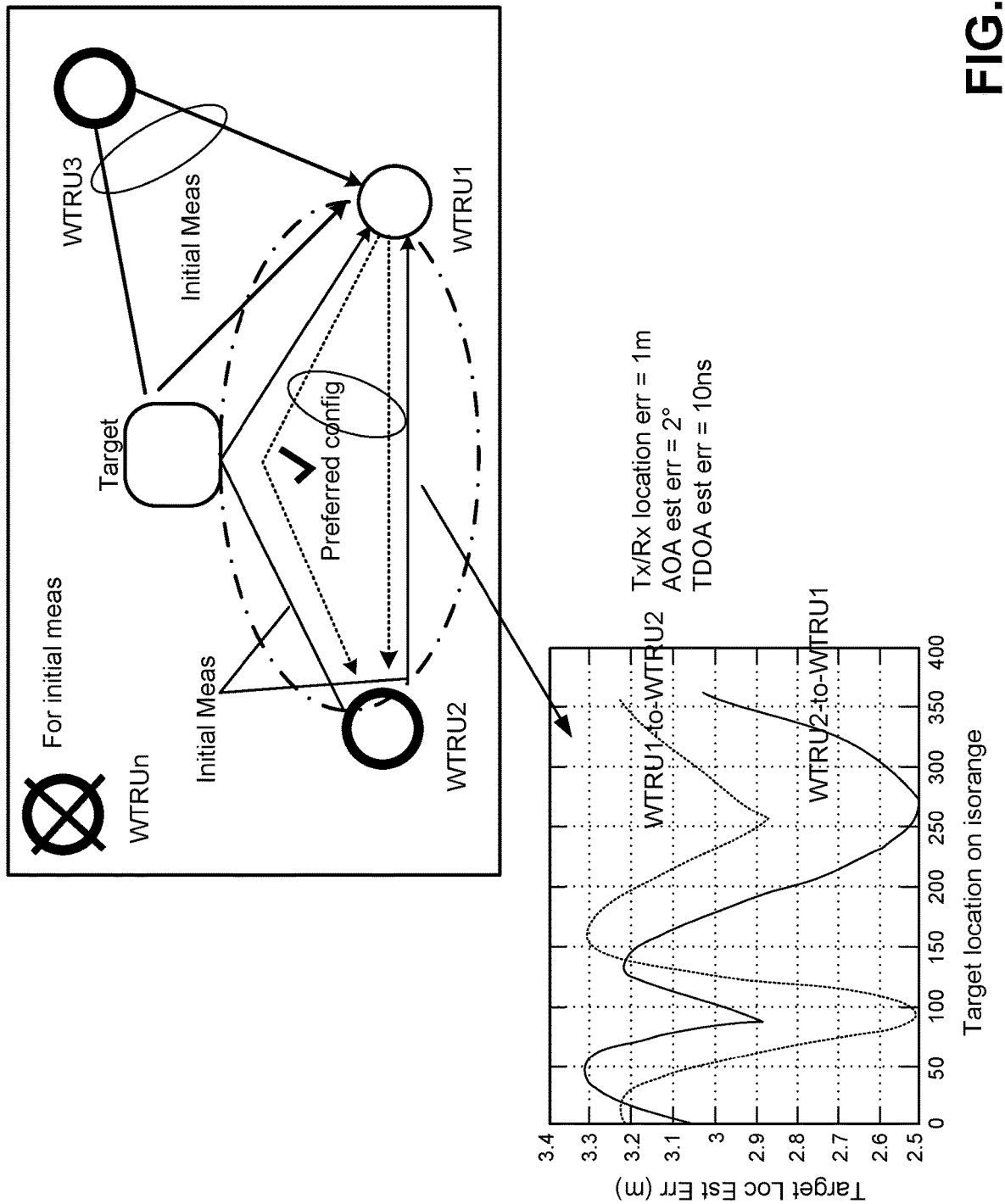
FIG. 14B illustrates an example WTRU determining a preferred bi/multi-static configuration for additional bi/multi-static measurements.

The WTRU may, for example, determine a preferred (e.g., second) bi/multi-static configuration (e.g., a second subset of WTRUs) for additional bi/multi-static measurements (e.g., where, as shown in FIG. 14A, the WTRU may perform one or more of the following: collect initial measurements, derive the target's location, determine errors such as AOA/TDOA estimation errors (e.g., using the SNR, BW, WTRU's beamforming capability, etc.), determine Tx/Rx location estimation error, derive the estimation error in the target's location (e.g., for both directions or modes, and select the preferred/second configuration (e.g., providing minimum estimation error in the target's location)). FIG. 14B illustrates an example WTRU determining a preferred bi/multi-static configuration for additional bi/multi-static measurements. As shown in FIG. 14B, the WTRU1 (e.g., the first WTRU) may determine a second subset of support WTRUs (e.g., out of the WTRUs in the previously selected WTRUs, such as the first subset of WTRUs) for the additional bi/multi-static measurements. WTRU1 may determine whether the WTRUs in the second subset of support WTRUs will be configured as Tx or Rx (e.g., based on target location estimation error. As shown in FIG. 14B, WTRU1 may determine the preferred bi/multi-static configuration to use WTRU2, for example, where WTRU2 is the Rx WTRU and WTRU1 is the Tx WTRU (e.g., based on target location estimation error), In examples, the preferred bi/multi-static configuration (e.g., second subset of WTRUs) may be smaller than the initial bi/multi-static configuration (e.g., see FIG. 14B, where WTRU3 is not included in the preferred bi/multi-static configuration).

The WTRU may, for example, send an additional measurement request message to each of the selected preferred/support WTRUs (e.g., the second subset of WTRUs) for additional bi/multi-static measurements. The additional measurement request message may include, for example, one or more of a Tx/Rx indication, a BWP recommendation, a JCS-RS transmission window, a Tx power, etc.

The WTRU may perform, for example, monitoring for a (e.g., an ACK/NACK) response (e.g., receiving a response, such as an ACK/NACK response) from each of the preferred selected support WTRUs (e.g., second subset of WTRUs) to which additional measurement request messages were sent.

The WTRU may, for example, monitor for (e.g., receive) the JCS-RS transmissions (e.g., for additional bi/multi-static measurements) from each of the selected preferred support Tx WTRUs that sent an ACK response in response to the additional measurement request message. The monitoring may be performed within the associated JCS-RS transmission windows and/or on the recommended BWP/BWPs. The WTRU may make/perform measurements (e.g., AOA, TDOA, SNR, etc.), for example, based on the JCS-RS transmissions.

The WTRU may, for example, transmit a JCS-RS (e.g., for additional bi/multi-static measurements) to each of the selected preferred support Rx WTRUs that sent an ACK response in response to the additional measurement request message. The transmission(s) may occur (e.g., be performed) within the associated JCS-RS transmission windows and/or on the recommended BWP/BWPs. The WTRU may monitor for a measurement report (e.g., for additional bi/multi-static measurements) from each of the selected support Rx WTRUs that sent an ACK response in response to the additional measurement request message.

The WTRU may, for example, perform target localization using the one or more measurements available from additional bi/multi-static measurements.

A bi/multi-static localization request may be sent, for example, using sidelink mode 2 groupcast/broadcast transmissions.

Resources for one or more localization responses may be configured, for example, so that one or more dedicated sidelink resources may be associated with each bi/multi-static localization request message. The mapping between the resource used for a bi/multi-static localization request message and the associated resources for localization response (e.g., ACK/NACK) may be communicated/signaled to the WTRUs, e.g., by the network.

Resources for localization response/responses may be (e.g., independently) selected from resources used for a bi/multi-static localization request message.

The first WTRU may re-send the bi/multi-static localization request message to the set of WTRUs (e.g., one or more neighboring WTRUs), for example, if/when the first WTRU does not receive an ACK localization response from one or more WTRUs. A transmission at a later time (e.g., a re-transmission) may be, for example, at a higher power (e.g., limited to a maximum power), with different spatial domain transmission filter (e.g., Tx beam), and/or with a greater number of Tx beams (e.g., compared to a previous transmission).

Selection of a support WTRU (e.g., second WTRU) for initial bi/multi-static measurements may be determined, for example, using the geographic information (e.g., location or zone information) of the second WTRU, first WTRU, and/or the target (e.g., if available).

Selection of a support WTRU (e.g., second WTRU) for initial bi/multi-static measurements may be determined based on the location estimation error of the second WTRU. The location estimation error may be received within the localization response from the second WTRU.

An initial measurement configuration message and/or an additional measurement request message may be sent to the selected support WTRUs for initial and/or additional bi/multi-static measurements. A message may be sent, for example, using a sidelink mode 2 unicast, groupcast, or broadcast transmission.

Separate JCS-RS transmission window durations in an initial measurement configuration message and/or in an additional measurement request message may be configured (e.g., for each of the selected support WTRUs), for example, to orthogonalize the measurements among the WTRUs selected support for initial and/or additional bi/multi-static measurements.

The same or separate BWPs may be configured in an initial measurement configuration message for each of the selected support WTRUs (e.g., for initial bi/multi-static measurements).

A JCS-RS transmission for initial and/or additional bi/multi-static measurements may be performed, for example, using the sidelink shared channel (e.g., PSSCH) over the resource configured for sidelink mode 2.

The first WTRU may re-send the initial measurement configuration message, for example, if/when the first WTRU does not receive JCS-RSs from one or more selected support WTRUs after monitoring for JCS-RSs from the selected support WTRUs for initial bi/multi-static measurements (e.g., over the associated JCS-RS transmission window durations). A transmission at a later time (e.g., re-transmission) may be, for example, at a higher power (e.g., limited to a maximum power).

The first WTRU may measure the target location estimation error with each of the initial bi/multi-static measurements, for example, based on one or more of the associated SNR measurements, the selected support WTRU's beamforming capability, the first WTRU's beamforming capability, bandwidth used for the initial JCS-RS transmissions, etc.

The first WTRU may (e.g., determine to) perform additional bi/multi-static measurements, for example, if the target location estimation error derived from the initial bi/multi-static measurements is below the maximum location estimation error threshold and above a second threshold (e.g., a (required) location estimation error threshold). The values of the thresholds (e.g., maximum location estimation error threshold and/or (required) location estimation error threshold) may be communicated/signaled to the first WTRU, e.g., by the network.

The first WTRU may (e.g., determine to) re-initiate the WTRU selection procedure for initial bi/multi-static measurements, for example, if/when the target location estimation error derived from the initial bi/multi-static measurements is above the maximum location estimation error threshold. The transmission of a bi/multi-static localization request message at the later time (e.g., re-transmission) may be, for example, at a higher power (e.g., limited to a maximum power), with a different spatial domain transmission filter (e.g., Tx beam), and/or with a greater number of Tx beams (e.g., compared to a previous transmission of a bi/multi-static localization request message).

The selection of a preferred bi/multi-static configuration for additional bi/multi-static measurements may be performed, for example, using one or more of the initial bi/multi-static measurements, a WTRU capability of the WTRUs involved in the initial measurements, a WTRU capability of the first WTRU, etc.

Resources for an ACK/NACK for an additional measurement request message may be configured, for example, so that one or more dedicated sidelink resources may be associated with each additional measurement request message. Mapping between the resource used for an additional measurement request message and the associated resources for the ACK/NACK may be communicated/signaled to the WTRUs (e.g., by the network).

Resources for the ACK/NACK for an additional measurement request message may be (e.g., independently) selected from a resource used for an additional measurement request message.

The first WTRU may re-send the additional measurement request message(s), for example, if/when the first WTRU does not receive one or more (e.g., all) ACKs for additional measurement request message(s) from one or more selected support WTRUs for additional bi/multi-static measurements. A transmission at a later time (e.g., re-transmission) may be, for example, at a higher power (e.g., limited to a maximum power) and/or to a different set of WTRUs (e.g., out of some or all the support WTRUs involved in the initial bi/multi-static measurements), for example, compared to the WTRUs selected for a previous transmission of an additional measurement request message.

A maximum duration (e.g., a maximum reporting delay) may (e.g., also) be configured for the measurement reporting. A selected Rx WTRU for additional bi/multi-static measurements (e.g., second WTRU) may make measurements over a JCS-RS transmission of the first WTRU. The selected Rx WTRU for additional bi/multi-static measurements (e.g., second WTRU) may (e.g., need to) transmit the measurement report before the maximum reporting delay expires. The value of the maximum reporting delay may be configured, for example, by the first WTRU (e.g., in the additional measurement request message). The first WTRU may re-send the JCS-RSs for the second WTRU's measurements, for example, if/when the first WTRU does not receive a measurement report from the second WTRU (e.g., after monitoring for measurement reporting over the maximum reporting delay). A transmission at a later time (e.g., re-transmission) may be, for example, at a higher power (e.g., limited to a maximum power).

The first WTRU may send to a gNB (e.g., serving gNB) the location of the target (e.g., determined from the initial and/or additional bi/multi-static measurements), and/or one or more initial and/or additional bi/multi-static measurements (e.g., each measurement along with details, such as an associated JCS-RS/WTRU and/or Tx/Rx indication used for the measurements).

Network-assisted (e.g., hybrid) target localization may be performed, for example, by enabling/using WTRU-to-WTRU bi/multi-static measurements. A WTRU (e.g., the first WTRU) may enable the initial bi/multi-static measurements, for example, via the network (e.g., serving gNB). The network may assist the first WTRU in selecting one or more WTRUs (e.g., second WTRU, third WTRU, etc.) to participate in initial bi/multi-static measurements with the first WTRU and/or in configuring the resources to perform such measurements (e.g., over NR/LTE PC5 interface using sidelink mode 1). The additional bi/multi-static measurements may be performed (e.g., autonomously) by the first WTRU, for example, using an NR/LTE PC5 interface using sidelink mode 2.

Figure 15:
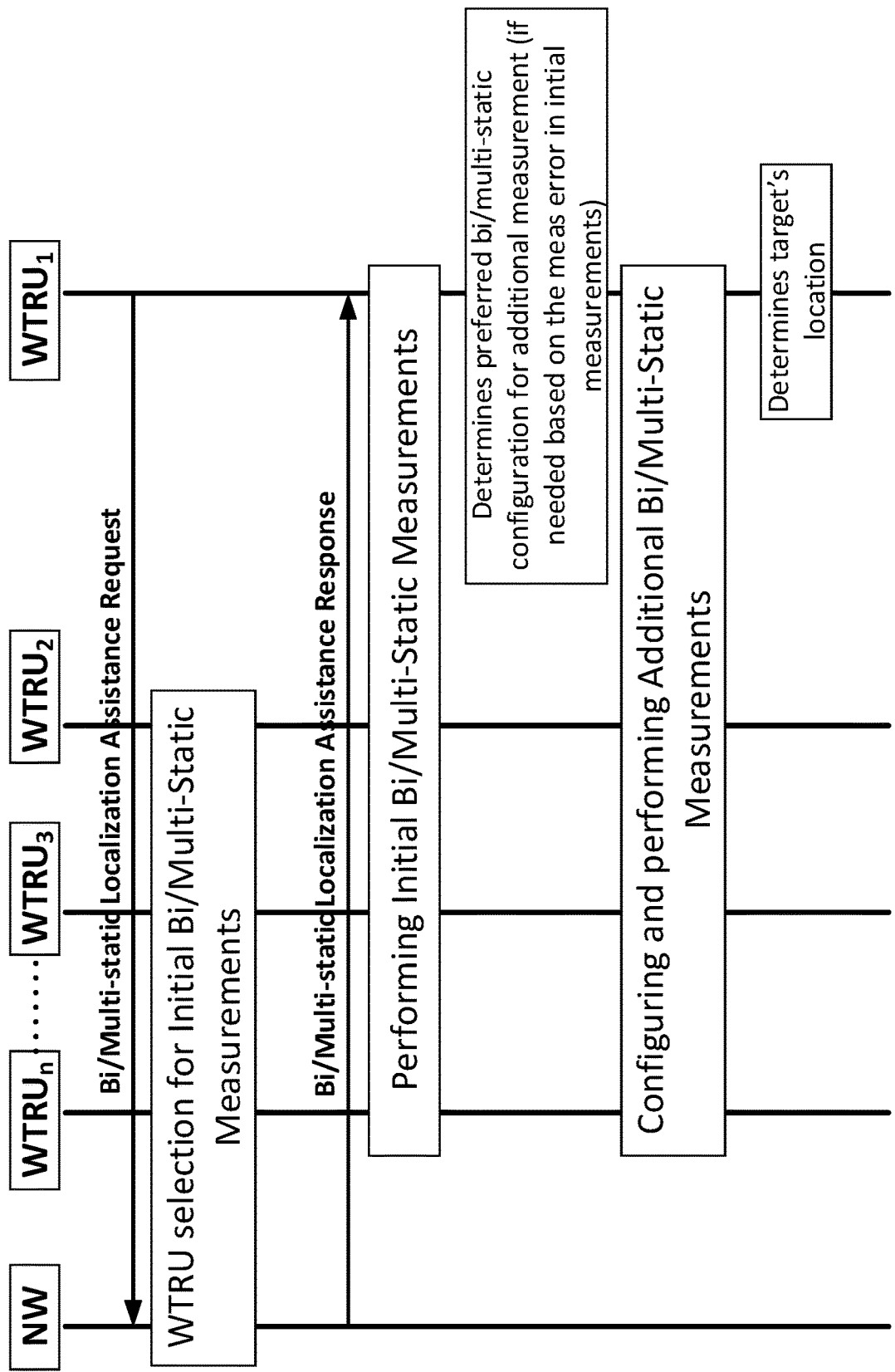
FIG. 15 illustrates an example of a network-assisted procedure for enabling WTRU-to-WTRU bi/multi-static measurements for a target localization.

FIG. 15 illustrates an example of a (e.g., high-level overview of a) network-assisted procedure for enabling WTRU-to-WTRU bi/multi-static measurements for a target localization. The first WTRU (e.g., $WTRU_1$) may send a request to the network to configure initial bi/multi-static measurements for a target localization. The network may configure one or more support WTRUs (e.g., second WTRU, third WTRU, etc.). The network may allocate the resources for initial bi/multi-static measurements. The network may send the initial bi/multi-static configuration to the first WTRU. Initial bi/multi-static measurements may be performed, for example, using the selected support WTRUs on the configured resources. The first WTRU (e.g., $WTRU_1$) may determine the preferred configuration for additional bi/multi-static measurements, for example, based on the initial measurements. Additional bi/multi-static measurements may be performed, for example, using the selected preferred configuration by the first WTRU. Target localization may be performed, for example, using the measurements available from the additional and/or initial bi/multi-static measurements. Further examples herein provide example details for each of the signaling messages and procedures shown in FIG. 15.

Figure 16:
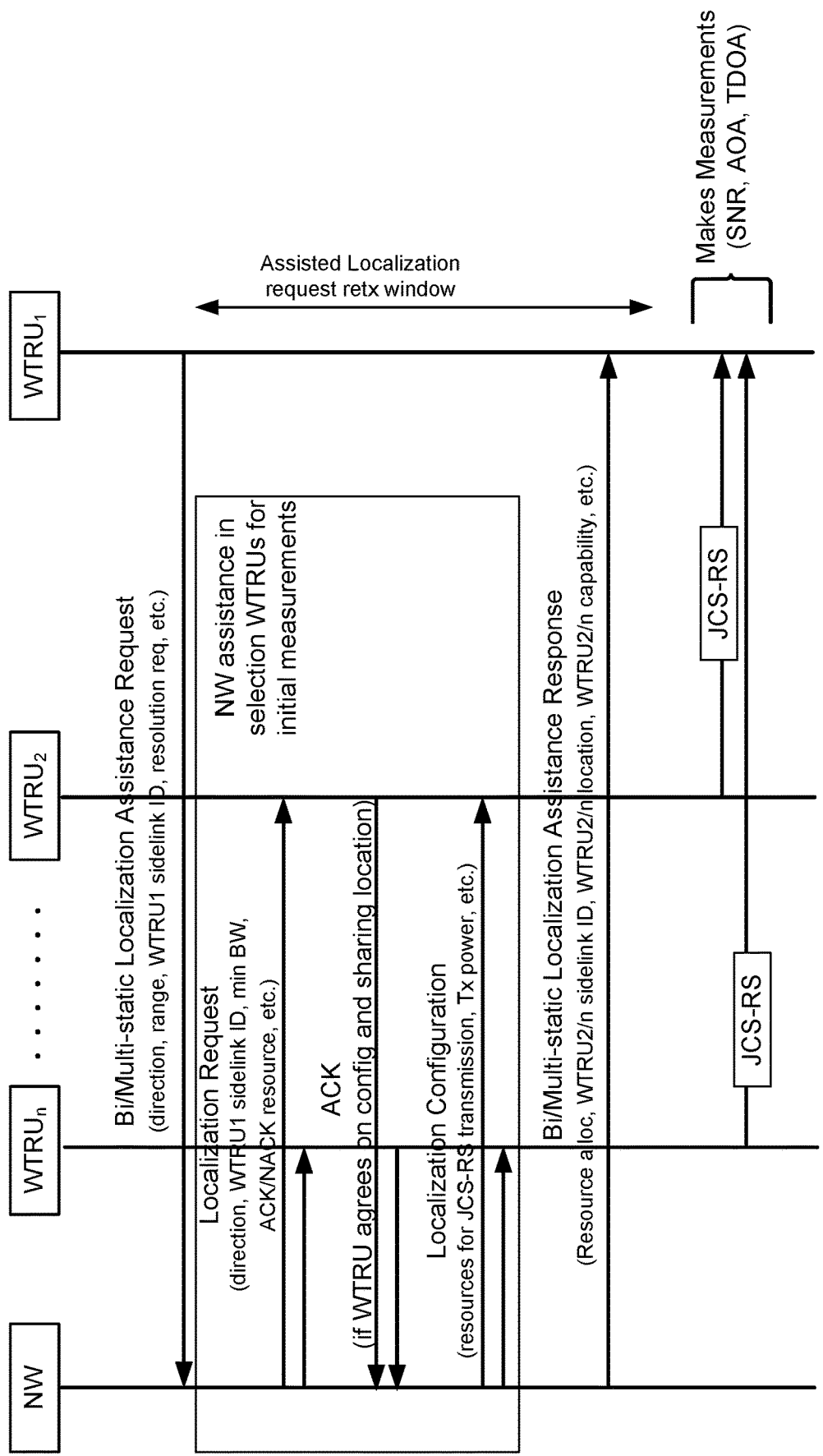
FIG. 16 illustrates an example procedure for network-assisted initial bi/multi-static measurements.

A network-assisted configuration may be provided for initial bi/multi-static measurements. FIG. 16 illustrates an example procedure for network-assisted initial bi/multi-static measurements. The first WTRU (e.g., $WTRU_1$) may send a request (e.g., a bi/multi-static localization assistance request) to the network (e.g., serving gNB), for example, to request (e.g., to enable) initial bi/multi-static measurements to determine a location of a target. The bi/multi-static localization assistance request message may include, for example, one or more of the following parameters: one or more potential zone IDs (e.g., if known) or direction and range estimates for each of the targets to be localized, a WTRU identity of the first WTRU, and/or resolution requirements for the target localization.

A bi/multi-static localization assistance request message may include one or more potential zone IDs (e.g., if known) or direction and range estimates for each of the targets to be localized. A direction (e.g., potential estimated direction) in which the target may reside may correspond to the relative direction with respect to the first WTRU's own reference (e.g., relative to the angle of arrival of the downlink SS/PBCH block selected by the first WTRU, for example, for random access channel association and transmission. The relative direction may be determined, for example, in terms of azimuth (e.g., horizontal) and elevation (e.g., vertical) angles relative to the angle of arrival of the selected downlink SS/PBCH block (e.g., in terms of angular units, such as degrees, minutes, seconds). The direction may (e.g., alternatively) correspond to an absolute direction (e.g., in terms of degrees, minutes, seconds) with respect to a global reference (e.g., compass bearing) or may correspond to named directions (e.g., north, south-east, etc.). Range may be indicated with respect to the first WTRU's location in which the target may reside.

A bi/multi-static localization assistance request message may include WTRU identity of the first WTRU, such as a WTRU ID that may be used to uniquely identify the first WTRU over the PC5 unicast interface or sidelink.

A bi/multi-static localization assistance request message may include resolution requirements for the target localization (e.g., high resolution, low resolution, etc.). A resolution or resolution level may be considered in terms of range (e.g., range resolution), temporal resolution, and/or spatial resolution. Range resolution may refer to the minimum distance between two targets that may be supported (e.g., so that both the targets can be distinguished). Temporal resolution may refer to the minimum time interval to detect change (e.g., object movement). Spatial resolution may refer to the size of a minimum detectable object.

The first WTRU may be configured with an uplink resource configuration to send a bi/multi-static localization assistance request message to the network (e.g., gNB). The configuration information may include, for example, at least one of: a periodicity, a time offset, a prohibit time (e.g., prohibit timer), an uplink control channel (e.g., physical uplink control channel (PUCCH)) configuration (e.g., format, time/frequency resources, etc.), etc. The configuration information may be communicated to the WTRU, for example, using higher layer (e.g., radio resource control (RRC)) signaling, etc. The WTRU may (e.g., alternatively) use a higher layer signaling (e.g., sending an RRC message), which may include the request. The WTRU may (e.g., alternatively) send a bi/multi-static localization assistance request message to the network (e.g., gNB), for example, using an uplink shared channel (e.g., physical uplink shared channel (PUSCH)). The WTRU may send a scheduling request to the network (e.g., gNB) to request to allocate resources on the uplink shared channel.

The network/gNB (e.g., serving gNB) may receive a bi/multi-static localization assistance request message from the first WTRU. The network/gNB (e.g., serving gNB) may determine one or more potential WTRUs (e.g., second WTRU, third WTRU, . . . , nth WTRU, etc.) that may participate in initial bi/multi-static measurements with the first WTRU. Selection of a WTRU (e.g., second WTRU) for initial bi/multi-static measurements with the first WTRU may be determined by the network/gNB, for example, using the geographic information (e.g., location or zone information) of the second WTRU, the first WTRU, and the target (e.g., potential one or more zones determined using the information received in the bi/multi-static localization assistance request). Geographic information of the first and second WTRUs may be known, for example, via (e.g., based on) the location/position server (e.g., evolved serving mobile location center (E-SMLC), secure user plane location platform (SLP), and/or location management function (LMF), etc.). In examples, the network/gNB may select a set of WTRUs (e.g., one or more neighboring WTRUs of the first WTRU, such as a second WTRU, third WTRU, . . . , nth WTRU, etc.). In examples, the zone/zones (e.g., or rough location/region) of the target may be known (e.g., indicated/provided in the bi/multi-static localization assistance request). The network/gNB may select one or more WTRUs (e.g., second WTRU, third WTRU, . . . , nth WTRU, etc.) that may form a (e.g., good) bi-static configuration with the first WTRU to detect the target (e.g., as described herein).

The network/gNB may send a request (e.g., localization request) to the selected WTRU (e.g., second WTRU, third WTRU, . . . , nth WTRU, etc.) to participate in the initial bi/multi-static measurements with the first WTRU. The localization request may include, for example, one or more of the following parameters: zone(s) or direction and range of the target (e.g., with respect to the recipient WTRU of the localization request), WTRU identity of the first WTRU (e.g., received in the bi/multi-static localization assistance request from the first WTRU), minimum bandwidth for a JCS-RS transmission (e.g., which may be determined from the resolution requirement that may be indicated in a bi/multi-static localization assistance request from the first WTRU), and/or uplink resources (e.g., over a PUCCH or PUSCH) to send a response to the localization request, etc.

The localization request for a selected WTRU (e.g., second WTRU) may be sent, for example, over the downlink control channel or downlink control information (DCI), which may be masked or scrambled (e.g., with a CRC scramble), for example, with the selected WTRU's (e.g., second WTRU's) radio network temporary identifier (RNTI) or other RNTI (e.g., a localization-RNTI (L-RNTI)) that may be defined/configured for a localization request). The localization request for a selected WTRU (e.g., second WTRU) may (e.g., alternatively) be sent over a downlink shared channel (e.g., physical downlink shared channel (PDSCH)), for which the decoding information may be sent in a DCI, e.g., scrambled with the selected WTRU's (e.g., second WTRU's) RNTI or L-RNTI.

The second WTRU may send a response (e.g., ACK or NACK) to the network/gNB, for example, after receiving a localization request message from the network/gNB (e.g., serving gNB). The second WTRU may send an ACK to the network/gNB, for example, if the second WTRU agrees to participate in the initial bi/multi-static configuration with the first WTRU (e.g., agrees on the configuration provided in a localization request and agrees to share the location of the second WTRU with the first WTRU). The second WTRU may send a NACK to the network/gNB, for example, if the second WTRU does not agree on the configuration given in localization request and/or does not agree to share the location of the second WTRU with the first WTRU. The ACK/NACK response may be sent, for example, using the uplink resources (e.g., over a PUCCH or PUSCH), which may be indicated/provided in the localization request message.

The network/gNB may select one or more WTRUs (e.g., second WTRU, nth WTRU, etc.) as support WTRUs out of (e.g., all) the WTRUs that sent an ACK in response to a localization request to participate in initial bi/multi-static measurements with the first WTRU. For example, the network/gNB may select as support WTRUs one or more (e.g., all) the WTRUs that sent an ACK in response to a localization request to participate in initial bi/multi-static measurements with the first WTRU. The network/gNB may send configuration information (e.g., a localization configuration information) to the selected support WTRUs. The configuration information (e.g., localization configuration information) may include, for example, one or more of the following parameters: the resources for JCS-RS transmissions, a Tx power, a number of Tx-beams, a number of repetitions in each beam/direction, etc. The localization configuration information may be sent, for example, on the downlink control channel (e.g., DCI scrambled with the recipient WTRU's RNTI, L-RNTI, or sidelink RNTI (SL-RNTI)) or the downlink shared channel (e.g., PDSCH). Decoding information for the localization configuration information may be sent in the downlink control channel (e.g., via DCI scrambled with the recipient WTRU's RNTI or L-RNTI).

The first WTRU may monitor for (e.g., receive) a response (e.g., a bi/multi-static localization assistance response) from the network/gNB, for example, after sending the bi/multi-static localization assistance request message. The bi/multi-static localization assistance response may include, for example, one or more of the following parameters for initial bi/multi-static measurements: a WTRU ID (e.g., a WTRU ID that may be used to uniquely identify a WTRU over the PC5 unicast interface), a location or zone information, WTRU capabilities (e.g., in terms of location estimation errors, beamforming capability, etc.), and/or resource configuration information for JCS-RS transmissions (e.g., including scheduling information) for each of the selected support WTRUs (e.g., second WTRU, nth WTRU, etc.), etc.

The bi/multi-static localization assistance response message from the network/gNB may be received, for example, in a downlink control channel or DCI (e.g., scrambled with the first WTRU's RNTI or L-RNTI or SL-RNTI). The bi/multi-static localization assistance response message from the network/gNB may (e.g., alternatively) be received in a downlink shared channel (e.g., PDSCH), for which the decoding information may be indicated, for example, in a DCI (e.g., scrambled with the first WTRU's RNTI, L-RNTI, or SL-RNTI).

A maximum monitoring duration (e.g., assisted localization request retransmission duration/window (ALRRD)), may be defined/configured, for example, to refer to the maximum duration over which the first WTRU may monitor for bi/multi-static localization assistance response message(s) (e.g., after sending the bi/multi-static localization assistance request). The value of the maximum monitoring duration (e.g., ALRRD) may be communicated/signaled to the first WTRU, for example, by the network/gNB/serving gNB (e.g., via a higher layer or system information).

The first WTRU may re-send the bi/multi-static localization assistance request message to the network/gNB, for example, if/when the first WTRU does not receive a bi/multi-static localization assistance response message from the gNB after monitoring over the maximum monitoring duration (e.g., ALRRD).

The first WTRU may receive a bi/multi-static localization assistance response message from the network/gNB. The first WTRU may (e.g., after receiving the response message) monitor for (e.g., receive) the JCS-RS transmissions from each of the configured (or selected support) WTRUs (e.g., second WTRU, nth WTRU, etc.) on the associated configured resources, which may be provided/indicated in the bi/multi-static localization assistance response message from the network/gNB.

The JCS-RS transmission from a configured WTRU (e.g., second WTRU) may be performed, for example, via a unicast transmission to the first WTRU (e.g., for which the WTRU ID of the first WTRU may be given to the second WTRU in localization request from the gNB). The JCS-RS transmission from the second WTRU may be performed, for example, using the configuration requirements, which may be indicated/provided in the localization request and localization configuration information from the network/gNB. The JCS-RS transmission from the second WTRU may be performed, for example, over the sidelink shared channel, (e.g., PSSCH). An associated SCI may be sent (e.g., first) over a sidelink control channel (e.g., PSCCH) carrying the decoding information of the PSSCH. Fields and/or identifiers in (e.g., multipurpose) SCIs (e.g., SCI 0_1 or SCI 0_2) or dedicated SCIs may be defined/configured to indicate that the associated transmission over the PSSCH may include JCS-RSs.

A configured WTRU (e.g., second WTRU) may transmit JCS-RS to perform bi/multi-static measurements, for example, by following a procedure described herein.

The first WTRU may make measurements (e.g., AOA, TDOA, SNR, etc.) and may find a location of the target, for example, using the JCS-RS transmitted by each of the configured WTRUs, for example, by following a procedure as described herein.

WTRU-autonomous additional bi/multi-static measurements may be performed. The first WTRU may (e.g., determine to) perform additional bi/multi-static measurements with one or more of the first WTRU's neighboring WTRUs. The first WTRU may (e.g., determine to) perform additional bi/multi-static measurements, for example, with one or more of the WTRUs with which the initial bi/multi-static measurements were performed.

The first WTRU may re-send the bi/multi-static localization assistance request message to the network/gNB, for example, if a target location estimation error derived from each of the initial bi/multi-static measurements is above the maximum location estimation error threshold. A re-transmission of a bi/multi-static localization assistance request message may include, for example, an indication that none of the configurations selected for initial bi/multi-static measurements for the previous bi/multi-static localization assistance request message are sufficient to achieve the (e.g., required) target localization. The indication may help the network/gNB to select another set of WTRUs (e.g., different from the previous selection) and/or another configuration for initial bi/multi-static measurements for the WTRU.

The first WTRU may (e.g., determine to) perform additional bi/multi-static measurements, for example, if the target location estimation error derived from the initial bi/multi-static measurements is below the location estimation error threshold (e.g., maximum location estimation error threshold) and above a second threshold (e.g., a (e.g., required) location estimation error threshold).

The first WTRU may (e.g., determine to) perform additional bi/multi-static measurements, for example, based on the initial bi/multi-static measurements. For example, additional bi/multi-static measurements may be performed to lower the measurement error experienced in the initial bi/multi-static measurements (e.g., measurement error in the target's location estimation error that may be associated with measurement errors in AOA and/or TDOA measurements).

The first WTRU may (e.g., autonomously) perform one or more of the following: selection of a preferred configuration for additional bi/multi-static measurements using the initial bi/multi-static measurements, configuration of the additional bi/multi-static measurements (e.g., sending configuration information to the selected support WTRUs for additional bi/multi-static measurements), JCS-RS transmission and/or reception for additional bi/multi-static measurements, and/or derivation of the location of the target. The first WTRU may autonomously perform one or more of the foregoing operations, for example, over the sidelink (e.g., using the resources configured for sidelink mode 2), e.g., by following a procedure described herein.

The first WTRU may send (e.g., to the gNB) the location of the target (e.g., determined from the initial and/or additional bi/multi-static measurements) and/or one or more initial and/or additional bi/multi-static measurements (e.g., each measurement along with the details, such as an associated JCS-RS/WTRU and/or Tx/Rx indication used for the measurements). The first WTRU may send the location of the target and/or one or more initial bi/multi-static measurements, for example, using the uplink shared channel for which the resources may be communicated/signaled to the WTRU (e.g., in a bi/multi-static localization assistance response). The first WTRU may (e.g., first) send a scheduling request to request resources to send the location of the target and/or one or more initial bi/multi-static measurements to the network (e.g., gNB), for example, if the uplink resources are not configured.

Figure 17:
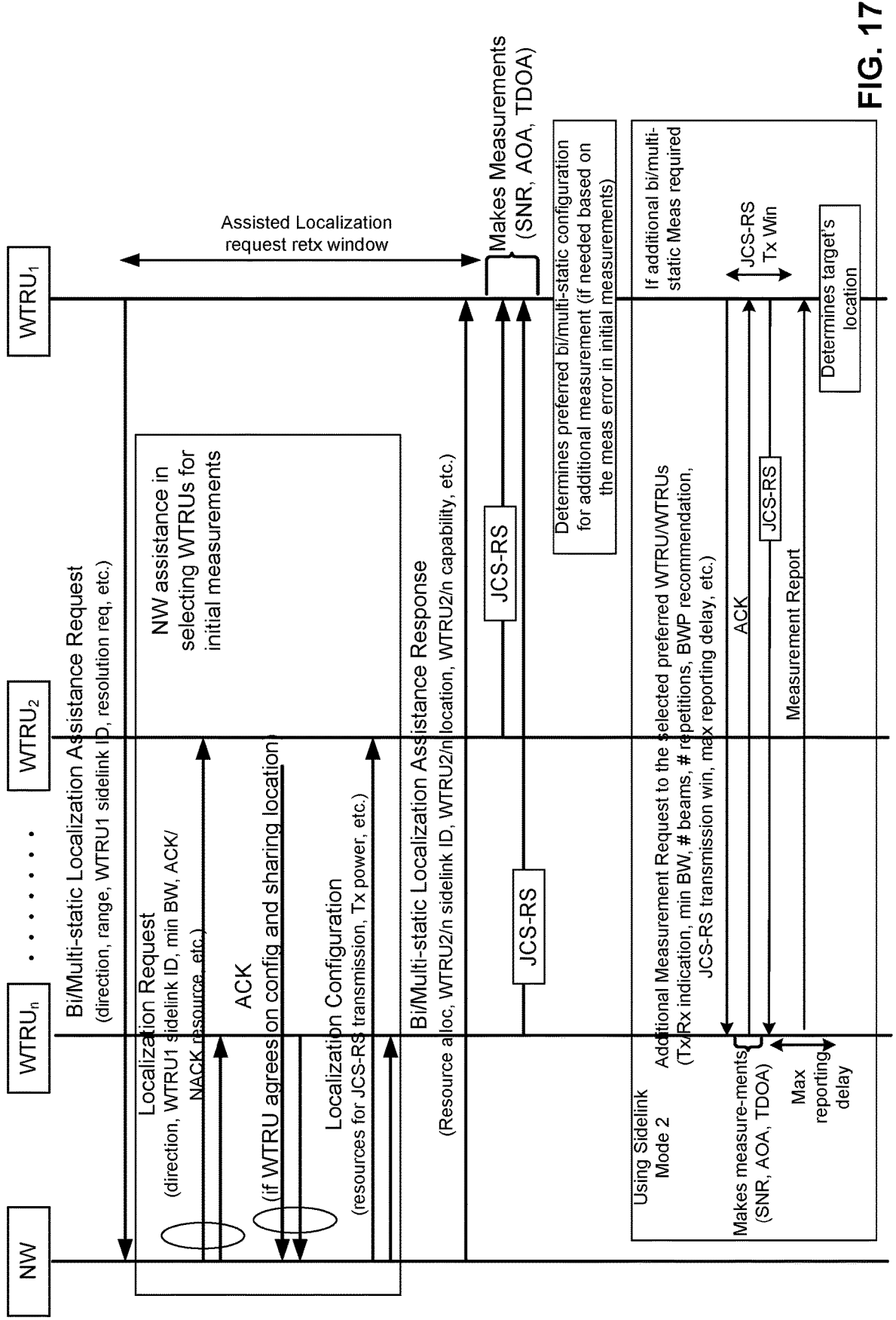
FIG. 17 illustrates an example of a network-assisted procedure for target localization using bi/multi-static measurements.

FIG. 17 illustrates an example of a network-assisted procedure for target localization using bi/multi-static measurements. In examples, sidelink mode 1 and mode 2 based resource allocation may be utilized in a network-assisted procedure. FIG. 17 shows an example WTRU (e.g., first WTRU) performing an operation to support network-assisted target localization by enabling WTRU-to-WTRU bi/multi-static measurements. The operation may include one or more of the following actions.

The WTRU may, for example, send a bi/multi-static localization assistance request (e.g., including one or more of direction, range information of the target, WTRU ID of the first WTRU, resolution requirement of the target localization, etc.) to the network (e.g., gNB), for example, to enable initial bi/multi-static measurements (e.g., to determine the location of a target).

The WTRU may, for example, monitor for (e.g., receive) a bi/multi-static localization assistance response from the network (e.g., gNB) within the assisted localization request retransmission duration. The response may include, for example, one or more of a WTRU ID, location or zone information, WTRU capabilities, resource configuration information for a JCS-RS transmission for each of the WTRUs selected/configured by the network (e.g., gNB) for initial bi/multi-static measurements.

The WTRU may, for example, monitor for (e.g., receive) the JCS-RS transmissions for initial bi/multi-static measurements from each of the configured WTRUs on the configured resources.

The WTRU may, for example, receive a JCS-RS from a configured WTRU (e.g., second WTRU). The first WTRU may make measurements (e.g., AOA, TDOA, SNR, etc.) and may determine an initial location of the target (e.g., using the measurements) and the location of the first WTRU.

The WTRU may, for example, determine to perform additional bi/multi-static measurements (e.g., determine that additional bi/multi-static measurements are needed), for example, based on the initial target location estimation error derived from the initial bi/multi-static measurements.

The WTRU may, for example, determine a preferred bi/multi-static configuration for additional bi/multi-static measurements.

The WTRU may, for example, send an additional measurement request message to each of the selected preferred/support WTRUs to configure for additional bi/multi-static measurements. The request message may include, for example, one or more of a Tx/Rx indication, a BWP recommendation, a JCS-RS transmission window, Tx power, etc.

The WTRU may, for example, monitor for (e.g., receive) an ACK/NACK response from each of the selected support WTRUs to which additional measurement request messages were sent.

The WTRU may, for example, monitor for (e.g., receive) the JCS-RS transmissions from each of the selected support Tx WTRUs (e.g., WTRUs that sent an ACK response to the additional measurement request message) for additional bi/multi-static measurements. Monitoring may occur during/within the associated JCS-RS transmission windows and/or on the recommended BWP/BWPs. The WTRU may make/perform measurements (e.g., AOA, TDOA, SNR, etc.).

The WTRU may, for example, transmit a JCS-RS for each of the selected support Rx WTRUs (e.g., WTRUs that sent an ACK in response to the additional measurement request message) for additional bi/multi-static measurements. Transmitting may occur (e.g., be performed) within the associated JCS-RS transmission windows and/or on the recommended BWP/BWPs. The WTRU may monitor for (e.g., receive) a measurement report from each of the selected support Rx WTRUs (e.g., WTRUs that sent an ACK in response to the additional measurement request message) for additional bi/multi-static measurements.

The WTRU may, for example, perform target localization using the one or more measurements available from additional bi/multi-static measurements.

The first WTRU may re-send the bi/multi-static localization assistance request message to the network (e.g., gNB), for example, if/when the first WTRU does not receive a bi/multi-static localization assistance response message from the network (e.g., gNB) within a time limit (e.g., the assisted localization request retransmission duration).

The first WTRU may measure the target location estimation error with each of the initial bi/multi-static measurements, for example, based on one or more of the associated SNR measurements, the configured WTRU's beamforming capability, the first WTRU's beamforming capability, bandwidth used for the initial JCS-RS transmissions, etc.

The first WTRU may (e.g., determine to) perform additional bi/multi-static measurements, for example, if the target location estimation error derived from the initial bi/multi-static measurements is below the location estimation error threshold (e.g., maximum location estimation error threshold) and above a second threshold (e.g., a (e.g., required) location estimation error threshold). The values of the thresholds (e.g., maximum location estimation error threshold and/or the (e.g., required) location estimation error threshold) may be communicated/signaled to the first WTRU (e.g., by the network).

The first WTRU may re-transmit the bi/multi-static localization assistance request message to the network (e.g., gNB), for example, if/when the target location estimation error derived from the initial bi/multi-static measurements is above the location estimation error threshold (e.g., maximum location estimation error threshold). The first WTRU may indicate (e.g., in a re-transmission) that none of the configurations selected for initial bi/multi-static measurements for the previous bi/multi-static localization assistance request message are sufficient to achieve the (e.g., required) target localization.

Selection of a preferred bi/multi-static configuration for additional bi/multi-static measurements may be performed, for example, using one or more of the initial bi/multi-static measurements, a WTRU capability of the WTRUs involved in the initial measurements, a WTRU capability of the first WTRU, etc.

Resources for an ACK/NACK in response to an additional measurement request message may be configured, for example, so that one or more dedicated sidelink resources may be associated with each additional measurement request message. Mapping between the resource used for an additional measurement request message and the associated resources for an ACK/NACK may be communicated/signaled to the WTRUs (e.g., by the network).

Resources for an ACK/NACK in response to an additional measurement request message may be (e.g., independently) selected from resources used for an additional measurement request message.

The first WTRU may re-send the additional measurement request message(s), for example, if/when the first WTRU does not receive ACKs for additional measurement request message(s) from one or more selected support WTRUs for additional bi/multi-static measurements. A transmission at a later time (e.g., re-transmission) may be, for example, at a higher power (e.g., limited to a maximum power) and/or to a different set of support WTRUs (e.g., compared to the support WTRUs selected for a previous transmission of an additional measurement request message). A different set of support WTRUs may be selected, for example, from (e.g., all) the configured WTRUs involved in the initial bi/multi-static measurements.

A maximum duration (e.g., maximum reporting delay) may (e.g., also) be configured for the measurement reporting. The selected Rx WTRU for additional bi/multi-static measurements (e.g., second WTRU) may (e.g., need to) transmit the measurement report before the maximum reporting delay expires, for example, after making the measurements over the JCS-RS transmission (e.g., from the first WTRU). The value of the maximum reporting delay may be configured (e.g., by the first WTRU), for example, in the additional measurement request message. The first WTRU may re-send the JCS-RSs for the second WTRU's measurements, for example, if/when the first WTRU does not receive a measurement report from the second WTRU after monitoring for measurement reporting over the maximum reporting delay. A transmission at a later time (e.g., re-transmission) may be, for example, at a higher power (e.g., limited to a maximum power).

The first WTRU may send (e.g., to the gNB) the location of the target (e.g., determined from the initial and/or additional bi/multi-static measurements), and/or one or more initial and/or additional bi/multi-static measurements (e.g., each measurement along with the details, such as an associated JCS-RS/WTRU and/or Tx/Rx indication used for the measurements).

A network (e.g., gNB) may perform operations to support network-assisted target localization, for example, by enabling WTRU-to-WTRU bi/multi-static measurements. The network (e.g., gNB) may perform at least one of the following actions/operations.

The network (e.g., gNB) may, for example, receive a bi/multi-static localization assistance request message from a WTRU (e.g., first WTRU), and select one or more WTRUs (e.g., second WTRU, third WTRU, . . . , nth WTRU, etc.) to perform initial bi/multi-static measurements with the first WTRU (e.g., based on the geographic information of the first WTRU, geographic information of the candidate WTRUs, and the zone information of the target shared by the first WTRU).

The network (e.g., gNB) may, for example, send a localization request to the selected WTRUs to request to participate in the initial bi/multi-static measurements with the first WTRU. The localization request may include, for example, at least one of the following: zone(s) information for the target, a WTRU ID of the first WTRU, a minimum bandwidth for JCS-RS transmission, uplink resources to send a response for localization request, etc.

The network (e.g., gNB) may, for example, monitor for (e.g., receive) an ACK/NACK response from each of the WTRUs to which a localization request was sent.

The network (e.g., gNB) may, for example, select one or more support WTRUs (e.g., second WTRU, nth WTRU, etc.) to participate in initial bi/multi-static measurements with the first WTRU. Support WTRUs may be selected, for example, from (e.g., all) WTRUs that sent an ACK for the localization request.

The network (e.g., gNB) may, for example, send a localization configuration to the selected support WTRUs. The localization configuration may include, for example, one or more of the following: resources for JCS-RS transmissions, a Tx power, a number of Tx-beams, a number of repetitions in each beam/direction etc.

The network (e.g., gNB) may, for example, sending a bi/multi-static localization assistance response to the first WTRU (e.g., within the assisted localization request retransmission duration). A bi/multi-static localization assistance response may include, for example, one or more of the following: a WTRU ID, location or zone information, WTRU capabilities, resource configuration information for JCS-RS transmission for each of the selected support WTRUs for initial bi/multi-static measurements, etc.

The network (e.g., gNB) may select support WTRUs (e.g., other than the support WTRUs selected in a previous configuration) to enable initial bi/multi-static measurements with a WTRU (e.g., first WTRU), for example, if/when the first WTRU provides/sends a bi/multi-static localization assistance request with an indication that none of the previously selected configurations are sufficient (e.g., good) for the given target localization.

Network-controlled target localization may enable/use WTRU-to-WTRU bi/multi-static measurements. A WTRU (e.g., the first WTRU) may enable initial and additional bi/multi-static measurements via the network (e.g., serving gNB). The network may assist the first WTRU in selecting one or more support WTRUs (e.g., second WTRU, third WTRU, etc.) to participate in initial bi/multi-static measurements with the first WTRU. The network may assist the first WTRU in configuring the resources to perform initial and/or additional bi/multi-static measurements (e.g., over NR/LTE PC5 interface using sidelink mode 1).

Figure 18:
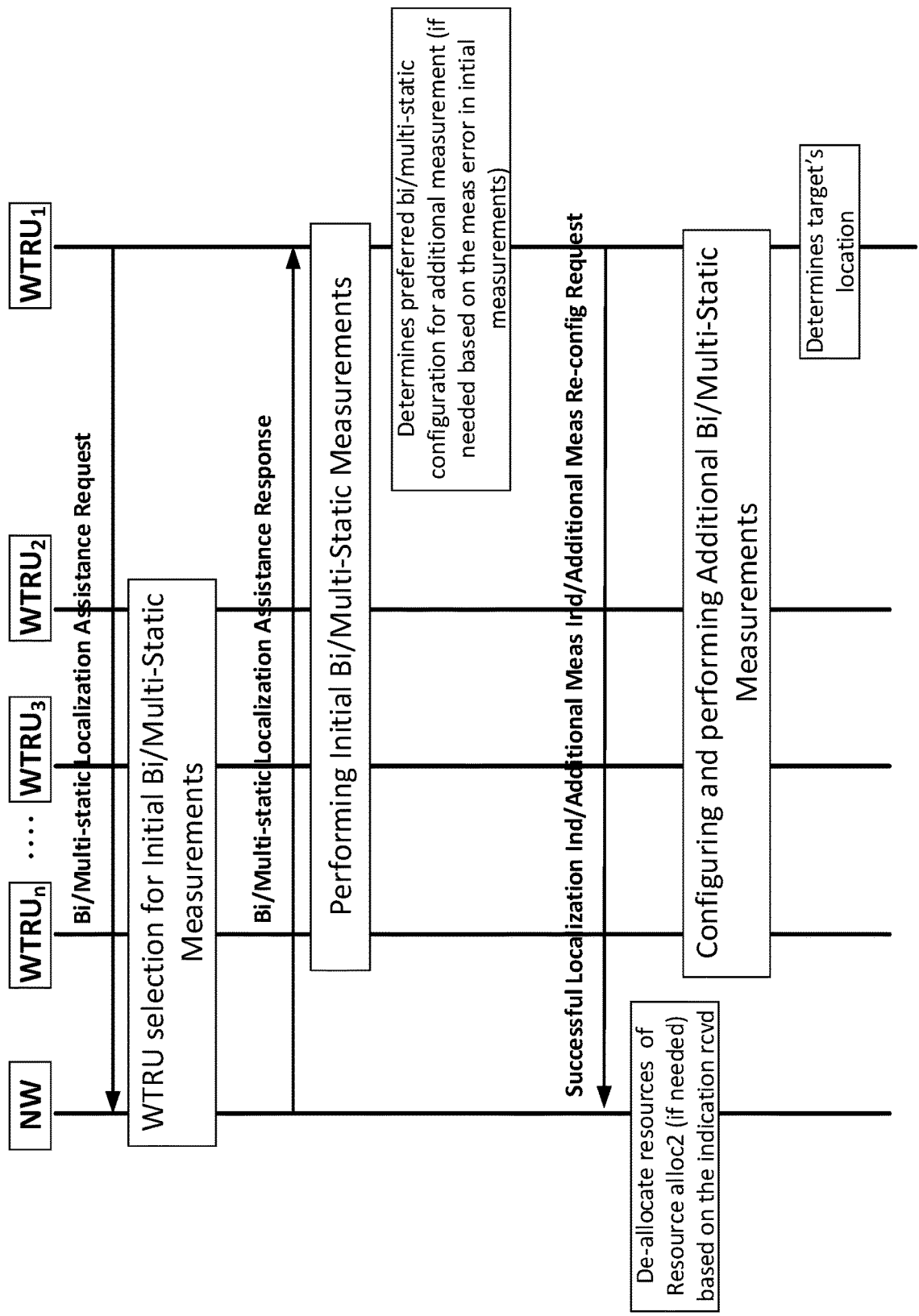
FIG. 18 illustrates an example of a network-controlled procedure for enabling WTRU-to-WTRU bi/multi-static measurements for a target localization.

FIG. 18 illustrates an example of a (e.g., high-level overview of a) network-controlled procedure for enabling WTRU-to-WTRU bi/multi-static measurements for a target localization. The first WTRU (e.g., WTRU$_1$) may send a request to the network, for example, to configure initial bi/multi-static measurements for a target localization. The network may configure one or more support WTRUs (e.g., second WTRU, third WTRU, etc.). The network may allocate resources for initial and additional bi/multi-static measurements. The network may send the configuration to the first WTRU. Initial bi/multi-static measurements may be performed, for example, using the selected support WTRUs on the configured resources. The first WTRU (e.g., WTRU$_1$) may determine the preferred configuration for additional bi/multi-static measurements, for example, based on the initial measurements. The first WTRU may send a determination/decision of the preferred configuration for the additional bi/multi-static configuration to the network, which may help the network to manage resources allocated for the additional bi/multi-static measurements. Additional bi/multi-static measurements may be performed, for example, using the selected preferred configuration by the first WTRU on the configured resources received from the network. Target localization may be performed, for example, using the measurements available from the additional and/or initial bi/multi-static measurements. Examples described herein provide example details of each of the signaling messages and procedures shown in FIG. 18.

A network-assisted configuration may be provided for initial bi/multi-static measurements. The first WTRU may send a bi/multi-static localization assistance request to the network/gNB (e.g., as described herein), for example, to enable the initial bi/multi-static measurements to perform a target localization. The network/gNB may receive the bi/multi-static localization assistance request message from the first WTRU. The network/gNB may perform a procedure (e.g., as described herein) to determine and configure one or more support WTRUs (e.g., second WTRU, third WTRU, etc.) to participate in the initial bi/multi-static measurements with the first WTRU, for example, based on receiving the bi/multi-static localization assistance request message from the first WTRU. The network/gNB may configure the one or more support WTRUs, for example, with one or more of resources for JCS-RS transmissions, Tx power, min BW, number of Tx-beams, number of repetitions in each beam/direction, etc.

The first WTRU may follow a procedure (e.g., as described herein) to monitor for bi/multi-static localization assistance response from the network/gNB, for example, after sending the bi/multi-static localization assistance request message. The bi/multi-static localization assistance response may include one or more parameters described herein, such as (e.g., but not limited to) a WTRU ID (e.g., a WTRU ID that may be used to uniquely identify a WTRU over the PC5 unicast interface), location or zone information, WTRU capabilities (e.g., in terms of location estimation errors, beamforming capability, etc.), and/or resource configuration information for JCS-RS transmissions for each of the selected support WTRUs (e.g., second WTRU, third WTRU, etc.), etc. A bi/multi-static localization assistance response may (e.g., also) include one or more of the following configuration information.

A bi/multi-static localization assistance response may (e.g., also) include configuration information (e.g., resources, MCS, Tx power, etc.) to send (e.g., to the gNB) a successful localization (e.g., termination), an additional measurement indication, or an additional measurement re-configuration request. Resources may be configured, for example, over the uplink control channel or uplink shared channel. A bi/multi-static localization assistance response may (e.g., also) include configuration information (e.g., resources, MCS, Tx power, etc.) to send an additional measurement configuration message to the neighboring WTRUs. A configuration may be performed, for example, using the resources allocated for an NR sidelink mode 1 resource allocation. A bi/multi-static localization assistance response may (e.g., also) include configuration information (e.g., resources, Tx power, etc.) for additional JCS-RS transmissions to perform additional bi/multi-static measurements with the neighboring WTRUs. A configuration may be performed, for example, using the resources allocated for an NR sidelink mode 1 resource allocation. A bi/multi-static localization assistance response may (e.g., also) include configuration information (e.g., resources, MCS, Tx power, etc.) for measurement reporting for additional bi/multi-static measurements. A configuration may be performed, for example, using the resources allocated for an NR sidelink mode 1 resource allocation.

A first WTRU may receive a bi/multi-static localization assistance response message from the network/gNB. The first WTRU may monitor for (e.g., receive) the JCS-RS transmissions from each of the configured WTRUs (e.g., second WTRU, third WTRU, etc.) on the associated configured resources indicated/provided in the bi/multi-static localization assistance response message from the network/gNB, for example, based on reception of the bi/multi-static localization assistance response message from the network/gNB.

Each of the configured WTRUs (e.g., second WTRU, third WTRU, etc.) may transmit JCS-RSs. The first WTRU may perform measurements on the JCS-RSs transmitted by the configured WTRUs (e.g., as described herein).

Figure 19:
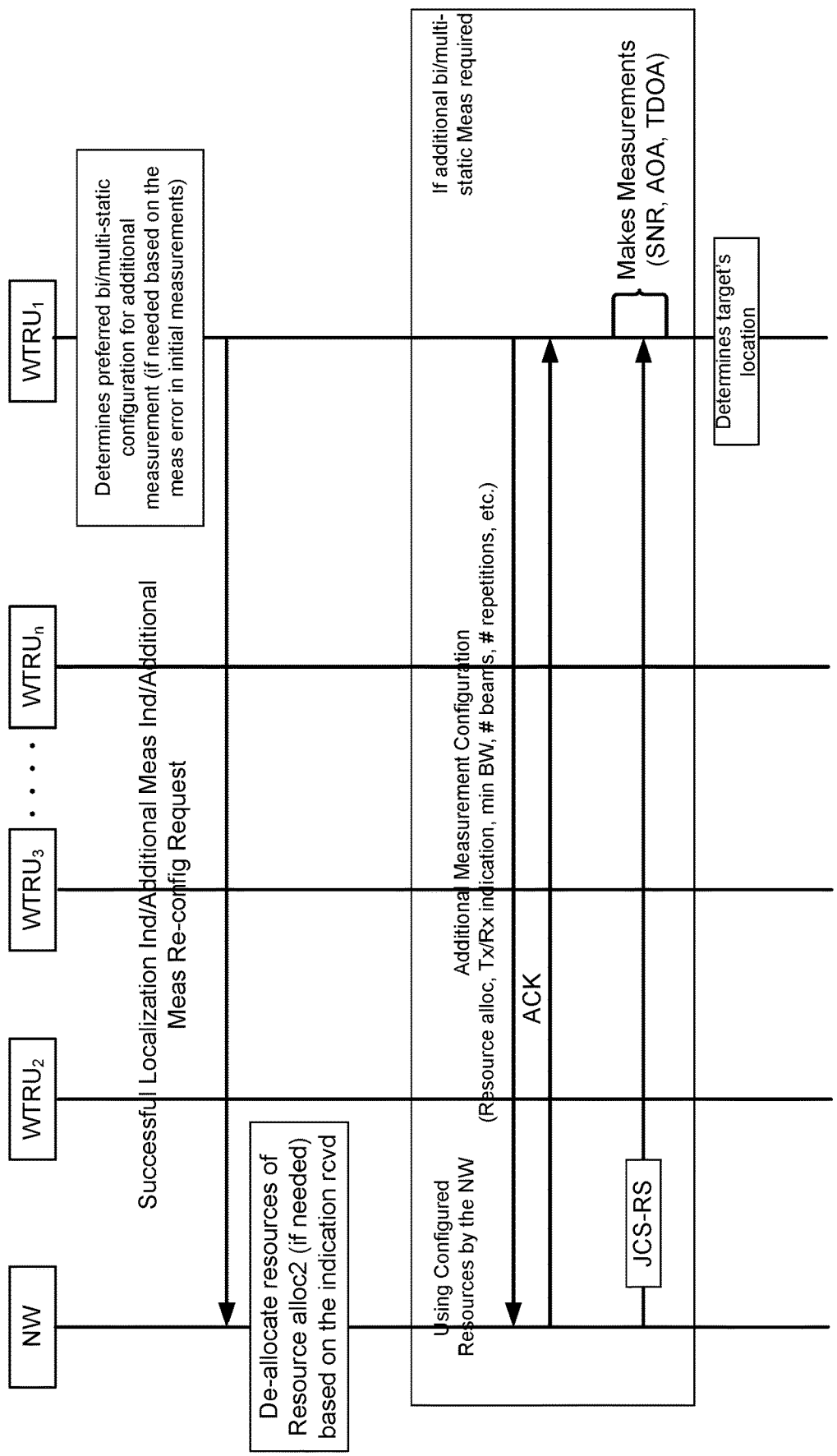
FIG. 19 illustrates an example of a WTRU procedure to enable additional bi/multi-static configuration and measurements using the resources configured by the network.

FIG. 19 illustrates an example of a WTRU procedure to enable additional bi/multi-static configuration and measurements using the resources configured by the network. The first WTRU may determine (e.g., whether) to perform additional bi/multi-static measurements with one or more of its neighboring WTRUs. The first WTRU may determine (e.g., whether) to perform additional bi/multi-static measurements with one or more of the WTRUs with which the initial bi/multi-static measurements were performed.

The first WTRU may determine (e.g., whether) to perform additional bi/multi-static measurements, for example, based on the initial bi/multi-static measurements. For example, additional bi/multi-static measurements may be performed to reduce/lower the measurement error experienced in the initial bi/multi-static measurements (e.g., measurement error(s) in the target's location estimation error, which may be associated with measurements errors in AOA and/or TDOA measurements). The first WTRU may measure the target location estimation error, for example, as described herein.

The first WTRU may send an indication (e.g., a successful localization or termination indication) to the network (e.g., serving gNB), for example, if the target location estimation error derived from the initial bi/multi-static measurements is below a threshold (e.g., a location estimation error threshold, such as a required location estimation error threshold). The first WTRU may send a successful localization or termination indication, for example, using the uplink configuration (e.g., on an uplink control or shared channel), which may be provided/indicated by the network/gNB in the bi/multi-static localization assistance response.

The network/gNB may receive a successful localization or termination indication from the first WTRU. The network/gNB may deallocate the resources allocated to the first WTRU, for example, to enable additional bi/multi-static measurements (e.g., based on receiving a successful localization or termination indication from the first WTRU). Deallocated resources may include, for example, the resources for the additional measurement configuration message, JCS-RS transmissions for additional bi/multi-static measurements, and measurement reporting. The deallocated resources may be used for one or more other purposes.

The first WTRU (e.g., after sending the successful localization or termination indication) may send (e.g., to the gNB) the location of the target (e.g., determined from the initial bi/multi-static measurements) and/or one or more initial bi/multi-static measurements (e.g., each measurement along with the details, such as an associated JCS-RS/WTRU used for the measurements). The first WTRU may send the location of the target and/or one or more initial bi/multi-static measurements, for example, using the uplink configuration (e.g., for which the resource may be communicated/signaled to the first WTRU in the bi/multi-static localization assistance response). The first WTRU may (e.g., first) send a scheduling request to request resources to send the location of the target and/or one or more initial bi/multi-static measurements to the network/gNB, for example, if the uplink resources are not configured.

The first WTRU may (e.g., determine to) perform additional bi/multi-static measurements, for example, if the target location estimation error derived from the initial bi/multi-static measurements is above a threshold (e.g., the location estimation error threshold, such as a required location estimation error threshold) and below another threshold (e.g., a maximum location estimation error threshold).

The first WTRU may determine the preferred bi/multi-static configuration for additional bi/multi-static measurements, for example, if (e.g., on the condition that) the first WTRU determines to perform additional bi/multi-static measurements. The preferred bi/multi-static configuration for additional bi/multi-static measurements may include, for example, selection of one or more preferred neighboring WTRUs from the support WTRUs involved in the initial measurements (e.g., second WTRU, third WTRU, etc.) to form a bi/multi-static configuration with the first WTRU, and determination of which of the WTRUs selected for additional bi/multi-static measurements and the first WTRU will be the transmitter or receiver to perform additional bi/multi-static measurements.

The first WTRU may follow a procedure (e.g., as described herein) to determine the preferred bi/multi-static configuration for additional bi/multi-static measurements. The first WTRU may use the configuration (e.g., configuration for additional measurements and/or measurement reporting), for example, alone or in combination with other procedures described herein, to determine the bi/multi-static configuration for additional bi/multi-static measurements. For example, resource allocation given (e.g., provided or indicated) by the network/gNB for additional measurements may affect (e.g., constrain) the number of support WTRUs that may be selected for additional bi/multi-static measurements. For example, a resource allocation given by the network/gNB for measurement reporting may affect (e.g., constrain) the number of support WTRUs that may be selected as Rx WTRUs for additional bi/multi-static measurements.

The first WTRU may send an indication (e.g., an additional measurement indication) to the network (e.g., serving gNB), for example, if (e.g., on the condition that) the first WTRU determines to perform additional bi/multi-static measurements. The additional measurement indication may (e.g., also) indicate, for example, if resources are requested/needed for measurement reporting. There may be no request/need for measurement reporting of additional measurements from any selected support WTRU (e.g., second WTRU, etc.) to the first WTRU, for example, if the first WTRU is selected as the Rx WTRU to perform (e.g., all) the additional bi/multi-static measurements.

The network/gNB (e.g., after receiving an additional measurement indication from the first WTRU) may deallocate resources allocated for measurement reporting and may use the deallocated resources for one or more other purposes, for example, if the additional measurement indication from the first WTRU indicates that the resources for measurement reporting are not needed for additional measurements.

A re-configuration request may be provided for additional measurements. The first WTRU may send a request (e.g., an additional measurement re-configuration request) to the network/gNB to request re-configuration for additional measurements and/or measurement reporting. For example, the first WTRU may determine that the configuration for additional measurements and/or measurement reporting given in the bi/multi-static localization assistance response from the network/gNB may be insufficient to achieve a configured or specified (e.g., required) localization performance. For example, the bandwidth configured for the resources allocated for additional measurements may be insufficient to achieve the configured or specified (e.g., required) TDOA resolution for additional measurements. For example, resource(s) in the time-domain may be insufficient to achieve the configured or specified (e.g., required) Doppler estimate for additional measurements.

The additional measurement re-configuration request may be sent, for example, using the (e.g., same) resources configured for a successful localization indication and/or an additional measurements indication. The first WTRU may send additional information in the additional measurement re-configuration request, such as, for example, an indication of the domain (e.g., frequency/time/power/etc.) to be reconfigured by the re-configuration (e.g., in which the re-configuration is needed).

The first WTRU may (e.g., after sending the additional measurement re-configuration request to the gNB) monitor for (e.g., receive) a response (e.g., an additional measurement re-configuration response) from the network/gNB. A response may include, for example, the updated (e.g., new) configuration information (e.g., resources, Tx power, etc.) for additional measurements and/or measurement reporting.

The additional measurement re-configuration response message from the network/gNB may be received, for example, in a downlink control channel or DCI (e.g., scrambled with the first WTRU's RNTI, L-RNTI, or SL-RNTI). The additional measurement re-configuration response message from the network/gNB may (e.g., alternatively) be received in a downlink shared channel (e.g., PDSCH). Decoding information may be indicated in a DCI (e.g., scrambled with the first WTRU's RNTI, L-RNTI, or SL-RNTI).

The first WTRU may (e.g., determine to) re-initiate the initial bi/multi-static measurements, for example, if the first WTRU determines that the configuration selected in initial bi/multi-static measurements is insufficient (e.g., not good) for the target localization. The first WTRU may (e.g., determine to) re-initiate the initial bi/multi-static measurements, for example, if the target location estimation error derived from the initial bi/multi-static measurements is above the (e.g., maximum) location estimation error threshold. The first WTRU may re-send the bi/multi-static localization assistance request message to the network/gNB. The re-transmission of the bi/multi-static localization assistance request message may include, for example, an indication that none of the configurations selected for initial bi/multi-static measurements for the previous bi/multi-static localization assistance request message are sufficient/enough to achieve the specified or configured (e.g., required) target localization. For example, the indication may help the network/gNB to select another (e.g., different from a previous selection) set of support WTRUs and/or configuration for initial bi/multi-static measurements for the first WTRU.

Configuration information may be provided for additional measurements. The first WTRU may (e.g., determine to) enable additional bi/multi-static measurements, e.g., using a preferred bi/multi-static configuration. The first WTRU may send a request (e.g., additional measurement configuration information), to each of the selected preferred/support WTRUs (e.g., second WTRU, etc.) for additional bi/multi-static measurements, for example, to configure the selected WTRUs for additional bi/multi-static measurements with the first WTRU (e.g., based on a condition that the first WTRU (e.g., determines to) enable additional bi/multi-static measurements using the preferred bi/multi-static configuration). The additional measurement configuration message may be sent, for example, using configuration information (e.g., resources, MCS, Tx power, etc.) provided/given by the network/gNB (e.g., in a bi/multi-static localization assistance response).

The additional measurement configuration message to a selected support WTRU (e.g., second WTRU) may include, for example, one or more parameters that may be used/needed for additional JCS-RS transmission(s) for bi/multi-static measurements, such as a Tx/Rx indication, configuration information (e.g., resources, Tx power, etc.) for JCS-RS transmissions, configuration information (e.g., resources, MCS, Tx power, etc.) for measurement reporting (e.g., if the recipient support WTRU is selected as an Rx for the measurements), and/or other parameters (e.g., a number of repetitions in each beam/direction), etc. The configuration information for JCS-RS transmissions and measurement reporting (e.g., if any) may be (e.g., selected as) the same configuration information given by the network/gNB in the bi/multi-static localization assistance response. The resources for JCS-RS transmissions/measurement reporting (e.g., indicated in the additional measurement configuration message to the second WTRU) may include one or more resources selected out of the resources allocated by the network/gNB for additional measurements/measurement reporting (e.g., indicated in a bi/multi-static localization assistance response).

The additional measurement configuration message may be sent (e.g., via the sidelink unicast/groupcast/broadcast transmission) to the selected support WTRUs for additional bi/multi-static measurements using resources configured by the network/gNB. The additional measurement configuration message may be sent, for example, as sidelink control information, e.g., using a sidelink control channel (e.g., PSCCH). One or more SCI formats may be defined/configured for an additional measurement configuration message. The additional measurement configuration message may (e.g., alternatively) be sent using the sidelink shared channel (e.g., PSSCH). The decoding information (e.g., resource allocation, modulation/coding scheme, etc.) of the sidelink shared channel carrying the additional measurement configuration message may be sent, for example, using an SCI (e.g., a dedicated SCI or a multipurpose SCI, such as SCI 0_1 or SCI 0_2 with one or more identifiers to indicate that the transmission is intended for an additional measurement configuration message).

After sending the additional measurement configuration message to the selected support WTRUs for additional bi/multi-static measurements, the first WTRU may monitor for (e.g., receive) a response (e.g., ACK or NACK) from each of the selected support WTRUs (e.g., WTRUs to which the additional measurement configuration message were sent). The resources for ACK/NACK may be configured, for example, to associate one or more dedicated sidelink resources with each additional measurement configuration message. Mapping between the resource used for an additional measurement configuration message and the associated resources for ACK/NACK may be communicated/signaled to the WTRUs (e.g., by the network).

The first WTRU may perform one or more procedures for each of the support WTRUs (e.g., second WTRU, etc.) selected for additional bi/multi-static measurements that provided an ACK response to an additional measurement configuration message provided by the first WTRU.

The first WTRU may select the second WTRU as the Tx WTRU to perform additional bi/multi-static measurements, which may be indicated, for example, by setting a Tx/Rx indication to 1 in the additional measurement configuration message to the second WTRU. The first WTRU may monitor for (e.g., receive) a JCS-RS transmission on the resource(s) configured in the additional measurement configuration message to the second WTRU.

The JCS-RS transmission from a selected support WTRU (e.g., second WTRU) may be performed, for example, via a unicast transmission to the first WTRU, e.g., using the configuration information (e.g., requirements) indicated/given in the additional measurement configuration message. The JCS-RS transmission from the second WTRU may be performed over the sidelink shared channel, e.g., a PSSCH. An associated SCI over sidelink control channel (e.g., PSCCH) may be sent (e.g., first) carrying the decoding information of the PSSCH. Fields and/or identifiers in (e.g., multipurpose) SCIs (e.g., SCI 0_1 or SCI 0_2) or dedicated SCIs may be defined/configured to indicate that the associated transmission over the PSSCH may include one or more JCS-RSs.

The first WTRU may make measurements (e.g., AOA, TDOA, SNR, etc.), for example, based on a reception of a JCS-RS from the second WTRU.

The first WTRU may transmit a JCS-RS, for example, if the first WTRU selects the second WTRU as a Rx WTRU to perform additional bi/multi-static measurements, which may be indicated, for example, by setting a Tx/Rx indication to 0 in the additional measurement configuration message to the second WTRU.

The first WTRU may transmit a JCS-RS to the second WTRU using/on configured resources, which may be specified in the additional measurement configuration message sent to the second WTRU. The first WTRU may transmit a JCS-RS, for example, using omni-directional or one/multi directional transmissions (e.g., as described herein).

The first WTRU may choose to transmit the JCS-RS transmission to the second WTRU, for example, using a unicast transmission or a groupcast/broadcast transmission (e.g., if multiple support WTRUs are selected as receiver for additional bi/multi-static measurements, and/or if the first WTRU transmits JCS-RS omni-directionally). A transmission may use the configuration information indicated/given in the additional measurement configuration message. A common set of parameters (e.g., one or more of resources for the JCS-RS transmission, Tx power, number of beams, number of repetitions, etc.) may be configured for multiple (e.g., all) selected support WTRUs (e.g., selected as receiver for additional bi/multi-static measurements) in the additional measurement configuration message(s), for example, for a groupcast/broadcast transmission. The JCS-RS transmission from the first WTRU may be performed over the sidelink shared channel, e.g., a PSSCH. An associated SCI over sidelink control channel (e.g., PSCCH) may be sent (e.g., first) carrying the decoding information of the PSSCH. Fields and/or identifiers in (e.g., multipurpose) SCIs (e.g., SCI 0_1 or SCI 0_2) or dedicated SCIs may be defined/configured to indicate that the associated transmission over the PSSCH may include JCS-RSs.

The first WTRU may send the JCS-RS transmission(s) to the second WTRU. The first WTRU may monitor for (e.g., receive) a measurement report (e.g., AOA, TDOA, SNR, etc.) from the second WTRU on the configured resources for measurement reporting (e.g., indicated in the additional measurement configuration message sent to the second WTRU), for example, after sending the JCS-RS transmission(s) to the second WTRU. The measurements report may be received over the sidelink shared channel, e.g., a PSSCH. An associated SCI over sidelink control channel (e.g., PSCCH) may be received (e.g., first) carrying decoding information for the PSSCH. Fields and/or identifiers in (e.g., multipurpose) SCIs (e.g., SCI 0_1 or SCI 0_2) or dedicated SCIs may be defined/configured to indicate that the associated transmission over the PSSCH may include the measurement report for additional bi/multi-static measurements.

The first WTRU may perform one or more additional measurements, for example, by making measurements over (e.g., associated with) the JCS-RS transmitted by one or more selected support Tx WTRUs for additional bi/multi-static measurements. The first WTRU may receive one or more additional measurements, for example, by transmitting JCS-RSs to one or more selected support Rx WTRUs for additional bi/multi-static measurements and receiving the associated measurement reports. The first WTRU may perform target localization, for example, based on the one or more additional measurements. The first WTRU may perform target localization, for example, as described herein.

Figure 20:
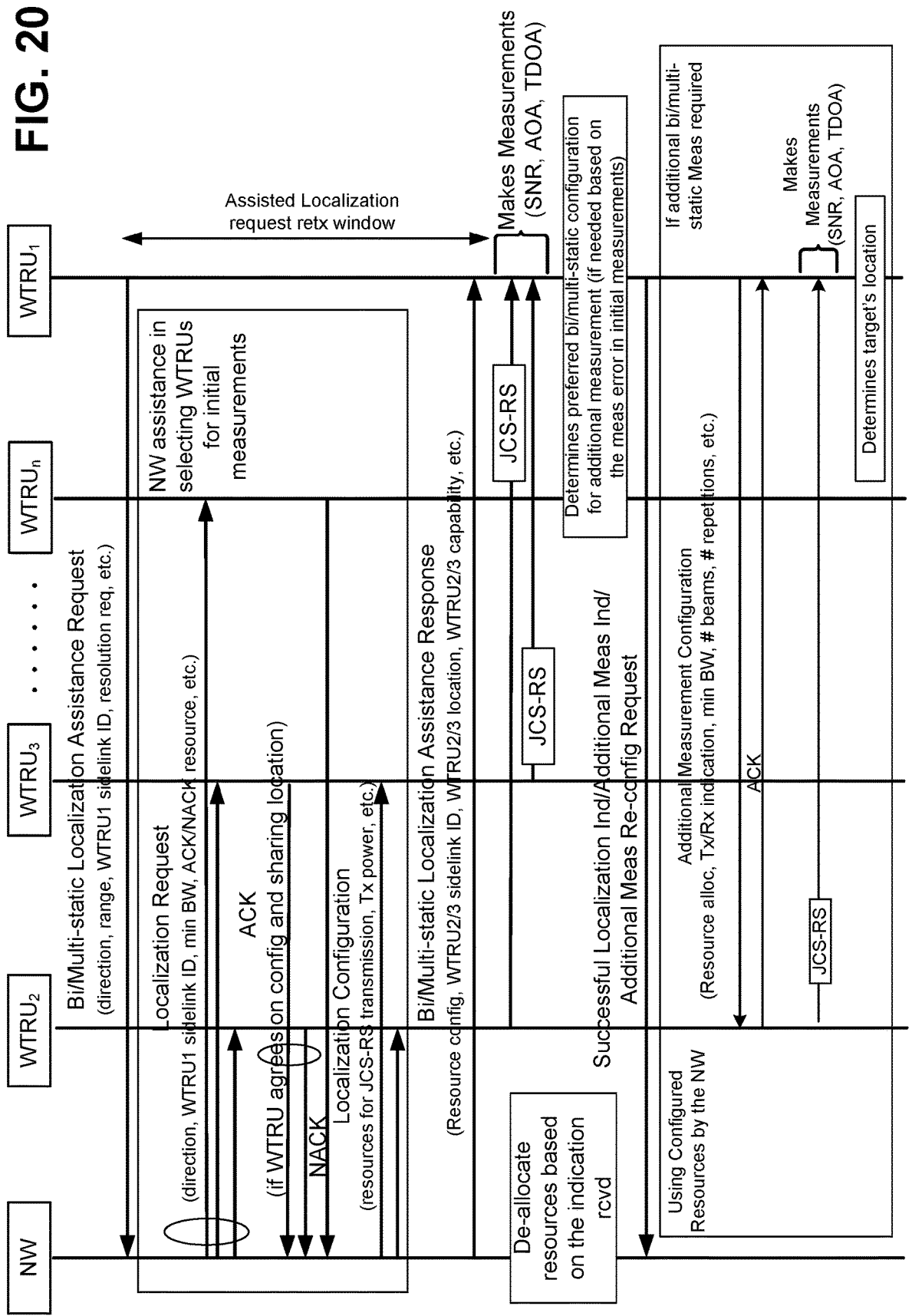
FIG. 20 illustrates an example of a network-controlled procedure for target localization using bi/multi-static measurements.

FIG. 20 illustrates an example of a network-controlled procedure for target localization using bi/multi-static measurements (e.g., using a sidelink Mode 1 based resource allocation). FIG. 20 shows an example operation performed by a WTRU (e.g., first WTRU) to support network-controlled target localization by enabling WTRU-to-WTRU bi/multi-static measurements. The operation may include, for example, one or more of the following actions.

The first WTRU may, for example, send a bi/multi-static localization assistance request to the network (e.g., gNB) to request to enable initial bi/multi-static measurements to determine location of a target. A bi/multi-static localization assistance request may include, for example, one or more of a direction, range information of the target, a WTRU ID of the first WTRU, a resolution requirement of the target localization, etc.

The first WTRU may, for example, monitor for (e.g., receive) a bi/multi-static localization assistance response from the network/gNB (e.g., during/within the assisted localization request retransmission duration). A bi/multi-static localization assistance response may include, for example, a WTRU ID, location or zone information, WTRU capabilities, resource configuration information for a JCS-RS transmission for each of the selected/configured support WTRUs by the network (e.g., gNB) for initial bi/multi-static measurements, resource configuration information for a successful localization indication, an additional measurement indication, and/or an additional measurement re-configuration request, transmission of additional measurement configuration information, transmission of a JCS-RS for additional measurements, and/or measurement reporting.

The first WTRU may, for example, monitor for (e.g., receive) the JCS-RS transmissions from each of the configured WTRUs on the configured resources.

The first WTRU may, for example, receive at least one JCS-RS from at least one configured WTRU (e.g., second WTRU). The first WTRU may make at least one measurement (e.g., AOA, TDOA, SNR, etc.) based on the at least one received JCS-RS. The first WTRU may determine a location of the target based on (e.g., using) the at least one measurement and the location of the first WTRU.

The first WTRU may, for example, determine that additional bi/multi-static measurements are needed, for example, based on the target location estimation error derived from the initial bi/multi-static measurements.

The first WTRU may, for example, determine a preferred bi/multi-static configuration for additional bi/multi-static measurements.

The first WTRU may, for example, send an additional measurement indication to the network, e.g., along with an indication (e.g., information) whether the resources for measurement reporting are needed.

The first WTRU may, for example, send an additional measurement configuration message to each of the selected preferred/support WTRUs to configure for additional bi/multi-static measurements. The additional measurement configuration message may include, for example, one or more of a Tx/Rx indication, resource configuration information for JCS-RS transmission/reception, etc.

The first WTRU may, for example, monitor for (e.g., receive) an ACK/NACK response from each of the WTRUs to which an additional measurement configuration message was sent.

The first WTRU may, for example, monitor (e.g., configured resources) for (e.g., receive) the JCS-RS transmissions from each of the support Tx WTRUs (e.g., selected for additional bi/multi-static measurements) that provided an ACK in response to an additional measurement configuration message. The first WTRU may make/perform measurements (e.g., AOA, TDOA, SNR, etc.) based on the received JCS-RS transmissions.

The first WTRU may, for example, transmit a JCS-RS using/on the configured resources for each of the support Rx WTRUs (e.g., selected for additional bi/multi-static measurements) that provided an ACK in response to an additional measurement configuration message). The first WTRU may monitor (e.g., configured resources) for (e.g., receive) a measurement report from each of the support Rx WTRUs (e.g., selected for additional bi/multi-static measurements) that sent an ACK in response to an additional measurement configuration message.

The first WTRU may, for example, perform target localization using the one or more measurements available from additional bi/multi-static measurements.

The first WTRU may re-send the bi/multi-static localization assistance request message to the network/gNB, for example, if/when the first WTRU does not receive a bi/multi-static localization assistance response message from the network/gNB within a time limit (e.g., the assisted localization request retransmission duration).

The first WTRU may measure the target location estimation error with each of the initial bi/multi-static measurements, for example, based on one or more of the associated SNR measurements, the configured WTRU's beamforming capability, the first WTRU's beamforming capability, bandwidth used for the initial JCS-RS transmissions, etc.

The first WTRU may (e.g., determine to) perform additional bi/multi-static measurements, for example, if the target location estimation error derived from the initial bi/multi-static measurements is below a threshold (e.g., the maximum location estimation error threshold) and above a second threshold (e.g., a location estimation error threshold, such as a required location estimation error threshold). The values of thresholds (e.g., maximum location estimation error threshold and/or (e.g., required) location estimation error threshold) may be communicated/signaled to the first WTRU, e.g., by the network.

The first WTRU may send a (e.g., successful) localization indication to the network/gNB, for example, if the target location estimation error derived from the initial bi/multi-static measurements is below the (e.g., required) location estimation error threshold.

The first WTRU may send an additional measurement re-configuration request to the network/gNB, for example, to request re-configuration for additional measurements and/or measurement reporting. Additional information may be sent (e.g., in a measurement re-configuration request), such as an indication of the domain(s) (e.g., frequency/time/power/etc.) for re-configuration.

The first WTRU may monitor for (e.g., receive) an additional measurement re-configuration response from the network/gNB, for example, after sending the additional measurement re-configuration request (e.g., to the network/gNB). The additional measurement re-configuration response may include, for example, the updated (e.g., new) configuration information (e.g., resources, Tx power, etc.) for additional measurements and/or measurement reporting.

The first WTRU may re-transmit the bi/multi-static localization assistance request message to the network/gNB, for example, if/when the target location estimation error derived from the initial bi/multi-static measurements is above a threshold (e.g., the maximum location estimation error threshold). The first WTRU may indicate (e.g., in the re-transmission) that one or more (e.g., all) of the configurations selected for initial bi/multi-static measurements for the previous bi/multi-static localization assistance request message are insufficient to achieve the (e.g., required) target localization.

Selection of a preferred bi/multi-static configuration for additional bi/multi-static measurements may be performed, for example, using one or more of the initial bi/multi-static measurements, a WTRU capability of the WTRUs involved in the initial measurements, a WTRU capability of the first WTRU, etc.

Resources for an ACK/NACK for an additional measurement configuration message may be configured, for example, so that one or more dedicated sidelink resources may be associated with each additional measurement configuration message. Mapping between the resource used for an additional measurement configuration message and the associated resources for an ACK/NACK may be communicated/signaled to the WTRUs (e.g., by the network).

The first WTRU may send (e.g., to the gNB) the location of the target (e.g., determined from the initial and/or additional bi/multi-static measurements), one or more initial bi/multi-static measurements, and/or one or more additional bi/multi-static measurements. Measurements may include, for example, each measurement along with the details, such as an associated JCS-RS/WTRU and/or a Tx/Rx indication used for the measurements.

A network (e.g., gNB) may perform an operation to support network-controlled target localization, for example, by enabling WTRU-to-WTRU bi/multi-static measurements. The operation may include, for example, one or more of the following actions.

A bi/multi-static localization assistance request message may be received from a WTRU (e.g., first WTRU) and one or more WTRUs (e.g., second WTRU, third WTRU, . . . , nth WTRU, etc.) may be selected to perform initial bi/multi-static measurements with the first WTRU, e.g., based on the geographic information of the first WTRU, candidate WTRUs, and the zone information of the target, which may be shared by the first WTRU.

A localization request may be sent to the selected WTRUs to request to participate in the initial bi/multi-static measurements with the first WTRU. A localization request may include, for example, one or more zones of the target, a WTRU ID of the first WTRU, a (e.g., minimum) bandwidth for JCS-RS transmission, and/or uplink resources to send a response for a localization request, etc.

An ACK/NACK response may be monitored for (e.g., received) from each of the WTRUs to which localization request was sent.

One or more support WTRUs (e.g., second WTRU, third WTRU, etc.) may be selected out of (e.g., all) the WTRUs that sent an ACK for a localization request, to participate in initial bi/multi-static measurements with the first WTRU.

Localization configuration information may be sent to the selected support WTRUs. Localization configuration information may include, for example, one or more of resources for JCS-RS transmissions, Tx power, a number of Tx-beams, a number of repetitions in each beam/direction, etc.

A bi/multi-static localization assistance response may be sent to the first WTRU (e.g., within the assisted localization request retransmission duration). A bi/multi-static localization assistance response may include, for example, one or more of the following: a WTRU ID, location or zone information, WTRU capabilities, resource configuration information for JCS-RS transmission for each of the selected support WTRUs for initial bi/multi-static measurements, resource configuration information for a successful localization indication, resource configuration information for an additional measurement indication, resource configuration information for an additional measurement re-configuration request, resource configuration information for transmission of additional measurement configuration information, resource configuration information for transmission of a JCS-RS for additional measurements, and/or resource configuration information for measurement reporting.

A network/gNB may deallocate resources configured to enable additional measurements for a WTRU (e.g., first WTRU). Deallocated resources may include resources for the transmission of additional measurement configuration information, transmission of a JCS-RS for additional measurements, and/or for measurement reporting. A network/gNB may use deallocated resources for one or more other purposes, for example, if (e.g., after sending a bi/multi-static localization assistance response to the first WTRU) the network/gNB receives an indication of successful localization from the first WTRU.

The network/gNB may deallocate resources configured for measurement reporting, for example, to enable additional measurements for a WTRU (e.g., first WTRU). A network/gNB may send a bi/multi-static localization assistance response to the first WTRU. The network/gNB may receive (e.g., from the first WTRU) an indication of an additional measurement, for example, along with an indication that there may be no need for measurement reporting.

The network/gNB may re-configure the resources for additional measurements for a WTRU (e.g., first WTRU). The network/gNB may send a bi/multi-static localization assistance response to the first WTRU. The network/gNB may receive an additional measurement re-configuration request from the first WTRU. The re-configuration may be determined, for example, based on the information received in the additional measurement re-configuration request from the first WTRU. The network/gNB may send the re-configuration information to the first WTRU, for example, in an additional measurement re-configuration response.

The network/gNB may select support WTRUs (e.g., other than support WTRUs selected in a previous configuration to enable initial bi/multi-static measurements with a WTRU, such as the first WTRU), for example, if/when a bi/multi-static localization assistance request (e.g., received from the first WTRU) includes an indication that one or more (e.g., all) of the previously selected configurations are insufficient for the given target localization.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well. For example, while the system has been described with reference to a 3GPP, 5G, and/or NR network layer, the envisioned embodiments extend beyond implementations using a particular network layer technology. Likewise, the potential implementations extend to all types of service layer architectures, systems, and embodiments. The techniques described herein may be applied independently and/or used in combination with other resource configuration techniques.

The processes described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

It is understood that the entities performing the processes described herein may be logical entities that may be implemented in the form of software (e.g., computer-executable instructions) stored in a memory of, and executing on a processor of, a mobile device, network node or computer system. That is, the processes may be implemented in the form of software (e.g., computer-executable instructions) stored in a memory of a mobile device and/or network node, such as the node or computer system, which computer executable instructions, when executed by a processor of the node, perform the processes discussed. It is also understood that any transmitting and receiving processes illustrated in figures may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (e.g., instructions) embodied in tangible media including any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together include code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A first wireless transmit/receive unit (WTRU) comprising,
    a processor configured to:
        send a localization request to a set of WTRUs;
        receive a plurality of localization responses, wherein each localization response in the plurality of localization responses is associated with a respective WTRU in the set of WTRUs;
        determine, based on the received plurality of localization responses, a first subset of WTRUs, wherein the first subset of WTRUs is a subset of the set of WTRUs;
        send initial measurement configuration information to the first subset of WTRUs, wherein the initial measurement configuration information indicates a reference signal transmission parameter;
        receive a first reference signal from a second WTRU, wherein the second WTRU is in the first subset of WTRUs;
        perform a first measurement associated with a first object using the first reference signal; and
        determine, based on the first measurement, the first object and a first object estimation error.

2. The first WTRU of claim 1, wherein the processor is further configured to:
    determine if the first object estimation error is above a threshold; and
    select a second subset of WTRUs based on a determination that the first object estimation error is above the threshold, wherein the second subset of WTRUs is a subset of the first subset of WTRUs.

3. The first WTRU of claim 2, wherein the processor is further configured to:
    send a second reference signal associated with the first WTRU to a third WTRU, wherein the third WTRU is a receiving WTRU in the second subset of WTRUs;
    receive a second measurement from the third WTRU, wherein the second measurement is associated with the second reference signal; and
    determine, based on the second measurement, a second object and a second object estimation error, wherein the second object is a refined estimate of the first object, and wherein the second object estimation error is a refined estimate of the first object estimation error.

4. The first WTRU of claim 2, wherein the processor is further configured to:
    perform a second measurement with a second reference signal, wherein the second reference signal is from the second subset of WTRUs; and
    determine, based on the second measurement, a second object and a second object estimation error, wherein the second object is a refined estimate of the first object, and wherein the second object estimation error is a refined estimate of the first object estimation error.

5. The first WTRU of claim 1, wherein the reference signal transmission parameter is associated with the first subset of WTRUs.

6. The first WTRU of claim 1, wherein the processor is further configured to:
    send one or more of the first object, the first object estimation error, a second object, or a second object estimation error to one or more of a network or one or more WTRUs.

7. The first WTRU of claim 1, wherein the first object estimation error is an estimation error associated with a location associated with the first object.

8. A method for a first wireless transmit/receive unit (WTRU), the method comprising,
    sending a localization request to a set of WTRUs;
    receiving a plurality of localization responses, wherein each localization response in the plurality of localization responses is associated with a respective WTRU in the set of WTRUs;
    determining, based on the received plurality of localization responses, a first subset of WTRUs, wherein the first subset of WTRUs is a subset of the set of WTRUs;
    sending initial measurement configuration information to the first subset of WTRUs, wherein the initial measurement configuration information indicates a reference signal transmission parameter;
    receiving a first reference signal from a second WTRU, wherein the second WTRU is in the first subset of WTRUs;
    performing a first measurement associated with a first object using the first reference signal; and
    determining, based on the first measurement, the first object and a first object estimation error.

9. The method of claim 8, wherein the method further comprises:
    determining if the first object estimation error is above a threshold; and
    selecting a second subset of WTRUs based on a determination that the first object estimation error is above the threshold, wherein the second subset of WTRUs is a subset of the first subset of WTRUs.

10. The method of claim 9, wherein the method further comprises:
sending a second reference signal associated with the first WTRU to a third WTRU, wherein the third WTRU is a receiving WTRU in the second subset of WTRUs;
receiving a second measurement from the third WTRU, wherein the second measurement is associated with the second reference signal; and
determining, based on the second measurement, a second object and a second object estimation error, wherein the second object is a refined estimate of the first object, and wherein the second object estimation error is a refined estimate of the first object estimation error.

11. The method of claim 9, wherein the method further comprises:
performing a second measurement with a second reference signal, wherein the second reference signal is from the second subset of WTRUs; and
determining, based on the second measurement, a second object and a second object estimation error, wherein the second object is a refined estimate of the first object, and wherein the second object estimation error is a refined estimate of the first object estimation error.

12. The method of claim 8, wherein the reference signal transmission parameter is associated with the first subset of WTRUs.

13. The method of claim 8, wherein the method further comprises:
sending one or more of the first object, the first object estimation error, a second object, or a second object estimation error to one or more of a network or one or more WTRUs.

14. The method of claim 8, wherein the first object estimation error is an estimation error associated with a location associated with the first object.

* * * * *